(12) United States Patent
Gall

(10) Patent No.: US 7,799,926 B2
(45) Date of Patent: Sep. 21, 2010

(54) POLAR DYES

(75) Inventor: Alexander A Gall, Woodinville, WA (US)

(73) Assignee: Cepheid, Sunnyvale, CA (US)

( * ) Notice: Subject to any disclaimer, the term of this patent is extended or adjusted under 35 U.S.C. 154(b) by 1142 days.

(21) Appl. No.: 11/372,249

(22) Filed: Mar. 9, 2006

(65) Prior Publication Data

US 2006/0229441 A1 Oct. 12, 2006

Related U.S. Application Data

(60) Provisional application No. 60/661,222, filed on Mar. 9, 2005.

(51) Int. Cl.
*C07D 229/00* (2006.01)
*C07D 231/00* (2006.01)

(52) U.S. Cl. ................. 548/102; 548/103; 548/402; 548/403; 546/3; 546/4

(58) Field of Classification Search ................. None
See application file for complete search history.

(56) References Cited

U.S. PATENT DOCUMENTS

| | | | |
|---|---|---|---|
| 5,268,486 A | 12/1993 | Waggoner et al. |
| 5,512,246 A | 4/1996 | Russell et al. |
| 5,932,474 A | 8/1999 | Tsien et al. |
| 6,008,378 A | 12/1999 | Tsien et al. |
| 6,054,271 A | 4/2000 | Tsien et al. |
| 6,130,101 A | 10/2000 | Mao et al. |
| 6,319,540 B1 | 11/2001 | Van Antwerp et al. |
| 6,323,337 B1 | 11/2001 | Singer et al. |
| 6,399,392 B1 | 6/2002 | Haugland et al. |
| 6,451,569 B1 | 9/2002 | Tsien et al. |
| 6,686,458 B2 | 2/2004 | Tsien et al. |
| 6,706,460 B1 | 3/2004 | Williams et al. |
| 6,727,356 B1 | 4/2004 | Reed et al. |
| 6,790,590 B2 | 9/2004 | Collins et al. |
| 6,933,384 B2 | 8/2005 | Tsien et al. |
| 2002/0064794 A1 | 5/2002 | Leung et al. |
| 2004/0241749 A1 | 12/2004 | Tsien et al. |

FOREIGN PATENT DOCUMENTS

WO  WO 01/86001 A1   11/2001
WO  WO 03039564 A1 * 5/2003

OTHER PUBLICATIONS

Berns et al., "A Fluorescence Study of Specific and Non-Specific Dye-Protein Interactions," Immunochemistry 1:209-217, 1964.
Edwards et al., "Nonsteroidal Androgen Receptor Agonists Based on 4-(trifluoromethyl)-2H-pyrano[3,2-g]quinolin-2-one," Bioorganic & Medicinal Chemistry Letters 9:1003-1008, 1999.
Glazer, "The Time-Dependent Specific Interaction of 4-(4'-aminophenylazo)phenylarsonic Acid with Subtilisins," in Biochemistry, University of California School of Medicine, Los Angeles, California, pp. 996-1002, 1968.
Thorn et al., "A novel method of affinity-purifying proteins using a bis-arsenical fluorescein," Protein Science 9:213-217, 2000.
European Patent Office Communication issued in corresponding EP application (06 737 586.5-1218) on Jul. 25, 2008.

* cited by examiner

*Primary Examiner*—Zinna N Davis
(74) *Attorney, Agent, or Firm*—Hai Han; Seed IP Law Group PLLC

(57) ABSTRACT

The present invention relates to novel polar fluorescent and quenchers dyes, and minor groove binder with enhanced polarity. The present invention further relates to methods of preparing oligonucleotide probes labeled with polar arsonate dyes under the condition of automated synthesis and method of using such probes.

8 Claims, 12 Drawing Sheets

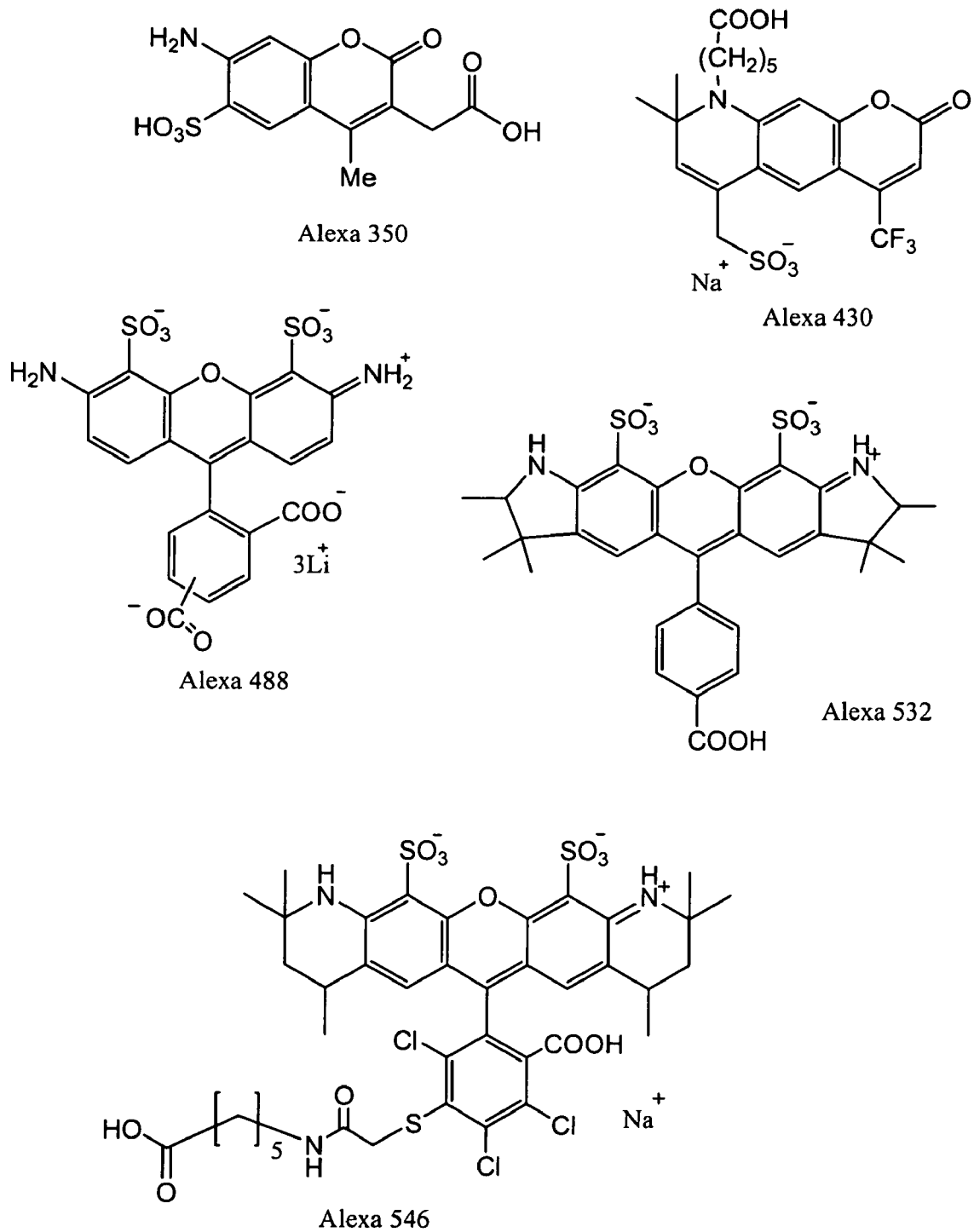
Figure 1. Alexa Fluor® 350, 430, 488, 532 and 546 dyes. (Prior Art)

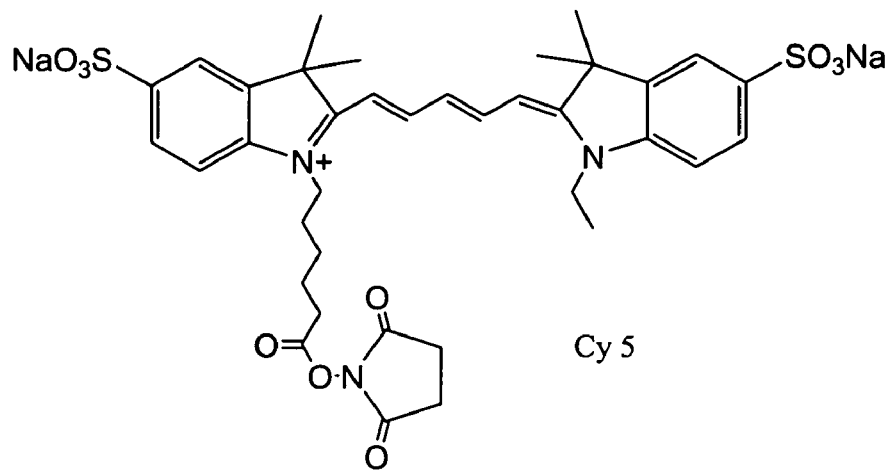
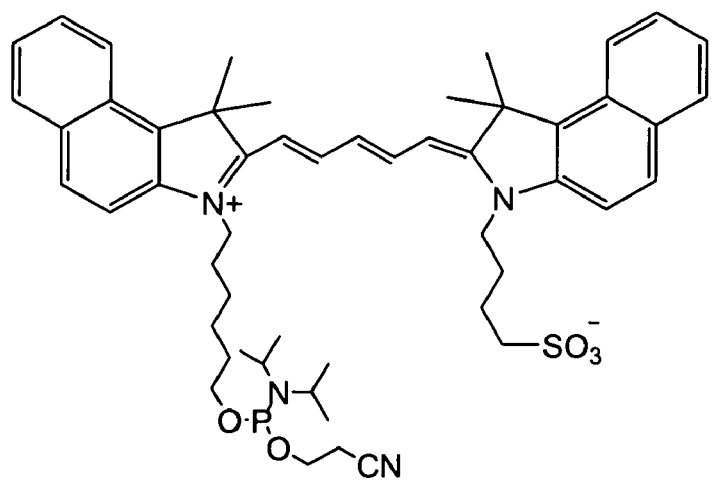
IRDye 700 Phosphoramidite
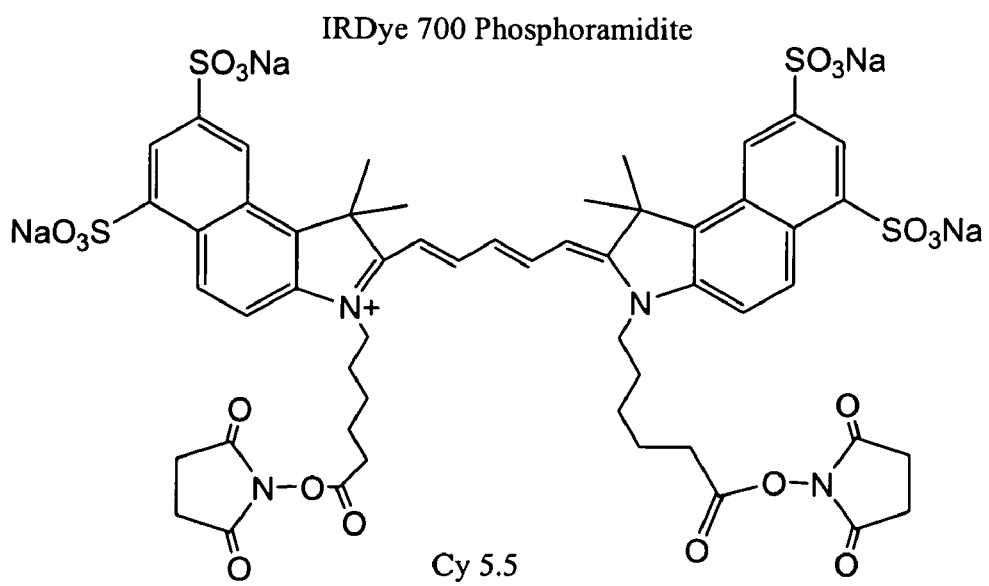
Figure 2. Cy 5, IRDye 700 Phosphoramidite and Cy 5.5 dye. (Prior Art)

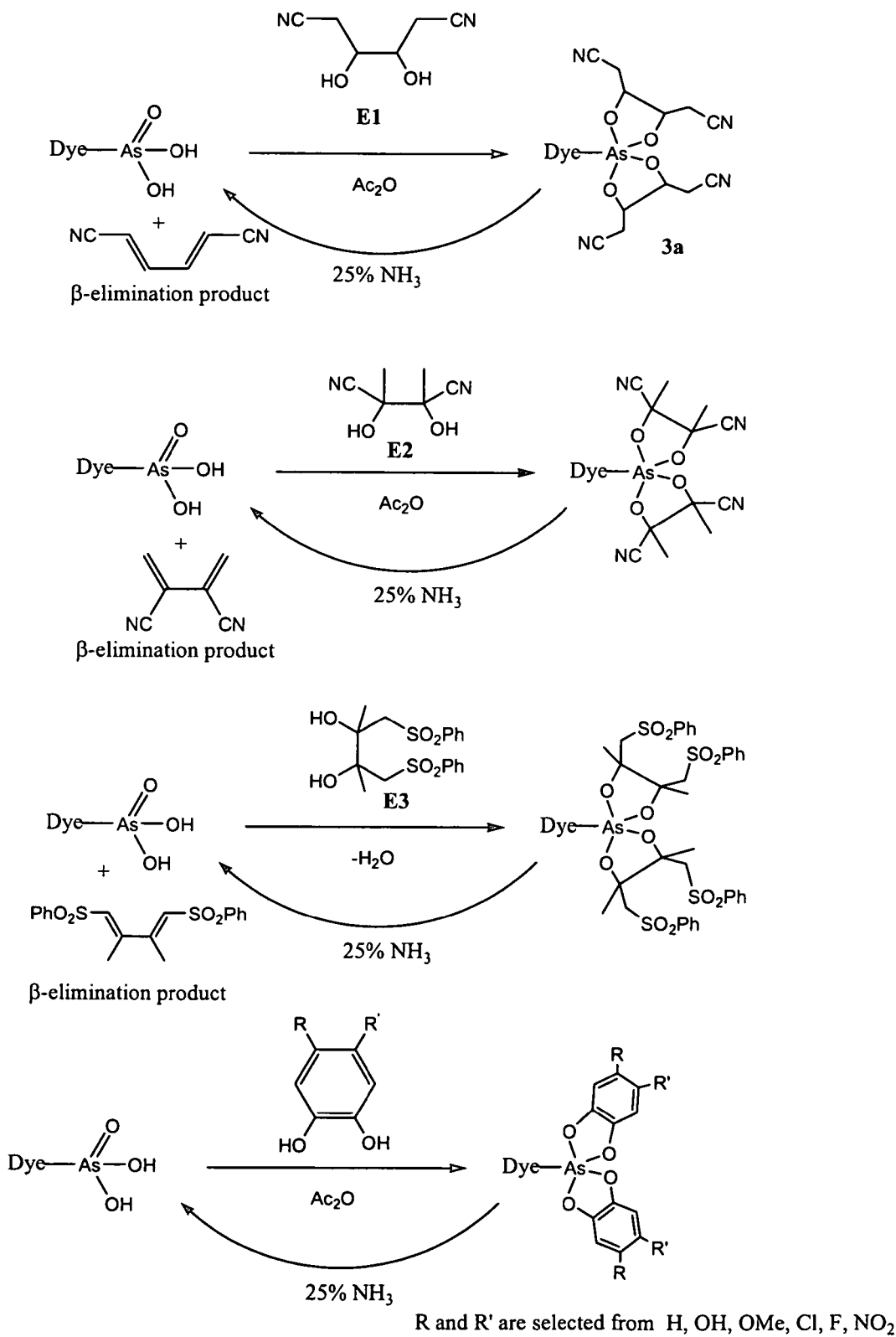
Figure 3. Protection of dyes arsonic acids with ammonia-labile chelating groups.

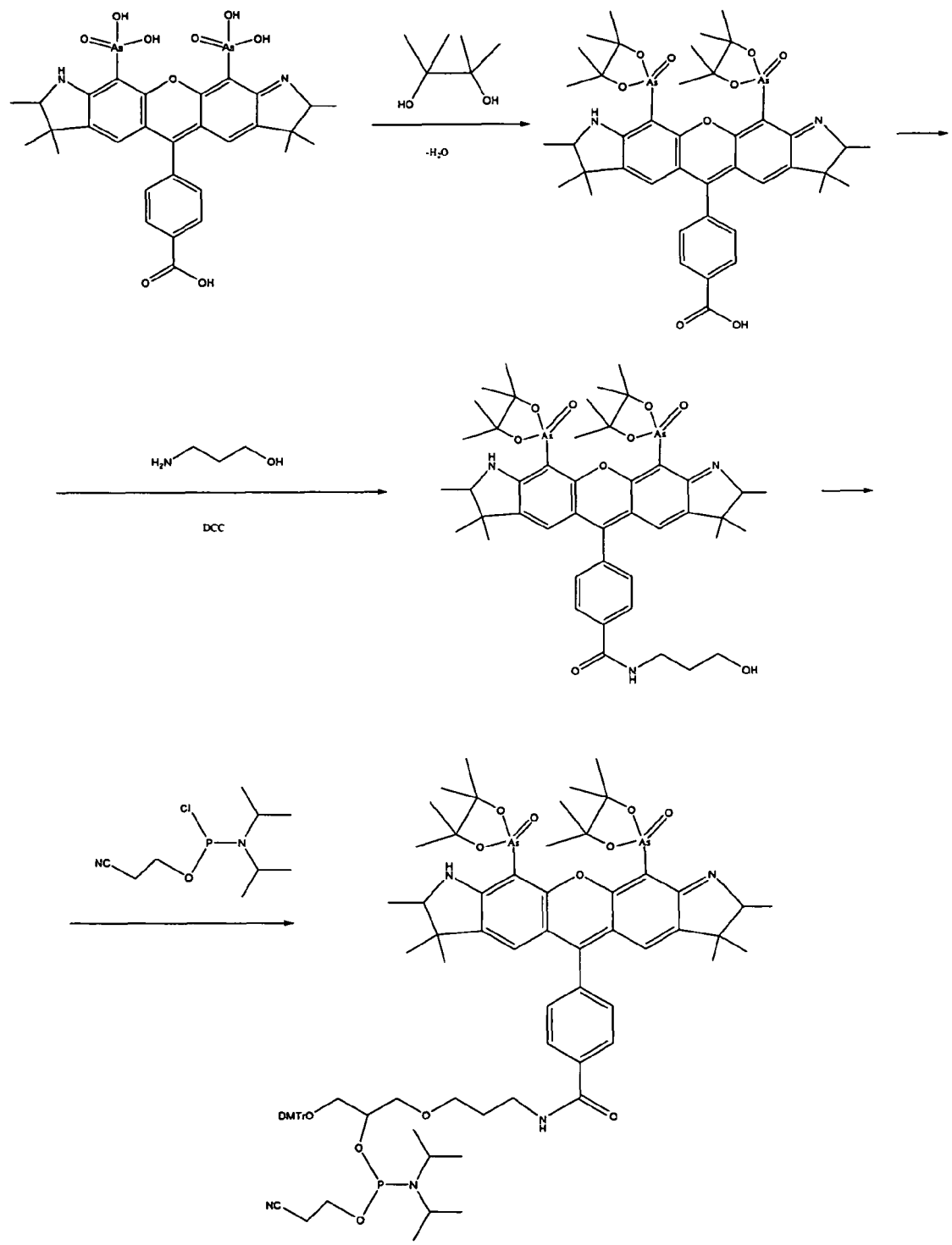
Figure 4. Synthesis of a phosphoramidite reagent for incorporation of arsonate dye into oligonucleotides using automated synthesis.

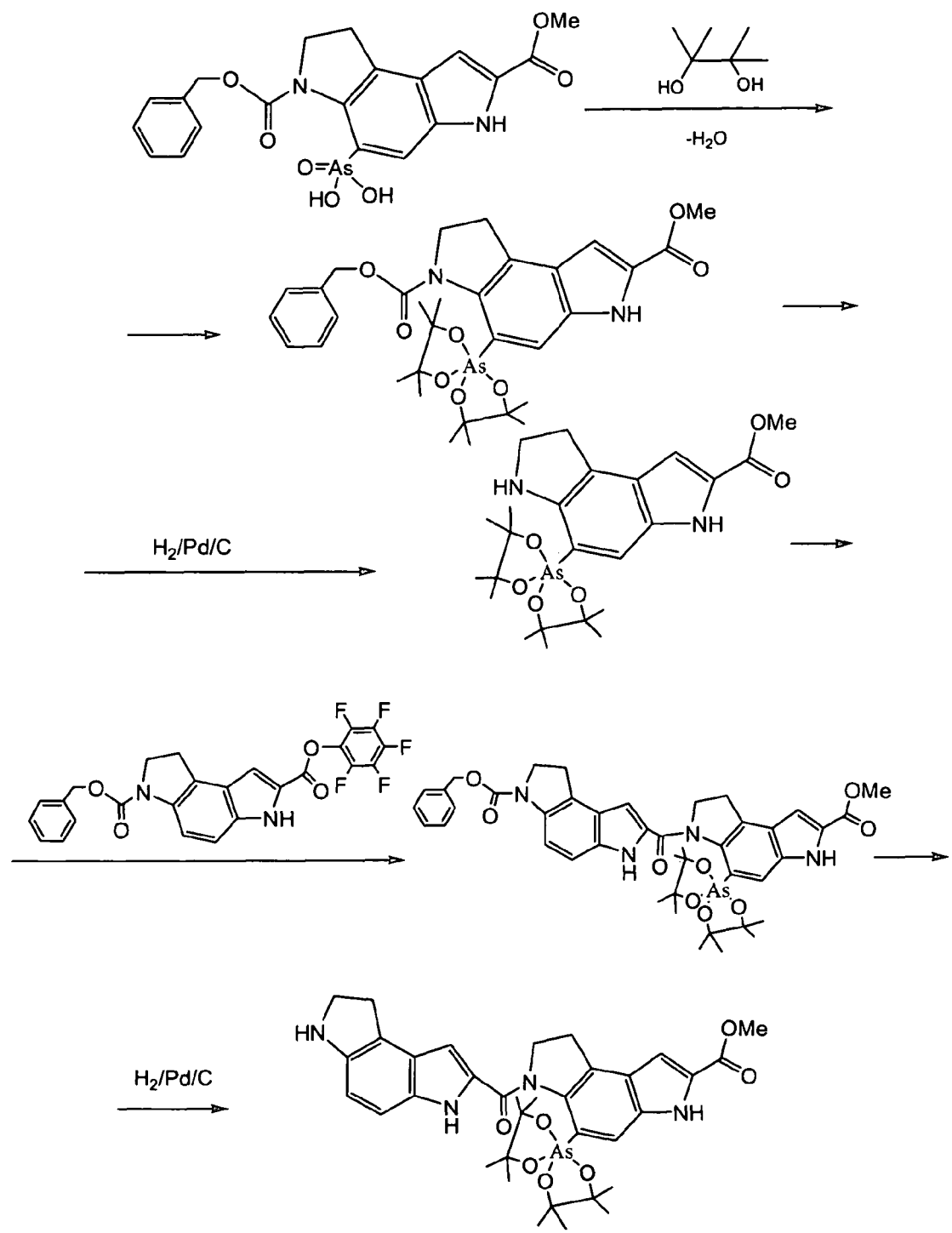
Figure 5. Synthesis of a minor groove binder intermediate containing protected arsonate group for attachment to solid support, dye and/or oligonucleotide.

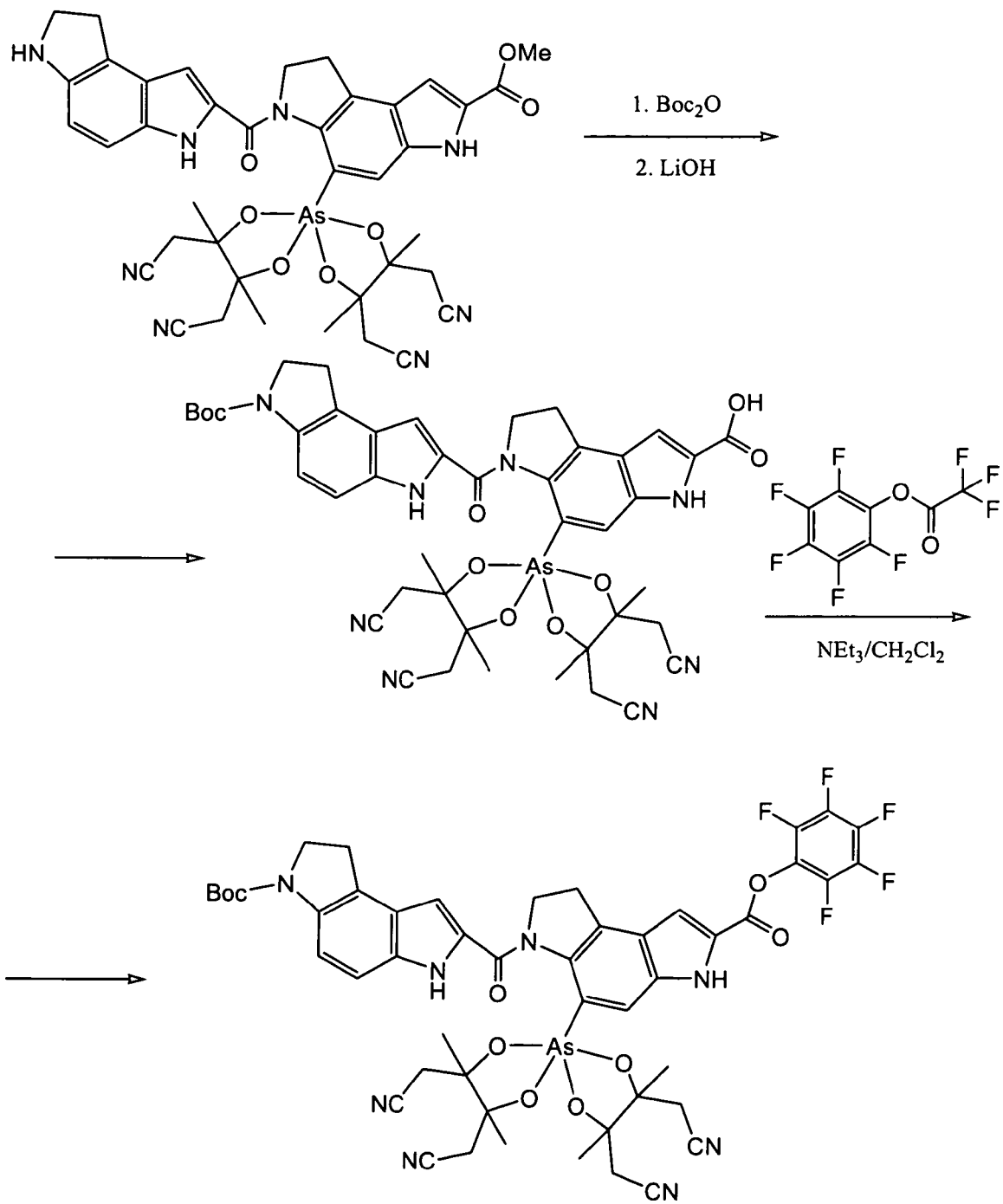
Figure 6. Synthesis of a minor groove binder intermediate containing protected arsonate group for attachment to solid support, dye and/or oligonucleotide.

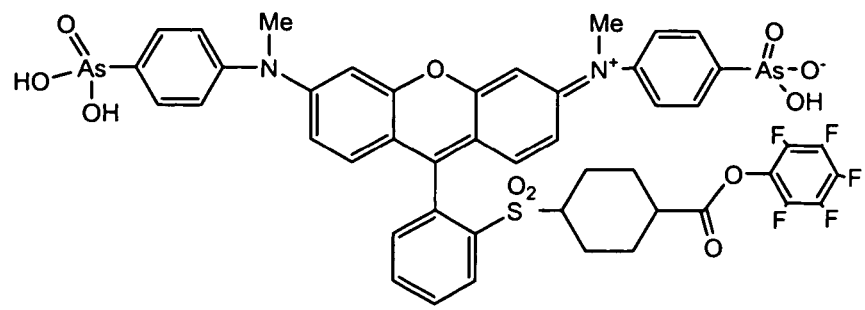
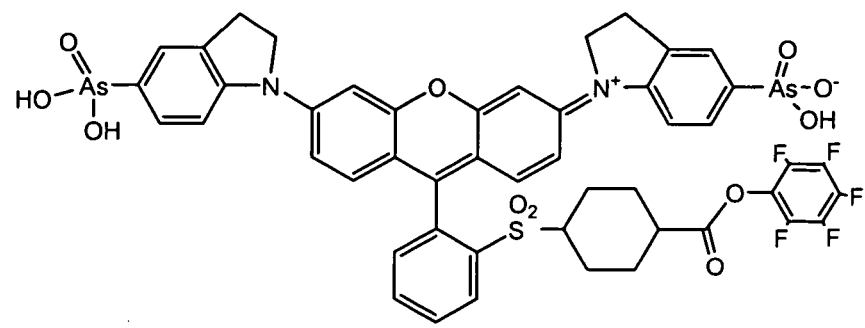
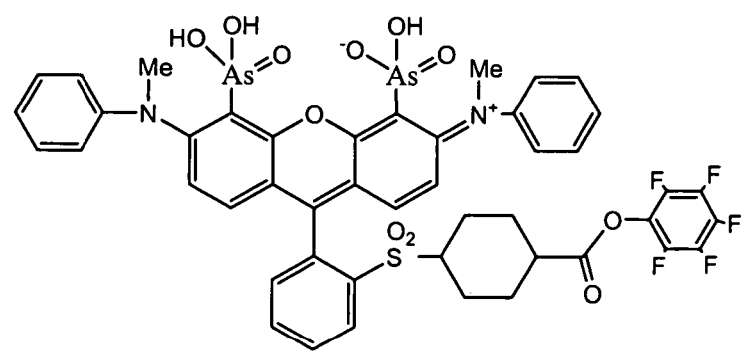
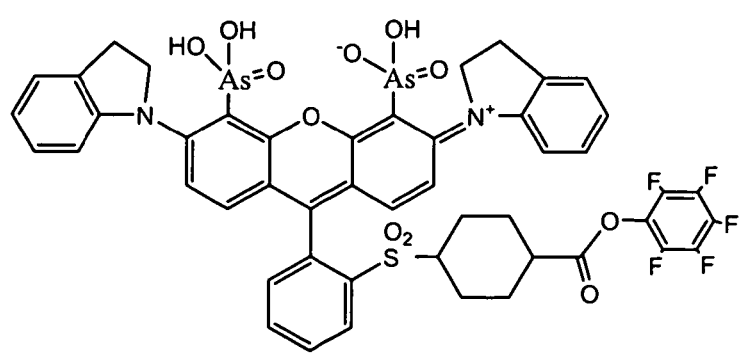
Figure 7. Polar fluorescence quenching arsonic acid rhodamine dyes, activated ester reagents.

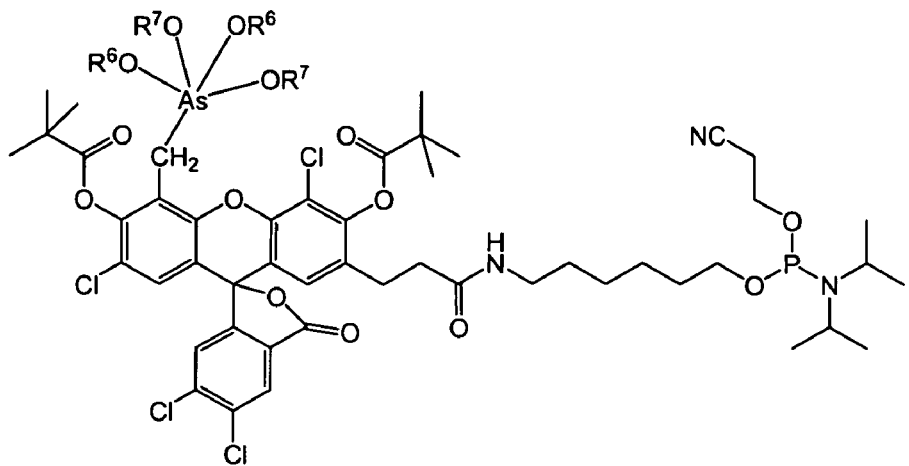
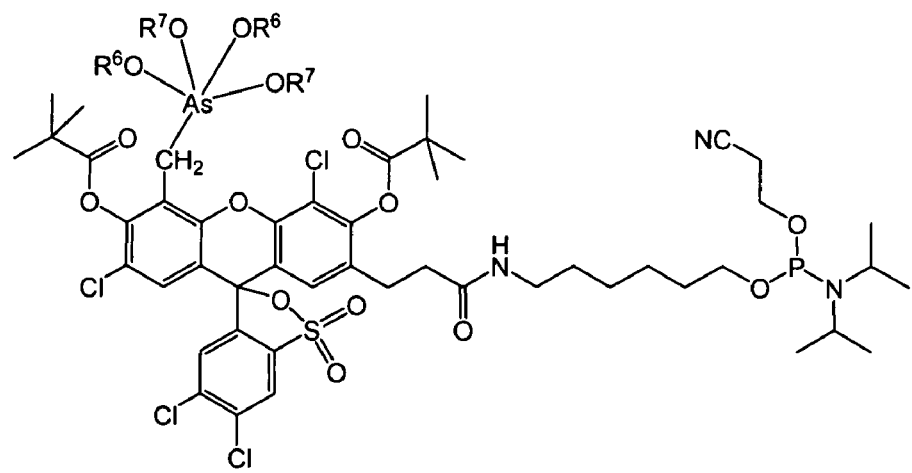
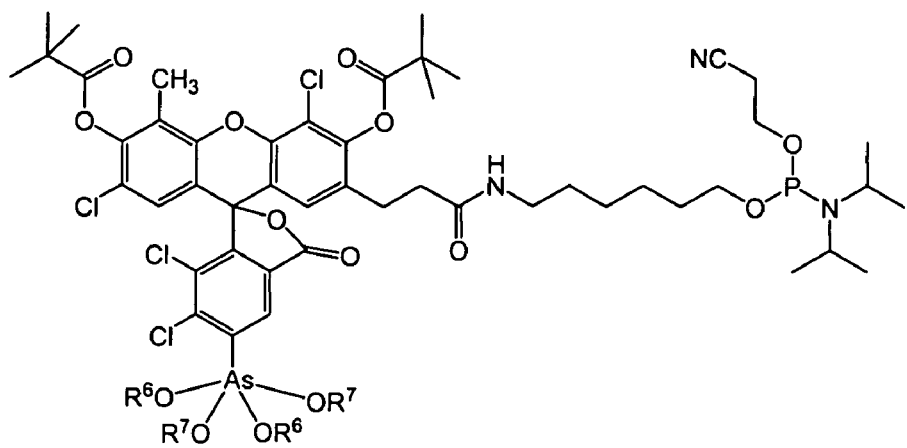
Figure 8. Ester protected arsonic acid xanthene dyes phosphoramidites.

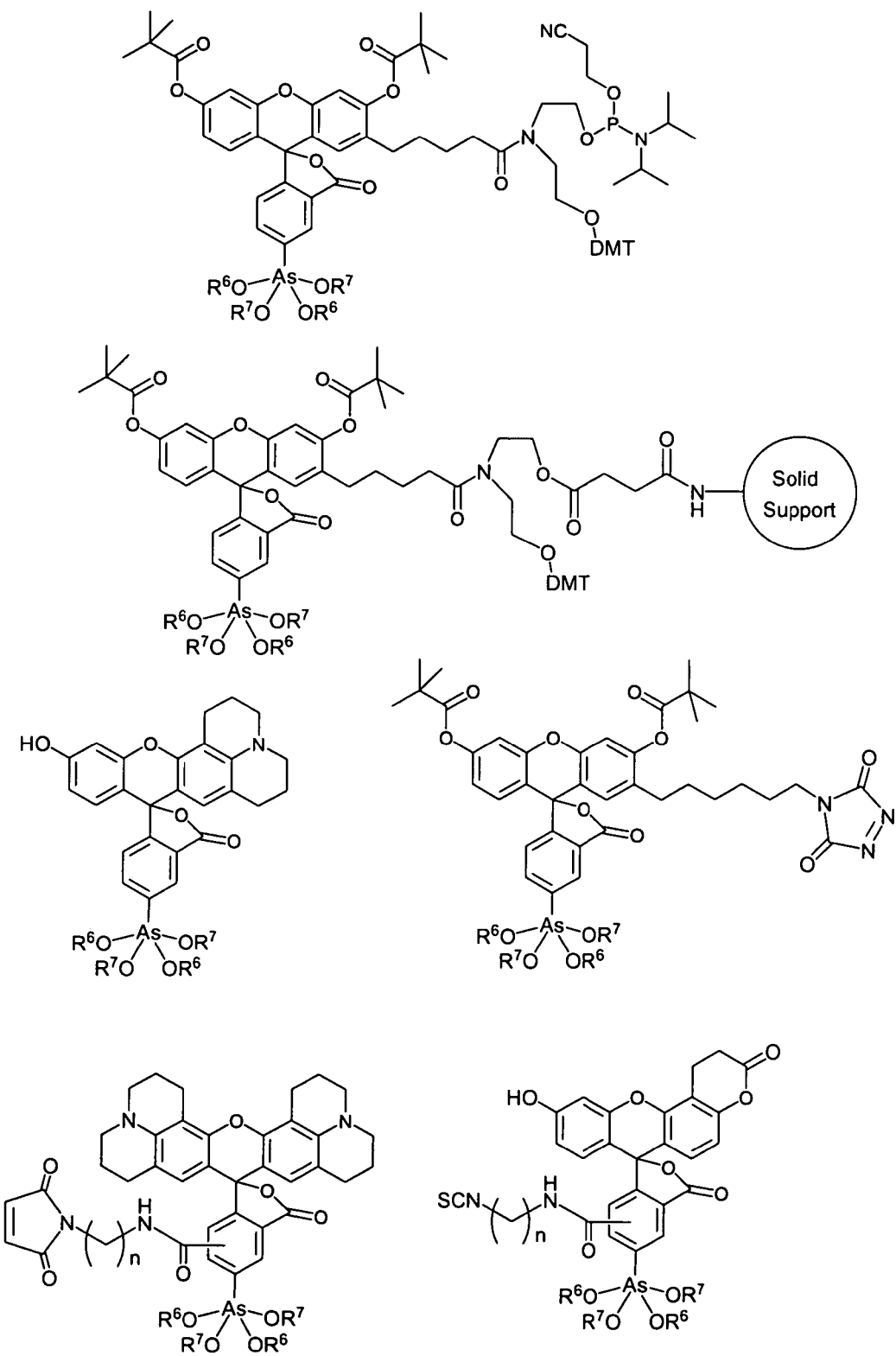
Figure 9. Ester protected arsonic acid xanthene fluorescent dyes for introduction into oligonucleotides via automated synthesis and solution conjugation.

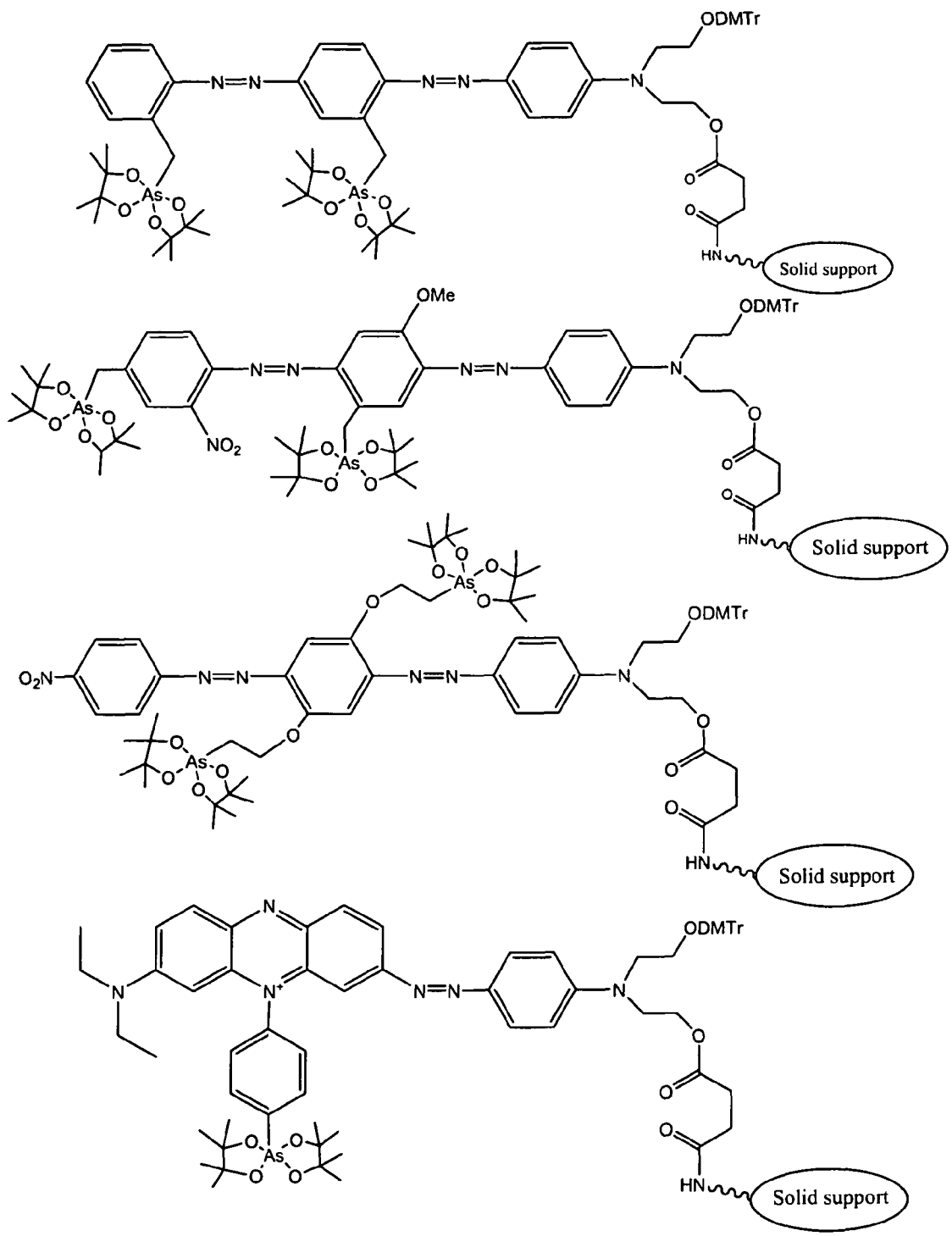
Figure 10. Polar fluorescence quenching arsonate azodyes on solid support for automated synthesis of oligonucleotides.

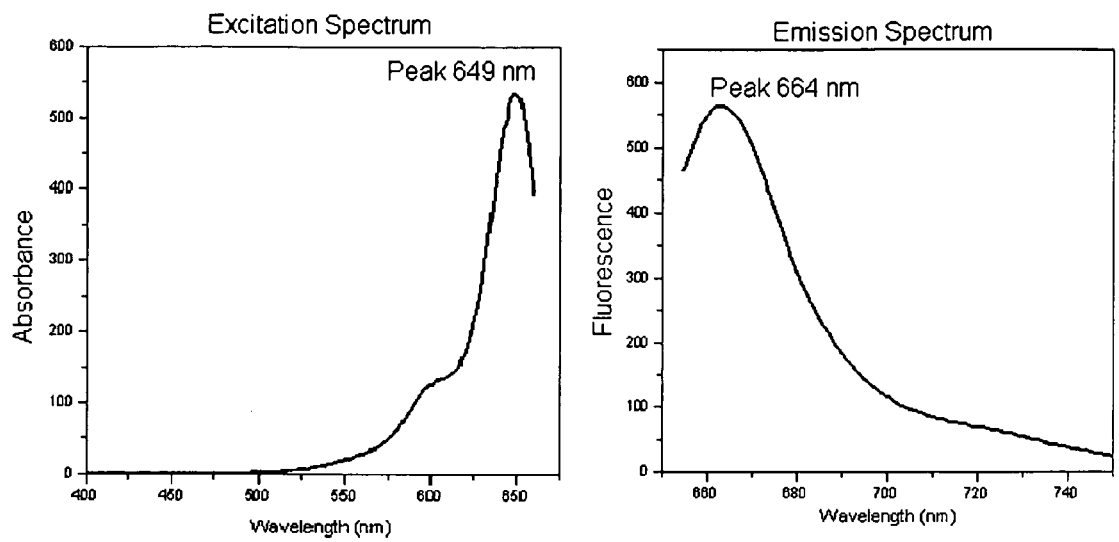
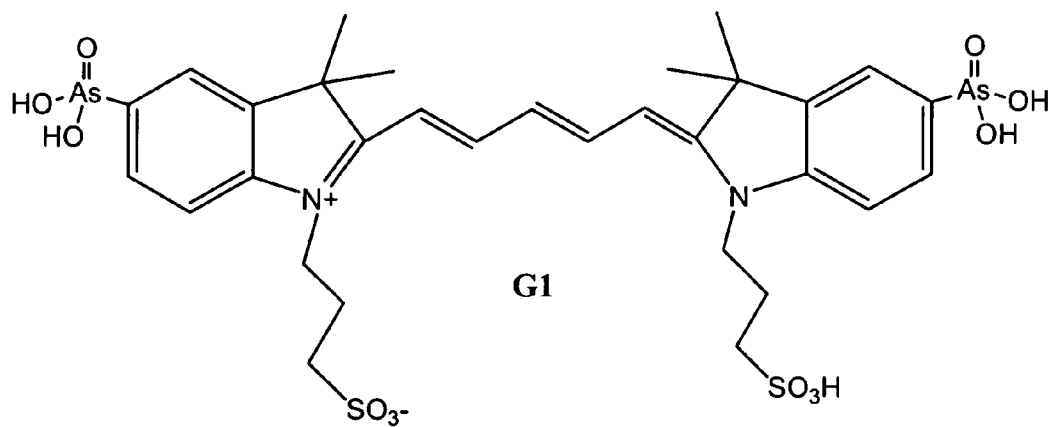
Figure 11. Excitation and emission spectra of arsonic acid carbocyanine dye G1, 1.25mM in pH 8.0 10mM Tris buffer.

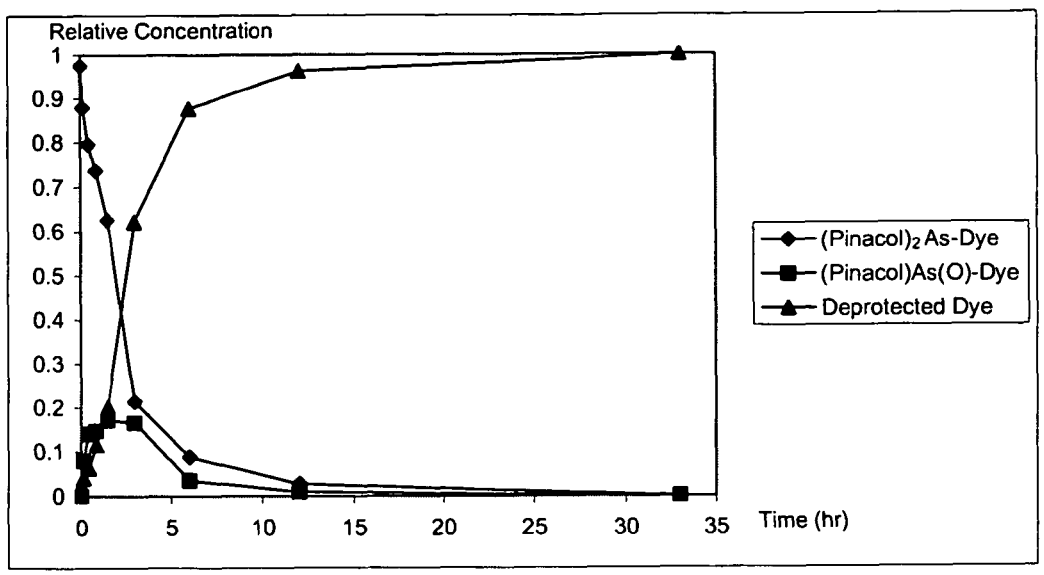
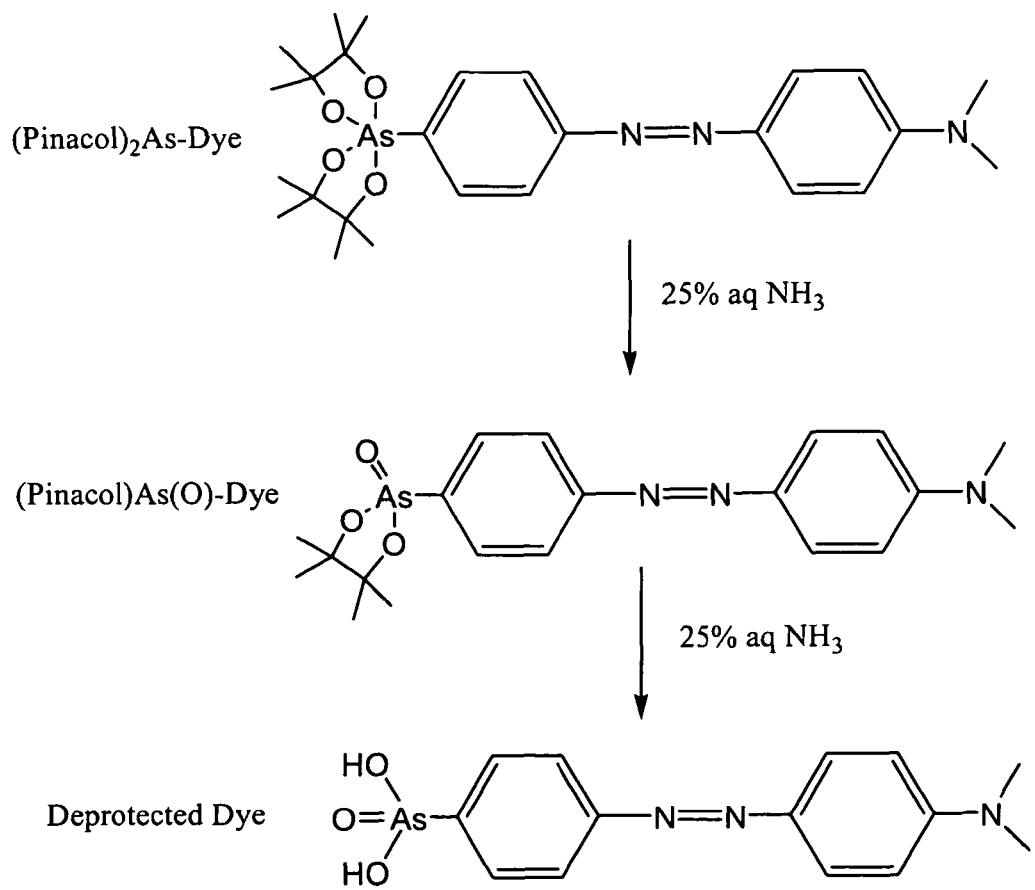
Figure 12. Kinetics of the deprotection of a model bis-pinacol-protected azodye with aqueous 25% ammonia at 20°.

POLAR DYES

BACKGROUND OF THE INVENTION

1. Field of the Invention

The present invention relates to novel fluorescent dyes, quencher dyes and minor groove binders with enhanced polarity derived from arsonic acid conjugated thereto. The present invention further relates to methods of staining cells, labeling proteins and preparing oligonucleotide probes conjugated with polar arsonate dyes under the condition of automated synthesis.

2. Description of the Related Art

Dye-labeled synthetic oligonucleotides have been used for years as sequence-specific probes for complementary DNA and RNA targets. These methods have broad applications in forensics, molecular biology and medical diagnostics since they allow the identification and quantitation of specific nucleic acid targets. Early uses of DNA probes relied on radioactive labels (typically $^{32}P$), while recent methods use reporter molecules that include chemiluminescent and fluorescent groups. Improved instrumentation has allowed the sensitivity of these spectroscopic methods to approach or surpass the radio-labeled methods. Fluorescent dyes having high quantum yield are particularly suitable for biological applications in which a highly sensitive detection reagent is desirable.

Recently developed detection methods employ the process of fluorescence resonance energy transfer (FRET) for the detection of probe hybridization rather than direct detection of fluorescence intensity. In this type of assay, FRET occurs between a donor fluorophore (reporter) and an acceptor molecule (quencher) when the absorption spectrum of the quencher molecule overlaps with the emission spectrum of the donor fluorophore and the two molecules are in close proximity. The excited-state energy of the donor fluorophore is transferred to the neighboring acceptor by a resonance dipole-induced dipole interaction, which results in quenching of the donor fluorescence. The efficiency of the energy transfer between the donor and acceptor molecules is highly dependent on distance between the molecules. Other mechanisms of fluorescence quenching are also known, such as, collisional and charge transfer quenching.

Typically, detection methods based on FRET are designed in such a way that the donor fluorophore and acceptor molecules are in close proximity so that quenching of the donor fluorescence is efficient. During the assay, the donor and acceptor molecules are separated such that fluorescence occurs. FRET-based detection assays have been developed in the fields of nucleic acid hybridization and enzymology. Several forms of the FRET hybridization assays are reviewed (Nonisotopic DNA Probe Techniques, Academic Press, Inc., San Diego 1992, pp. 311-352). Quenching can also occur through non-FRET mechanisms, such as collisional quenching (see, Wei, et al., Anal. Chem. 66:1500-1506 (1994)).

An oligonucleotide probe comprising a reporter fluorophore and a quencher is typically non-fluorescent. Such an oligonucleotide probe is, however, capable of reporting the presence of a target sequence after the hybridization occurs by emitting detectable fluorescence. Because the hybridization or PCR process alters the conformation of the oligonucleotide probe or enzymatically cleaves the dye from the probe, the reporter fluorophore and the quencher become physically separated and the fluorescence is thereby restored. Assay formats using oligonucleotide probes which become fluorescent as DNA amplification occurs in "real time" PCR are described in details in Tyagi et al., *Nat. Biotech.*, 16: 49-53 (1998) and Lee et al., *Nucl. Acid Res.*, 21: 3761-3766 (1993). Fluorophore-oligonucleotide-quencher conjugates useful as DNA probes in real time PCR are further described in details in U.S. Pat. Nos. 6,727,356, 6,653,473 and 6,323,337.

Fluorescent dyes and quenchers, however, may substantially change the physical properties of nucleic acids probes due to their generally hydrophobic nature. This is a particularly difficult problem when the probe has more than one dye conjugated thereto or when the probe contains purine-rich sequences or other hydrophobic residues like minor groove binders or intercalators.

This problem has been partially resolved by introducing dyes containing several polar groups, usually sulfonic groups, to a probe. Sulfonic groups bring negative charge to the dye molecule, and the charge decreases the inherent tendency of molecules to form aggregates due to increased polarity imparted by the sulfonyl moieties [Mujumdar R. B., Ernst L. A., Mujumdar S. R., Lewis C. J., Waggoner A. S. (1993) Cyanine dye labeling reagents: sulfoindocyanine succinimidyl esters. *Bioconj. Chem.* 4: 105-111]. Ring sulfonation also increases the brightness of many dyes such as Cy3, Cy5 [Wessendorf M. W., Brelje T. C. (1992) Which fluorophore is brightest? A comparison of staining obtained using fluorescein, tetramethylrhodamine, lissamine rhodamine, Texas Red and Cyanine 3.18. *Histochemistry* 98, pp 81-85] Cascade Blue [Whitaker J. E., Haugland R. P., Moore P. L., Hewitt P. C., Resse M., Haugland R. P. (1991) Cascade Blue derivatives: water soluble, reactive, blue emission dyes evaluated as fluorescent labels and tracers. *Anal. Biochem.* 198, pp 119-130] in aqueous media and remarkably increases photostability of rhodamine dyes [Panchuk-Voloshina N., Haugland R. P., Bishop-Stewart J., Bhalgat M. K., Millard P. J., Mao F., Leung W.-Y., Haugland R. P. (1999) Alexa Dyes, a Series of New Fluorescent Dyes that Yield Exceptionally Bright, Photostable Conjugates. *J Histochem Cytochem* 47(9), pp 1179-1188]. Some of these dyes are available commercially from Molecular Probes, Inc. and known under trademark Alexa Fluor® dyes. These water-soluble dyes are sold as activated succinimidyl esters and are popular labels for proteins and nucleic acids. Polar sulfonyl fluorescent dyes are described in U.S. Pat. Nos. 6,130,101, 5,268,486 and 6,399,392.

There remains a need in the art to provide polar dyes for biological staining, oligonucleotide probes and proteins conjugated to polar dyes with improved properties such as retaining high quantum yields and hydrophilicity, and to provide such dye-labeled probes by automated synthesis.

BRIEF SUMMARY OF THE INVENTION

The present invention provides novel dyes comprising at least one arsonate group, and oligonucleotide probes and proteins conjugated to the same. The present invention further provides methods of making oligonucleotides labeled with arsonate-containing dyes via automated synthesis and method of using the arsonate dye labeled oligonucleotides.

Thus, in one embodiment, the present invention provides a polar fluorescent dye comprising a fluorescent compound substituted with one or more arsonate groups, the fluorescent compound having an excitation between 340 nm and 1100 nm and fluorescence emission maximum between 440 and 1150 nm.

In another embodiment, the present invention provides a compound of Formula (I):

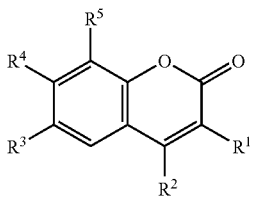

wherein, $R^1$ is hydrogen, alkyl, —CHO, —NO$_2$, —CH$_2$R$^{11}$, —As(=O)(OR$^6$)(OR$^7$) or —As(OR$^6$)$_2$(OR$^7$)$_2$ or -L-R$_x$;

$R^2$ is hydrogen, —CN, alkyl, aralkyl, haloalkyl or —CH$_2$R$^{11}$;

$R^3$ is hydrogen, alkyl, halogen, —As(=O)(OR$^6$)(OR$^7$) or —AS(OR$^6$)$_2$(OR$^7$)$_2$;

$R^4$ is —NR$^{12}$R$^{13}$, wherein R$^{12}$ and R$^{13}$ are the same or different and independently H, alkyl, aryl, alkylcarbonyl, arylcarbonyl or R$^{12}$ and R$^{13}$ together form a heterocycle;

$R^5$ is hydrogen, halogen, —As(=O)(OR$^6$)(OR$^7$) or —As(OR$^6$)$_2$(OR$^7$)$_2$;

$R^6$ and $R^7$ are the same or different and independently H, alkyl, aryl, or heteroaryl; or $R^6$ and $R^7$ are linked together to form a 5 or 6-member heterocycle comprising the arsenic and the two oxygen atoms to which R$^6$ and R$^7$ are attached, wherein —R$^6$—R$^7$— is —[C(R$^8$)$_2$]$_w$— (w is 2 or 3), wherein each R$^8$ is the same or different and independently hydrogen, hydroxy, cyano, —OC(O)-alkyl, —OC(O)-aryl, alkyl, aryl, alkylcarbonyl, arylcarbonyl, —CH$_2$CN, —CH$_2$SO$_2$Me, —CH$_2$SO$_2$Ph, or two R$^8$ of adjacent carbons together with the carbons to which they are attached form an aryl or heteroaryl, or two R$^8$ of the same carbon form an oxo;

R$^{11}$ is —COOH, —As(=O)(OR$^6$)(OR$^7$) or —As(OR$^6$)$_2$(OR$^7$)$_2$;

L is a single covalent bond or a covalent linkage having 1-30 non-hydrogen atoms selected from the group consisting of C, N, O and S and is composed of any combination of single, double, triple or aromatic carbon-carbon bonds, carbon-nitrogen bonds, nitrogen-nitrogen bonds, carbon-oxygen bonds and carbon-sulfur bonds; and R$_x$ is a reactive group, provided, at least one of R$^1$, R$^3$, R$^5$ and R$^{11}$ is —As(=O)(OR$^6$)(OR$^7$) or —As(OR$^6$)$_2$(OR$^7$)$_2$.

In another embodiment, the present invention provides compound of Formula (II):

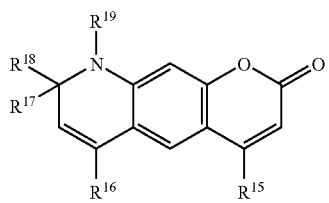

wherein, $R^{15}$ is hydrogen, alkyl, aralkyl, haloalkyl or —CN;

$R^{16}$ is —CH$_2$As(=O)(OR$^6$)(OR$^7$) or —CH$_2$As(OR$^6$)$_2$(OR$^7$)$_2$;

$R^6$ and $R^7$ are the same or different and independently H, alkyl, aryl, or heteroaryl; or $R^6$ and $R^7$ are linked together to form a 5 or 6-member heterocycle comprising the arsenic and the two oxygen atoms to which R$^6$ and R$^7$ are attached, wherein —R$^6$—R$^7$— is —[C(R$^8$)$_2$]$_w$— (w is 2 or 3), wherein each R$^8$ is the same or different and independently hydrogen, hydroxy, cyano, —OC(O)-alkyl, —OC(O)-aryl, alkyl, aryl, alkylcarbonyl, arylcarbonyl, —CH$_2$CN, —CH$_2$SO$_2$Me, —CH$_2$SO$_2$Ph, or two R$^8$ of adjacent carbons together with the carbons to which they are attached form an aryl or heteroaryl, or two R$^8$ of the same carbon form an oxo;

$R^{17}$ and $R^{18}$ are the same or different and independently hydrogen, alkyl or haloalkyl;

$R^{19}$ is hydrogen, alkyl optionally substituted with hydroxy, halogen, —COOH or —SO$_2$OH, aryl optionally substituted with hydroxy, halogen, —COOH or —SO$_2$OH, or -L-R$_x$;

L is a single covalent bond or a covalent linkage having 1-30 non-hydrogen atoms selected from the group consisting of C, N, O and S and is composed of any combination of single, double, triple or aromatic carbon-carbon bonds, carbon-nitrogen bonds, nitrogen-nitrogen bonds, carbon-oxygen bonds and carbon-sulfur bonds; and R$_x$ is a reactive group.

In another embodiment, the present invention provides compound of Formula (III):

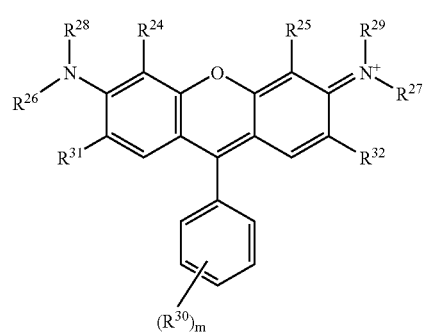

wherein, m is 1, 2, 3, 4 or 5;

$R^{24}$ and $R^{25}$ are the same or different and independently hydrogen, alkyl, halogen, —As(=O)(OR$^6$)(OR$^7$) or —As(OR$^6$)$_2$(OR$^7$)$_2$;

$R^{26}$, $R^{27}$ $R^{28}$ and $R^{29}$ are the same or different and independently hydrogen, alkyl or aryl optionally substituted by —As(=O)(OR$^6$)(OR$^7$) or —As(OR$^6$)$_2$(OR$^7$)$_2$;

$R^{31}$ are $R^{32}$ are the same or different and independently hydrogen, alkyl, halogen, —As(=O)(OR$^6$)(OR$^7$) or —As(OR$^6$)$_2$(OR$^7$)$_2$;

each $R^{30}$ is independently hydrogen, —C(O)R$^{33}$, halogen, alkyl, aralkyl, aryl, alkylthio, alkylcarbonyl, arylcarbonyl, —SO$_2$R$^{33}$, —As(=O)(OR$^6$)(OR$^7$), —As(OR$^6$)$_2$(OR$^7$)$_2$ or -L-R$_x$;

$R^{33}$ is hydroxy, —NH(CH$_2$)$_j$SO$_3$R$^{34}$, —NH(CH$_2$)$_j$As(=O)(OR$^{34}$)$_2$, —NH(CH$_2$)$_j$COOR$^{34}$, —NH(CH$_2$)$_j$OR$^{34}$ or —NH(CH$_2$)$_j$N(R$^{34}$)$_2$ (j is an integer between 2-6);

each $R^{34}$ is the same or different and independently hydrogen, alkyl, aryl or heteroaryl;

$R^{24}$ and $R^{28}$ may optionally form a 5 or 6-member heterocycle;

$R^{25}$ and $R^{29}$ may optionally form a 5 or 6-member heterocycle;

$R^{26}$ and $R^{28}$ may optionally form a 5-9 member heterocycle optionally substituted by —As(=O)(OR$^6$)(OR$^7$) or —As(OR$^6$)$_2$(OR$^7$)$_2$;

$R^{27}$ and $R^{29}$ may optionally form a 5-9 member heterocycle optionally substituted by —As(=O)(OR$^6$)(OR$^7$) or —As(OR$^6$)$_2$(OR$^7$)$_2$;

$R^{26}$ and $R^{31}$ may optionally form a 5 or 6-member heterocycle optionally substituted with hydrogen, alkyl —CH$_2$As(=O)(OR$^6$)(OR$^7$) or —CH$_2$As(OR$^6$)$_2$(OR$^7$)$_2$;

$R^{27}$ and $R^{32}$ may optionally form a 5 or 6-member heterocycle optionally substituted with hydrogen, alkyl —CH$_2$As(=O)(OR$^6$)(OR$^7$) or —CH$_2$As(OR$^6$)$_2$(OR$^7$)$_2$;

$R^6$ and $R^7$ are the same or different and independently H, alkyl, aryl, or heteroaryl; or $R^6$ and $R^7$ are linked together to form a 5 or 6-member heterocycle comprising the arsenic and the two oxygen atoms to which $R^6$ and $R^7$ are attached, wherein —R$^6$—R$^7$— is —[C(R$^8$)$_2$]$_w$— (w is 2 or 3), wherein each R$^8$ is the same or different and independently hydrogen, hydroxy, cyano, —OC(O)-alkyl, —OC(O)-aryl, alkyl, aryl, alkylcarbonyl, arylcarbonyl, —CH$_2$CN, —CH$_2$SO$_2$Me, —CH$_2$SO$_2$Ph, or two R$^8$ of adjacent carbons together with the carbons to which they are attached form an aryl or heteroaryl, or two R$^8$ of the same carbon form an oxo; and L is a single covalent bond or a covalent linkage having 1-30 non-hydrogen atoms selected from the group consisting of C, N, O and S and is composed of any combination of single, double, triple or aromatic carbon-carbon bonds, carbon-nitrogen bonds, nitrogen-nitrogen bonds, carbon-oxygen bonds and carbon-sulfur bonds; and $R_x$ is a reactive group, provided, at least one of the $R^{24}$, $R^{25}$, $R^{26}$ $R^{27}$, $R^{28}$, $R^{29}$, $R^{30}$, $R^{31}$, $R^{32}$ and $R^{33}$ is or comprises —As(=O)(OR$^6$)(OR$^7$) or —As(OR$^6$)$_2$(OR$^7$)$_2$.

In another embodiment, the present invention provides compound of Formula (IV)

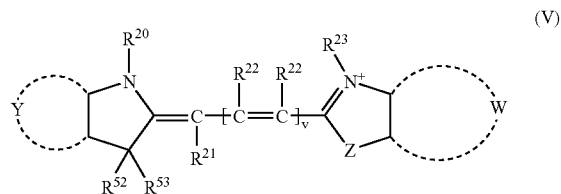

(IV)

wherein, each $R^{35}$ is the same or different and independently hydrogen, halogen, —NO$_2$, —CN, —SO$_3^-$, alkoxy, amine, dialkylamine, monoalkylamine, —N=N—R$^{39}$, —As(=O)(OR$^6$)(OR$^7$) or —As(OR$^6$)$_2$(OR$^7$)$_2$;

n is 1, 2 or 3;

p is 1 or 2;

each $R^{36}$ is the same or different and independently hydrogen, halogen, —NO$_2$, —CN, —SO$_3^-$, alkoxy, amine, dialkylamine, monoalkylamine, —N=N—R$^{39}$, —As(=O)(OR$^6$)(OR$^7$) or —As(OR$^6$)$_2$(OR$^7$)$_2$;

$R^6$ and $R^7$ are the same or different and independently H, alkyl, aryl, or heteroaryl; or $R^6$ and $R^7$ are linked together to form a 5 or 6-member heterocycle comprising the arsenic and the two oxygen atoms to which $R^6$ and $R^7$ are attached, wherein —R$^6$—R$^7$— is —[C(R$^8$)$_2$]$_w$— (w is 2 or 3), wherein each R$^8$ is the same or different and independently hydrogen, hydroxy, cyano, —OC(O)-alkyl, —OC(O)-aryl, alkyl, aryl, alkylcarbonyl, arylcarbonyl, —CH$_2$CN, —CH$_2$SO$_2$Me, —CH$_2$SO$_2$Ph, or two R$^8$ of adjacent carbons together with the carbons to which they are attached form an aryl or heteroaryl, or two R$^8$ of the same carbon form an oxo;

$R^{37}$ and $R^{38}$ are the same or different and independently hydrogen, alkyl, aralkyl, aryl or -L-R$_x$;

$R^{39}$ is aryl or heteroaryl optionally substituted with one or more —As(=O)(OR$^6$)(OR$^7$) or —As(OR$^6$)$_2$(OR$^7$)$_2$;

L is a single covalent bond or a covalent linkage having 1-30 non-hydrogen atoms selected from the group consisting of C, N, O and S and is composed of any combination of single, double, triple or aromatic carbon-carbon bonds, carbon-nitrogen bonds, nitrogen-nitrogen bonds, carbon-oxygen bonds and carbon-sulfur bonds; and $R_x$ is a reactive group, provided, at least one of the $R^{35}$ and $R^{36}$ is —As(=O)(OR$^6$)(OR$^7$) or —As(OR$^6$)$_2$(OR$^7$)$_2$.

In another embodiment, the present invention provides compound of Formula (V):

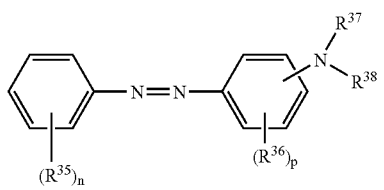

(V)

wherein, v is 0, 1, 2, 3, 4, 5 or 6;

Y represents atoms necessary to form one or two fused aromatic rings having 6 atoms in each ring, each ring atom is the same or different and independently =CR$^{46}$—, =N$^+$R$^{47}$— or =N—;

W represents atoms necessary to form one or two fused aromatic rings having 6 atoms in each ring, each ring atom is the same or different and independently =CR$^{46}$—, =N$^+$R$^{47}$— or =N—;

Z is —O—, —S—, —Se—, —C(R$^{48}$)$_2$— or —NR$^{49}$—;

$R^{20}$ and $R^{23}$ are the same or different and independently alkyl, aralkyl or substituted alkyl substituted with hydroxy, cyano, nitro, amino, sulfonyl, phosphonyl, —As(=O)(OR$^6$)(OR$^7$), —As(OR$^6$)$_2$(OR$^7$)$_2$, —COOH, alkoxy, monoalkylamino, dialkylamino or trialkylamonium or L-R$_x$;

$R^{52}$ and $R^{53}$ are the same or different and independently hydrogen, alkyl, alkyl substituted hydroxy, —COOH, halogen, cyano, nitro, amine, alkylamino, dialkylamino, sulfonyl, phosphonyl, —As(=O)(OR$^6$)(OR$^7$), As(OR$^6$)$_2$(OR$^7$)$_2$ or L-R$_x$;

$R^{21}$ and each $R^{22}$ are the same or different and independently hydrogen, halogen, alkoxy, hydroxy, mercapto, aryloxy, heterocycle, iminium ion, L-R$_x$, or two adjacent $R^{21}$ and $R^{22}$ or any two adjacent $R^{22}$ form a 4, 5 or 6 member carbocycle, optionally substituted with alkyl, halogen or oxo; or two $R^{22}$ that are one carbon away from each other, together with the carbons to which they are attached, form a 4, 5 or 6 member carbocycle, optionally substituted with alkyl, halogen, alkylthio, arylthio, alkoxy, aryloxy, oxo (=O), =S or =C(R$^{50}$)$_2$;

each $R^{46}$ and $R^{47}$ is the same or different and independently hydrogen, alkyl, aryl, halogen, cyano, nitro, amine, alkylamino, dialkylamino, sulfonyl, phosphonyl, —As(=O)(OR$^6$)(OR$^7$), As(OR$^6$)$_2$(OR$^7$)$_2$ or L-R$_x$;

each $R^{48}$ and $R^{49}$ is the same or different and independently hydrogen or alkyl optionally substituted with hydroxy, —COOH, halogen, cyano, nitro, amine, alkylamino, dialkylamino, sulfonyl, phosphonyl, —As(=O)(OR$^6$)(OR$^7$), As(OR$^6$)$_2$(OR$^7$)$_2$ or L-R$_x$;

each R$^{50}$ is the same or different and independently hydrogen, alkyl, cyano, —C(O)NHR$^{48}$;

R$^6$ and R$^7$ are the same or different and independently H, alkyl, aryl, or heteroaryl; or R$^6$ and R$^7$ are linked together to form a 5 or 6-member heterocycle comprising the arsenic and the two oxygen atoms to which R$^6$ and R$^7$ are attached, wherein —R$^6$—R$^7$— is —[C(R$^8$)$_2$]$_w$— (w is 2 or 3), wherein each R$^8$ is the same or different and independently hydrogen, hydroxy, cyano, —OC(O)-alkyl, —OC(O)-aryl, alkyl, aryl, alkylcarbonyl, arylcarbonyl, —CH$_2$CN, —CH$_2$SO$_2$Me, —CH$_2$SO$_2$Ph, or two R$^8$ of adjacent carbons together with the carbons to which they are attached form an aryl or heteroaryl, or two R$^8$ of the same carbon form an oxo;

L is a single covalent bond or a covalent linkage having 1-30 non-hydrogen atoms selected from the group consisting of C, N, O and S and is composed of any combination of single, double, triple or aromatic carbon-carbon bonds, carbon-nitrogen bonds, nitrogen-nitrogen bonds, carbon-oxygen bonds and carbon-sulfur bonds; and R$_x$ is a reactive group, provided, at least one of the R$^{20}$, R$^{23}$ R$^{46}$, R$^{47}$, R$^{48}$, R$^{49}$, R$^{52}$ and R$^{53}$ is —As(=O)(OR$^6$)(OR$^7$) or As(OR$^6$)$_2$(OR$^7$)$_2$.

In another embodiment, the present invention provides compound of Formula (VI):

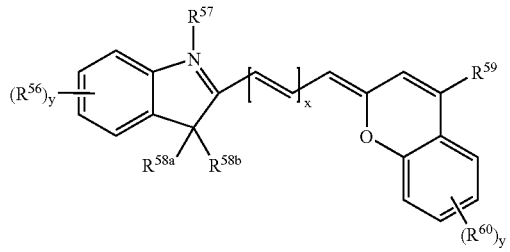

(VI)

wherein, y is 1, 2 or 3;

x is 0, 1, 2, or 3;

each R$^{56}$ is the same or different and independently hydrogen, halogen, hydroxy, —As(=O)(OR$^6$)(OR$^7$) or —As(OR$^6$)$_2$(OR$^7$)$_2$;

R$^6$ and R$^7$ are the same or different and independently H, alkyl, aryl, or heteroaryl; or R$^6$ and R$^7$ are linked together to form a 5 or 6-member heterocycle comprising the arsenic and the two oxygen atoms to which R$^6$ and R$^7$ are attached, wherein —R$^6$—R$^7$— is —[C(R$^8$)$_2$]$_w$— (w is 2 or 3), wherein each R$^8$ is the same or different and independently hydrogen, hydroxy, cyano, —OC(O)-alkyl, —OC(O)-aryl, alkyl, aryl, alkylcarbonyl, arylcarbonyl, —CH$_2$CN, —CH$_2$SO$_2$Me, —CH$_2$SO$_2$Ph, or two R$^8$ of adjacent carbons together with the carbons to which they are attached form an aryl or heteroaryl, or two R$^8$ of the same carbon form an oxo;

R$^{57}$ is alkyl, aralkyl or alkyl substituted with hydroxy, cyano, nitro, amino, sulfonyl, phosphonyl, —As(=O)(OR$^6$)(OR$^7$), —As(OR$^6$)$_2$(OR$^7$)$_2$, —COOH, alkoxy, monoalkylamino, dialkylamino or trialkylamonium or L-R$_x$;

R$^{58a}$ and R$^{58b}$ are the same or different and independently hydrogen, alkyl, alkyl substituted with hydroxy, —COOH, halogen, cyano, nitro, amine, alkylamino, dialkylamino, sulfonyl, phosphonyl, —As(=O)(OR$^6$)(OR$^7$), As(OR$^6$)$_2$(OR$^7$)$_2$ or L-R$_x$;

R$^{59}$ is hydrogen, alkyl or aralkyl;

each R$^{60}$ is the same or different and independently hydrogen, —NR$^{61a}$R$^{61b}$, alkyl, aryl, —As(=O)(OR$^6$)(OR$^7$), —As(OR$^6$)$_2$(OR$^7$)$_2$;

each R$^{61a}$ and R$^{61b}$ is the same or different and independently hydrogen, alkyl, alkyl substituted with hydroxy, —COOH, halogen, cyano, nitro, amine, alkylamino, dialkylamino, sulfonyl, phosphonyl, —As(=O)(OR$^6$)(OR$^7$), As(OR$^6$)$_2$(OR$^7$)$_2$ or L-R$_x$;

L is a single covalent bond or a covalent linkage having 1-30 non-hydrogen atoms selected from the group consisting of C, N, O and S and is composed of any combination of single, double, triple or aromatic carbon-carbon bonds, carbon-nitrogen bonds, nitrogen-nitrogen bonds, carbon-oxygen bonds and carbon-sulfur bonds; and R$_x$ is a reactive group, provided, at least one of R$^{56}$, R$^{58a}$, R$^{58b}$, R$^{60}$ and R$^{61a}$ and R$^{61b}$ is or comprises —As(=O)(OR$^6$)(OR$^7$) or —As(OR$^6$)$_2$(OR$^7$)$_2$.

In another embodiment, the present invention provides compound of Formula (VII):

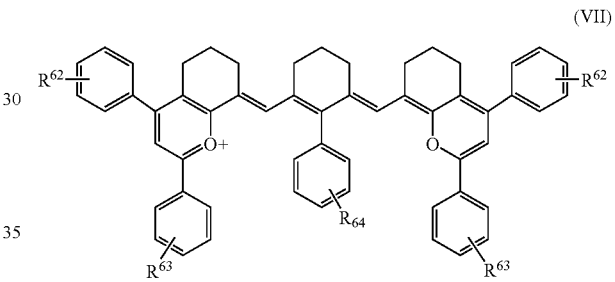

(VII)

wherein, each R$^{62}$ is the same or different and independently hydrogen, halogen, hydroxy, —As(=O)(OR$^6$)(OR$^7$) or —As(OR$^6$)$_2$(OR$^7$)$_2$, alkyl, alkyl substituted with hydroxy, —COOH, halogen, cyano, nitro, amine, alkylamino, dialkylamino, sulfonyl, phosphonyl, —As(=O)(OR$^6$)(OR$^7$), As(OR$^6$)$_2$(OR$^7$)$_2$ or L-R$_x$;

R$^6$ and R$^7$ are the same or different and independently H, alkyl, aryl, or heteroaryl; or R$^6$ and R$^7$ are linked together to form a 5 or 6-member heterocycle comprising the arsenic and the two oxygen atoms to which R$^6$ and R$^7$ are attached, wherein —R$^6$—R$^7$— is —[C(R$^8$)$_2$]$_w$— (w is 2 or 3), wherein each R$^8$ is the same or different and independently hydrogen, hydroxy, cyano, —OC(O)-alkyl, —OC(O)-aryl, alkyl, aryl, alkylcarbonyl, arylcarbonyl, —CH$_2$CN, —CH$_2$SO$_2$Me, —CH$_2$SO$_2$Ph, or two R$^8$ of adjacent carbons together with the carbons to which they are attached form an aryl or heteroaryl, or two R$^8$ of the same carbon form an oxo;

each R$^{63}$ and R$^{64}$ are the same or different and independently hydrogen, halogen, hydroxy, —As(=O)(OR$^6$)(OR$^7$) or —As(OR$^6$)$_2$(OR$^7$)$_2$, alkyl, alkyl substituted with hydroxy, —COOH, halogen, cyano, nitro, amine, alkylamino, dialkylamino, sulfonyl, phosphonyl, —As(=O)(OR$^6$)(OR$^7$), As(OR$^6$)$_2$(OR$^7$)$_2$ or L-R$_x$;

L is a single covalent bond or a covalent linkage having 1-30 non-hydrogen atoms selected from the group consisting of C, N, O and S and is composed of any combination of single, double, triple or aromatic carbon-carbon bonds, carbon-nitrogen bonds, nitrogen-nitrogen bonds, carbon-oxygen bonds and carbon-sulfur bonds; and $R_x$ is a reactive group, provided, at least one of $R^{62}$, $R^{63}$ and $R^{64}$ is or comprises —As(=O)(OR$^6$)(OR$^7$) or —As(OR$^6$)$_2$(OR$^7$)$_2$.

In another embodiment, the present invention provides compound of Formula (VIII):

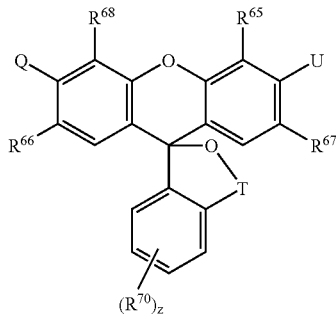

(VIII)

wherein, z is 1, 2 or 3;

T is >C=O or >S(=O)$_2$;

Q is —OR$^{71}$ or —NR$^{72}$R$^{73}$;

U is —OR$^{74}$ or —NR$^{75}$R$^{76}$;

each R$^{68}$ and R$^{65}$ are the same or different and independently hydrogen, halogen, hydroxy, alkyl, aryl or —CH$_2$As(=O)(OR$^6$)(OR$^7$) or —CH$_2$As(OR$^6$)$_2$(OR$^7$)$_2$;

each R$^{66}$ and R$^{67}$ are the same or different and independently hydrogen, halogen, hydroxy, alkyl or L-R$_x$;

each R$^{70}$ is the same or different and independently hydrogen, halogen, alkyl, —As(=O)(OR$^6$)(OR$^7$), —As(OR$^6$)$_2$(OR$^7$)$_2$ or L-R$_x$;

R$^6$ and R$^7$ are the same or different and independently H, alkyl, aryl, or heteroaryl; or R$^6$ and R$^7$ are linked together to form a 5 or 6-member heterocycle comprising the arsenic and the two oxygen atoms to which R$^6$ and R$^7$ are attached, wherein —R$^6$—R$^7$— is —[C(R$^8$)$_2$]$_w$— (w is 2 or 3), wherein each R$^8$ is the same or different and independently hydrogen, hydroxy, cyano, —OC(O)-alkyl, —OC(O)-aryl, alkyl, aryl, alkylcarbonyl, arylcarbonyl, —CH$_2$CN, —CH$_2$SO$_2$Me, —CH$_2$SO$_2$Ph, or two R$^8$ of adjacent carbons together with the carbons to which they are attached form an aryl or heteroaryl, or two R$^8$ of the same carbon form an oxo;

each R$^{71}$ and R$^{74}$ are the same or different and independently is hydrogen, alkylcarbonyl or arylcarbonyl;

each R$^{72}$, R$^{73}$, R$^{75}$ and R$^{76}$ are the same or different and independently hydrogen, alkyl or aryl; or R$^{71}$ and R$^{68}$, together with the carbons to which they are attached, form a 5 or 6 member heterocycle; or R$^{74}$ and R$^{65}$, together with the carbons to which they are attached, form a 5 or 6 member heterocycle; or R$^{72}$ and R$^{68}$, together with the carbons to which they are attached, form a 5 or 6 member heterocycle; or R$^{73}$ and R$^{66}$, together with the carbons to which they are attached, form a 5 or 6 member heterocycle; or R$^{75}$ and R$^{65}$, together with the carbons to which they are attached, form a 5 or 6 member heterocycle; or R$^{76}$ and R$^{67}$, together with the carbons to which they are attached, form a 5 or 6 member heterocycle;

L is a single covalent bond or a covalent linkage having 1-30 non-hydrogen atoms selected from the group consisting of C, N, O and S and is composed of any combination of single, double, triple or aromatic carbon-carbon bonds, carbon-nitrogen bonds, nitrogen-nitrogen bonds, carbon-oxygen bonds and carbon-sulfur bonds; and $R_x$ is a reactive group, provided, at least one of R$^{65}$, R$^{66}$ R$^{67}$, R$^{68}$ and R$^{71}$ is or comprises —As(=O)(OR$^6$)(OR$^7$) or —As(OR$^6$)$_2$(OR$^7$)$_2$.

In another embodiment, the present invention provides compound of Formula (IX):

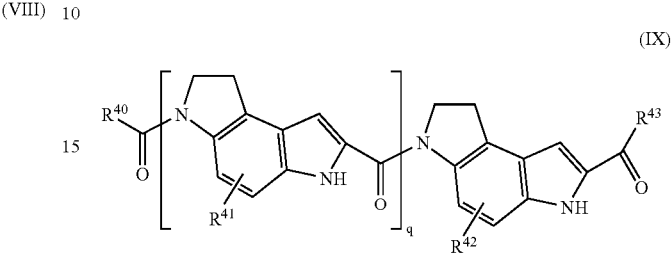

(IX)

wherein,

R$^{40}$ and R$^{43}$ are the same or different and independently hydrogen, hydroxy, amino, alkyl, aryl, alkoxy or -L-R$_x$, provided at least one of R$^{40}$ and R$^{43}$ is -L-R$_x$;

each R$^{41}$ is independently hydrogen, halogen, hydroxy, sulfonyl, phosphonyl, —As(=O)(OR$^6$)(OR$^7$) or —As(OR$^6$)$_2$(OR$^7$)$_2$;

R$^6$ and R$^7$ are the same or different and independently H, alkyl, aryl, or heteroaryl; or R$^6$ and R$^7$ are linked together to form a 5 or 6-member heterocycle comprising the arsenic and the two oxygen atoms to which R$^6$ and R$^7$ are attached, wherein —R$^6$—R$^7$— is —[C(R$^8$)$_2$]$_w$— (w is 2 or 3), wherein each R$^8$ is the same or different and independently hydrogen, hydroxy, cyano, —OC(O)-alkyl, —OC(O)-aryl, alkyl, aryl, alkylcarbonyl, arylcarbonyl, —CH$_2$CN, —CH$_2$SO$_2$Me, —CH$_2$SO$_2$Ph, or two R$^8$ of adjacent carbons together with the carbons to which they are attached form an aryl or heteroaryl, or two R$^8$ of the same carbon form an oxo;

q is 0, 1 or 2;

R$^{42}$ is hydrogen, halogen, hydroxy, —As(=O)(OR$^6$)(OR$^7$) or —As(OR$^6$)$_2$(OR$^7$)$_2$;

L is a single covalent bond or a covalent linkage having 1-30 non-hydrogen atoms selected from the group consisting of C, N, O and S and is composed of any combination of single, double, triple or aromatic carbon-carbon bonds, carbon-nitrogen bonds, nitrogen-nitrogen bonds, carbon-oxygen bonds and carbon-sulfur bonds; and $R_x$ is a reactive group, provided, at least one of R$^{41}$ and R$^{42}$ is —As(=O)(OR$^6$)(OR$^7$) or —As(OR$^6$)$_2$(OR$^7$)$_2$.

In one aspect, the present invention provides an oligonucleotide conjugate comprising an oligonucleotide substituted with a dye having an arsonate ester group.

In particular, the dye is a fluorescent dye having an excitation between 340 nm and 1100 nm and fluorescence emission maximum between 440 and 1150 nm, or the dye is a non-fluorescent quencher being adapted to absorb fluorescence emitted from a reporting fluorophore prior to the binding of the oligonucleotide to a target. Typically, the dye is represented by any of the Formulae (I-VIII). In one embodiment, the oligonucleotide may further comprise an MGB group. Typically, the MGB group is substituted with a polar arsonate group.

In a further embodiment, the present invention provides an oligonucleotide conjugate wherein the oligonucleotide is a probe selected from molecular beacons, SCORPIONS™ probes, sunrise probes, conformationally assisted probes and TAQMAN™ probes.

In another aspect, the present invention provides method of directly detecting a target nucleic acid, comprising: providing a dye-labeled oligonucleotide probe comprising an oligonucleotide conjugated to one or more dye compounds of Formulae (I-III) and (V-VIII), the oligonucleotide further optionally comprising an MGB optionally substituted with one or more polar arsonate groups; adding the dye-labeled oligonucleotide probe to a biological sample, wherein the probe is complementary or substantially complementary to the target nucleic acid; allowing the probe to hybridize with the target nucleic acid under an appropriate condition and for sufficient amount of time; and detecting fluorescence emitted from the dye.

In another aspect, the present invention provides a method of preparing an oligonucleotide in an automated synthesis, using a dye reagent of any of Formulae (I)-(VIII), wherein $R_x$ is a phosphoramidite group, the method comprising: performing automated synthesis of oligonucleotide using phosphoramidite method to provide a dye-labeled oligonucleotide; deprotecting —As(=O)(OR$^6$)(OR$^7$) or —As(OR$^6$)$_2$(OR$^7$)$_2$ of the dye-labeled oligonucleotide to provide a dye-labeled oligonucleotide having negatively charged polar group selected from —AsO$_3^{2-}$ or —AsO$_3$H$^-$; and isolating the dye-labeled oligonucleotide from the reaction medium.

In a further aspect, the present invention provides a method of detecting amplification of a target sequence in real life using a TaqMan assay, the method comprising: providing a dye-labeled oligonucleotide probe comprising an oligonucleotide conjugated to a quencher dye of Formula (IV) and a fluorescent dye of any of the Formulae (I-III) and (V-VIII), each dye having one or more polar arsonate group, wherein the probe is in a conformation allowing the fluorescent dye to be quenched by the quencher dye; adding the dye-labeled oligonucleotide probe to a PCR reaction medium; running the PCR temperature cycles to allow the probe to hybridize with the target and get cleaved by Taq polymerase when the target is present; and reading the fluorescence signal from the cleaved dye in the real time.

In yet another aspect, the present invention provides a method of detecting amplification of a target sequence in real life using a Molecular Beacon assay, the method comprising: providing a dye-labeled oligonucleotide probe comprising an oligonucleotide conjugated to a quencher dye of Formula (IV) and a fluorescent dye of any of the Formulae (I-III) and (V-VIII), each dye having one or more polar arsonate group, wherein the probe is in a conformation allowing the fluorescent dye to be quenched by the quencher dye; adding the dye-labeled oligonucleotide probe to a PCR reaction medium; running the PCR temperature cycles to allow the probe to hybridize with the target thereby separating the fluorescent dye and the quencher dye when the target is present; and reading the fluorescence signal from the unquenched fluorescent dye in the real time.

In yet a further aspect, the present invention provides a method of detecting amplification of a target sequence in real life using a SCORPIONS™ Probe assay, the method comprising: providing a dye-labeled oligonucleotide probe comprising a primer, an oligonucleotide conjugated to a quencher dye of Formula (IV) and a fluorescent dye of any of the Formulae (I-III) and (V-VIII), each dye having one or more polar arsonate group, wherein the probe is in a conformation allowing the fluorescent dye to be quenched by the quencher dye; adding the dye-labeled oligonucleotide probe to a PCR reaction medium; running the PCR temperature cycles to allow the primer to hybridize with a target DNA, thereby extending the probe on target DNA; heat denaturing the extended probe which causes the quencher dye to disassociate; cooling the extended probe to allow for an internal rearrangement which causes the fluorescent dye to fluoresce in a target specific manner; and reading the fluorescence signal from the fluorescent dye in the real time.

BRIEF DESCRIPTION OF THE DRAWINGS

FIG. 1 and FIG. 2 present a number of commercially available sulfonyl-containing dyes.

FIG. 3 shows mechanisms of protection of dyes arsonic acids into the dyes containing arsonate ester groups and deprotection of the formed esters.

FIG. 4 shows a synthetic pathway for a phosphoramidite reagent of Formula (III) for incorporation of arsonate dye into oligonucleotides using automated synthesis.

FIG. 5 shows a synthetic pathway for a minor groove binder intermediate of Formula (VI) containing protected arsonate group for attachment to solid support, dye and/or oligonucleotide.

FIG. 6 shows a synthetic pathway for another minor groove binder intermediate of Formula (VI) containing protected arsonate group for attachment to solid support, dye and/or oligonucleotide.

FIG. 7 shows polar fluorescence quenching arsonic acid rhodamine dyes, activated ester reagents.

FIG. 8 shows ester protected arsonic acid xanthene dyes phosphoramidites suitable for automated synthesis.

FIG. 9 shows ester protected arsonic acid xanthene fluorescent dyes for introduction into oligonucleotides via automated synthesis and solution conjugation with amines, thios and dienes.

FIG. 10 shows polar fluorescence quenching arsonate azodyes on solid support for automated synthesis of oligonucleotides.

FIG. 11 shows the excitation and emission spectra of arsonic acid carbocyanine dye G1 (1.25 mM in pH 8.0 10 mM Tris buffer).

FIG. 12 shows the kinetics of the deprotection of a model bis-pinacol-protected azodye with aqueous 25% ammonia at 20°.

DETAILED DESCRIPTION OF THE INVENTION

As mentioned above, the present invention is related to novel fluorescent dyes, quenchers, and minor groove binders with enhanced polarity. The present invention further relates to methods of preparing oligonucleotide probes labeled with polar arsonate dyes under the condition of automated synthesis.

1. Definitions

As used herein, the following terms have the following meanings.

"Alkyl" means a straight chain or branched, noncyclic or cyclic, unsaturated or saturated aliphatic hydrocarbon containing from 1 to 10 carbon atoms, while the term "lower alkyl" has the same meaning as alkyl but contains from 1 to 6 carbon atoms. Representative saturated straight chain alkyls include methyl, ethyl, n-propyl, n-butyl, n-pentyl, n-hexyl, and the like; while saturated branched alkyls include isopropyl, sec-butyl, isobutyl, tert-butyl, isopentyl, and the like. Representative saturated cyclic alkyls include cyclopropyl, cyclobutyl, cyclopentyl, cyclohexyl, —CH$_2$-cyclohexyl, and the like; while unsaturated cyclic alkyls include cyclopentenyl, cyclohexenyl, —CH$_2$-cyclohexenyl, and the like. Cyclic alkyls are also referred to herein as a "cycloalkyl." Unsaturated alkyls contain at least one double or triple bond between adjacent carbon atoms (referred to as an "alkenyl" or "alkynyl", respectively). Representative straight chain and branched alkenyls include ethylenyl, propylenyl, 1-butenyl, 2-butenyl, isobutylenyl, 1-pentenyl, 2-pentenyl, 3-methyl-1-butenyl, 2-methyl-2-butenyl, 2,3-dimethyl-2-butenyl, and the like; while representative straight chain and branched alkynyls include acetylenyl, propynyl, 1-butynyl, 2-butynyl, 1-pentynyl, 2-pentynyl, 3-methyl-1-butynyl, and the like. Unless otherwise specified, an alkyl of the present invention can be optionally substituted with any one or more "substituents" as defined herein.

"Aralkyl" refers to an alkyl substituted by an aryl group. The alkyl and aryl groups are as defined herein. Unless otherwise specified, an arakyl of the present invention can be optionally substituted with any one or more "substituents" as defined herein.

"Alkoxy" refers to a radical of the formula —O-alkyl. Examples include methoxy, ethoxy, propoxy, isopropoxy, cyclopropyloxy, cyclohexyloxy and the like. Lower-alkoxy refers to groups containing one to five carbons.

"Acyl" refers to a radical of the formula —C(═O)—R, wherein R is alkyl, aryl, alkoxy, aryloxy, heterocycle or heteroaryl, where alkyl, aryl, alkoxy, aryloxy, heterocycle and heteroaryl are as defined herein. Representative acyl groups include acetyl, benzoyl, propionyl, isobutyryl, t-butoxycarbonyl, and the like.

"Aryl" refers to optionally substituted phenyl or naphthyl. Exemplary substituents for aryl include one or more of halogen, hydroxy, alkoxy, aryloxy, heteroaryloxy, amino, alkylamino, dialkylamino, alkylsulfonyl, mercapto, alkylthio, arylthio, heteroarylthio, cyano, carboxyl, alkoxycarbonyl where the alkoxy portion contains 1 to 15 carbons, aryloxycarbonyl where the aryloxy portion contains 6 to 20 carbon, or heteroarylcarbonyl where the heteroaryl portion contains 3 to 15 carbon atoms. Unless otherwise specified, an aryl of the present invention can be optionally substituted with any one or more "substituents" as defined herein.

"Aryloxy" refers to a radical of the formula —O-aryl. One example of aryloxy is phenoxy.

"Alkylcarbonyl" refers to a radical of the formula —C(O)-alkyl. Examples include methylcarbonyl, ethylcarbonyl, etc.

"Arylcarbonyl" refers to a radical of the formula —C(O)-aryl. Examples include phenylcarbonyl and naphthylcarbonyl.

"Aminoalkyl" refers to a subset of alkyl wherein one or more hydrogen is replaced with an amino group. The hydrogens of the amino group can be further substituted by one or more alkyl, aryl, cycloalkyl, heterocycle or heteroaryl.

"Monoalkylamino" and "dialkylamino" refers to an amino group wherein one or two hydrogen are replaced with alkyl groups, respectively.

"Trialkylamonium" refers to a cation of the formula —N$^+$(alkyl)$_3$.

"Alkylthio" refers to a radical of the formula —S-alkyl. Alkyl is as defined herein.

"Arylthio" refers to a radical of the formula —S-aryl. Aryl is as defined herein.

"2-cyanoalkyl" refers to a subset of alkyl wherein one or more hydrogen is replaced with a cyano group. An example of 2-cyanoalkyl is cyanoethyl.

"Carbocycle" means a 3-7 member monocyclic, or 7- to 14-member bicyclic or tricyclic rings having only carbon ring atoms, which is either saturated, partially saturated (unsaturated) or aromatic. The carbocycle may further be substituted with 1-5 substituents, as defined herein. Aromatic carbocycle is also referred herein as "aryl". Examples of carbocycle are carbocyclyl radicals include, but are not limited to, cyclohexane, cyclohexen, norbornane, norbornene, bicyclo[2.2.2]octane, phenyl, naphthalenyl, indanyl, indenyl, azulenyl, fluorenyl, anthracenyl, and the like. Unless otherwise specified, a carbocycle of the present invention can be optionally substituted with any one or more "substituents" as defined herein.

"Electron withdrawing group" refers to a moiety that is electron-poor or positively charged. Examples include CN, NO$_2$, —S(O)$_2$-alkyl and —N$^+$(alkyl)$_3$.

"Haloalkyl" refers to a subset of alkyl wherein one or more hydrogen is replaced with a halogen. One example of a haloalkyl is trifluoromethyl.

"Halogen" refers to fluoro, chloro, bromo or iodo.

"Heterocycle" means a 5- to 7-membered monocyclic, or 7- to 10-member bicyclic, heterocyclic ring which is either saturated, unsaturated or aromatic, and which contains from 1 to 4 heteroatoms independently selected from nitrogen, oxygen, sulfur and arsenic, and wherein the nitrogen and sulfur heteroatoms may be optionally oxidized, and the nitrogen heteroatom may be optionally quaternized, including bicyclic rings in which any of the above heterocycles are fused to a benzene ring. The heterocycle may be optionally substituted with 1-5 substituents. The heterocycle may be attached via any heteroatom or carbon atom. Aromatic heterocycle is also referred as "heteroaryl". Representative heteroaryls are furyl, benzofuranyl, thiophenyl, benzothiophenyl, pyrrolyl, indolyl, isoindolyl, azaindolyl, pyridyl, quinolinyl, isoquinolinyl, oxazolyl, isooxazolyl, benzoxazolyl, pyrazolyl, imidazolyl, benzimidazolyl, thiazolyl, benzothiazolyl, isothiazolyl, pyridazinyl, pyrimidinyl, pyrazinyl, triazinyl, cinnolinyl, phthalazinyl, triazolyl, tetrazolyl, oxadiazolyl, benzoxadiazolyl, thiadiazolyl, indazolyl and quinazolinyl. In addition to the heteroaryls listed above, heterocycles also include morpholinyl, pyrrolidinonyl, pyrrolidinyl, piperidinyl, piperazinyl, hydantoinyl, valerolactamyl, oxiranyl, oxetanyl, tetrahydrofuranyl, tetrahydropyranyl, tetrahydropyridinyl, tetrahydroprimidinyl, tetrahydrothiophenyl, tetrahydrothiopyranyl, tetrahydropyrimidinyl, tetrahydrothiophenyl, tetrahydrothiopyranyl, and the like. Unless otherwise specified, a heterocycle of the present invention can be optionally substituted with any one or more "substituents" as defined herein.

"Oxo" refers to ═O.

"Sulfonyl" refers to a radical of the formula —SO$_3$R, wherein R is hydrogen, alkyl, aryl, heteroaryl or a biologically compatible cation. "Alkylsulfonyl" refers to a radical of the formula —SO$_3$-alkyl, alkyl is as defined herein.

"Phosphonyl" refers to a radical of the formula —P(═O)(OR')(OR"), wherein each of R' and R" are the same or different and independently hydrogen, alkyl, aryl, heteroaryl or a biologically compatible cation.

The term "substituted" as used herein means any of the above groups (e.g., alkyl, alkoxy, aryl, heteroaryl and heterocycle) wherein at least one hydrogen atom is replaced with a substituent. The related term "substituent" refers to halogen, hydroxy, alkyl, aryl, alkoxy, aryloxy, acyl, alkylsulfonyl, mercapto, cyano, nitro, —COOH, alkylthio, arylthio, heteroarylthio, heteroaryl, heterocycle, —NR$_a$R$_b$, —NR$_a$C(═O)R$_b$, —NR$_c$C(═O)NR$_a$R$_b$, —NR$_a$C(═O)OR$_b$, —NR$_a$SO$_2$R$_b$, —C(═O)NR$_a$R$_b$, —OC(═O)R$_a$, —OC(═O)OR$_a$, —OC(═O)NR$_a$R$_b$, —NR$_a$SO$_2$R$_b$ or a radical of the formula -J-G-R$_a$ where J is alkanediyl, substituted alkanediyl or a direct bond, alkanediyl refers to a divalent alkyl with two hydrogen atoms taken from the same or different carbon atoms, G is —O—, —S—, —S(═O)—, —S(=O)₂—, —N(R_b)—, —C(=O)—, —C(=O)O—, —OC(=O)—, —N(R_b)C(=O)—, —C(=O)N(R_b)— or a direct bond, wherein $R_a$, $R_b$ and $R_c$ are the same or different and independently hydrogen, amino, alkyl, substituted alkyl (including halogenated alkyl), aryl, substituted aryl, heteroaryl, substituted heteroaryl, heterocycle or substituted heterocycle or wherein $R_a$ and $R_b$ taken together with the nitrogen atom to which they are attached form a heterocycle or substituted heterocycle.

"Fluorophore" refers to a compound with a fluorescent emission maximum between about 400 and 1150 nm. Typically, fluorophores are compounds having extended conjugated system where electrons can be delocalized. These compounds include, with their emission maxima in nm in parentheses, Cy2™ (506), GFP (Red Shifted) (507), YO-PRO™-1 (509), YOY™-1 (509), Calcein (517), FITC (518), FluorX™ (519), Alexa™ (520), Rhodamine 110 (520), 5-FAM (522), Oregon Green™ 500 (522), Oregon Green™ 488 (524), RiboGreen™ (525), Rhodamine Green™ (527), Rhodamine 123 (529), Magnesium Green™ (531), Calcium Green™ (533), TO-PRO™-1 (533), TOTO®-1 (533), JOE (548), BODIPY® 530/550 (550), DiI (565), BODIPY® (568), BODIPY® 558/568 (568), BODIPY® 564/570 (570), Cy3™ (570), Alexa™ 546 (570), TRITC (572), Magnesium Orange.™. (575), Phycoerythrin R&B (575), Rhodamine Phalloidin (575), Calcium Orange.™. (576), Pyronin Y (580), Rhodamine B (580), TAMRA (582), Rhodamine Red™ (590), Cy3.5™ (596), ROX (608), Calcium Crimson™ (615), Alexa™ 594 (615), Texas Red® (615), Nile Red (628), YO-PRO™-3 (631), YOYO™-3 (631), R-phycocyanin (642), C-Phycocyanin (648), TO-PRO™-3 (660), TOTO®-3 (660), DiD DilC(5) (665), Cy5™ (670), Thiadicarbocyanine (671), Cy5.5 (694). For purpose of the present invention, the fluorophores can be modified with one or more negatively charged polar groups, such as arsonate groups. As discussed above, the increased polarity of these modified fluorophores tend to retain their high quantum yields even after having been conjugated to a biological substance, such as an oligonucleotide.

"Oligonucleotide" refers to an oligomer of about 3-100 nucleotide units. The nucleotide units include all major heterocyclic bases naturally found in nucleic acids (uracil, cytosine, thymine, adenine and guanine) as well as naturally occurring and synthetic modifications and analogs of these bases such as hypoxanthine, 2-aminoadenine, 2-thiouracil, 2-thiothymine, 5-$N^4$ ethenocytosine, 4-aminopyrrazolo[3,4-d]pyrimidine and 6-amino-4-hydroxy[3,4,d]pyrimidine. The "sugar" or glycoside portion of the oligonucleotide may comprise deoxyribose, ribose, 2-fluororibose, 2-O alkyl or alkenylribose where the alkyl group may have 1 to 6 carbons and the alkenyl group 2 to 6 carbons. In the naturally occurring nucleotides and in the herein described modifications and analogs the deoxyribose or ribose moiety forms a furanose ring, the glycosydic linkage is of the β configuration and the purine bases are attached to the sugar moiety via the 9-position, the pyrimidines via the 1-position and the pyrazolopyrimidines via the 1-position. Presently, oligodeoxyribonucleotides (ODN) are preferred in accordance with the present invention, therefore the preferred sugar is 2-deoxyribose. The nucleotide units of the ODN's are interconnected by a "phosphate" backbone, as is well known in the art. An "oligonucleotide conjugate" generally refers to an oligonucleotide covalently bonded to another organic moiety, e.g., a dye compound.

The term "dye" as used herein broadly refers to a detectable dye compound, typically conjugated to a biological substance such as an oligonucleotide or a minor groove binder. The dye-conjugated biological substance is also referred herein as "dye-labeled" biological substance. For purpose of this invention, a dye can be a fluorescent dye, a quencher dye or an IR dye.

Fluorescent dyes owe their highly sensitive detectability to a fluorophore component, including a reporter fluorophore when a quencher is also present in the biological substance. The term "fluorophore" is as defined above. Typically, a fluorescent dye has an excitation between 340 nm and 1100 nm and fluorescence emission maximum between 440 and 1150 nm.

A quencher dye, or "quencher", refers to a non-fluorescing chromophore that is configured to draw the energy potential away from an excited reporter fluorophore, so that the reporter fluorophore does not emit. In the present invention, a quencher is typically coupled to an oligonucleotide or an oligonucleotide having a minor groove binder (MGB).

An IR dye of the present invention absorbs in the UV-Vis region and emits in the near IR region (780-1150 nm). Typically, IR irradiation is called "heat rays" because the dye invisibly "shines" in the near IR region and resembles a very hot metal in visible region. Therefore, like regular optical dyes for biological labeling, IR dye labels emit in the invisible region and are detectable by modern optical electronics.

"Linker" refers to a diverse group of covalent linkages that connects the fluorophore to a substance to be conjugated. The covalent linkage can be a combination of stable chemical bonds, optionally including single, double, triple or aromatic carbon-carbon bonds, as well as carbon-nitrogen bonds, nitrogen-nitrogen bonds, carbon-oxygen bonds, carbon-sulfur bonds, phosphorus-oxygen bonds, and phosphorus-nitrogen bonds. The linker is typically at least bi-functional, i.e., it comprises two functional groups, one of which for binding to the fluorophore, the other for binding to a reactive group. The binding typically results in the formation of carboxylate ester, amide, ether, thioether, sulfonamide, urea, urethane or phosphoramidite moieties. For example, many fluorophores have carboxylic acid or sulfonic acid group which enable them to be readily coupled to a linker via the formation of carboxylate ester, carboxylic amide or sulfonamide moieties. Similarly, the linker can be coupled to a reactive group, which in turn will be conjugated to a substance of interest.

Typically, a linker has 1-30 non-hydrogen atoms selected from the group consisting of C, N, O, P, and S; and are composed of any combination of ether, thioether, amine, ester, carboxamide, sulfonamide, hydrazide bonds and aromatic or heteroaromatic bonds. The covalent linkage can be linear or cyclic, or a combination thereof. Examples of linear linkages include polymethylene, polyethyleneglycol, alkylsulfonyl, alkylthio, amino alcohol and diol. "Amino alcohol" refers to a di-radical of the formula —NH—Y—O—, wherein Y is an alkanediyl or substituted alkanediyl; alkanediyl refers to a divalent alkyl with two hydrogen atoms taken from different carbon atoms. "Diol" refers to a di-radical of the formula —O—Y—O—, wherein Y is defined as above. Linkers having cyclic groups typically comprise a nucleoside or a modified nucleoside. These linkers are particularly useful in the automated synthesis of oligonucleotide as they can be associated with a phosphoramidite reactive group that in turn is readily coupled to an elongating backbone of an oligonucleotide. The 5'-terminus hydroxy group of the ribose group of the nucleoside in the linker is capable of continuing the elongation of the oligonucleotide chain by coupling with the next base in the reaction sequence. The 5'-terminus hydroxy group in a linker is typically protected by 4,4'-dimethoxytrityl (DMTr) group. In addition, other groups on the base of the nucleoside linker may require protection during the automated synthesis. It is within the knowledge of one skilled in the art to identify the sites to be protected and the protecting agents to be employed. The protecting groups are typically excluded from and not counted toward the 1-30 non-hydrogen atoms in a given linker.

"Reactive group" or "$R_x$" refers to a functional group capable of reactively conjugating a dye to a substance of interest. Typically, the substance is a "biological substance" or "biomolecule" that possess a suitable functional group for covalent attachment of the dye. Suitable "biological substance" or "biomolecule" that are particularly useful to be conjugated to dyes of the present invention include, among others, antigens, steroids, vitamins, drugs, haptens, metabolites, toxins, environmental pollutants, amino acids, peptides, proteins, nucleic acids, nucleic acid polymers, carbohydrates, lipids, ion-complexing moieties, and non-biological polymers. Alternatively, the biological substances include cells, cellular systems, cellular fragments, or subcellular particles. Examples include, among others, virus particles, bacterial particles, virus components, biological cells (such as animal cells, plant cells, bacteria, yeast, or protists), or cellular components. Preferably, the biological substance is an oligonucleotide, amino acid, peptide, protein, tyramine, polysaccharide, ion-complexing moiety, nucleotide, nucleic acid polymer, hapten, drug, hormone, lipid, lipid assembly, polymer, polymeric microparticle, biological cell or virus. In one embodiment, conjugates of biological polymers such as peptides, proteins, oligonucleotides, nucleic acid polymers are also labeled with a second fluorescent or quencher dye, including an additional dye of the present invention, to form an energy-transfer pair.

More typically, the biological substance is an oligonucleotide or a growing chain of an oligonucleotide in an automated synthesis. The substance can also include a solid support typically used in an automated synthesis of oligonucleotide, such as CPG or polystyrene. Choice of the reactive group used to attach the dye to the substance to be conjugated typically depends on the reactive site on the substance to be conjugated and the type or length of the covalent linker desired. The types of functional groups typically present on a substance as described above include, but are not limited to, amines, thiols, alcohols, phenols, aldehydes, ketones, phosphates, imidazoles, di-substituted amines, arsonate esters, purines, pyrimidines, carboxylic acids, or a combination of these groups. An oligonucleotide may be conjugated to more than one dye, which may be the same or different. For example, a quencher dye and a reporter fluorophore can be conjugated to the same oligonucleotide. Although some selectivity can be obtained by a careful control of the reaction conditions, selectivity of labeling is best obtained by selection of a dye having an appropriate reactive group.

Typically, $R_x$ will react with an amine, a thiol, an alcohol, an aldehyde or a ketone. In one embodiment, $R_x$ is an acrylamide, an activated ester of a carboxylic acid, an acyl azide, an acyl nitrile, an aldehyde, an alkyl halide, an amine, an anhydride, an aniline, an aryl halide, an aziridine, a boronate, a carboxylic acid, a diazoalkane, a haloacetamide, a halotriazine, a hydrazine (including hydrazides), an imido ester, an isocyanate, an isothiocyanate, a maleimide, a phosphoramidite, a sulfonyl halide, or a thiol group. Preferably, $R_x$ is a carboxylic acid, a succinimidyl ester, a pentafluorophenyl ester, a phosphoramidite, an amine, a haloacetamide, a hydrazine, an isothiocyanate, a maleimide group or an azidoperfluorobenzamido group.

In certain embodiments, $R_x$, which is a succinimidyl ester or a pentafluorophenyl ester of a carboxylic acid, is particularly useful for preparing dye-oligonucleotide conjugates. These activated forms of a carboxylic functional group can be conjugated to an oligonucleotide or a solid support via a reactive site thereon, such as an amine group.

In other embodiments, $R_x$, which is a phosphoramidite, is particularly useful in the automated synthesis of oligonucleotides. Phosphoramidites are reactive toward a hydroxy group under mildly acidic condition and will readily couple with the 5'-terminus hydroxy group of a growing chain of oligonucleotide in the automated oligonucleotide synthesis. A representative phosphoramidite is cyanoethyl phosphoramidite.

"Dye reagent" refers to a dye coupled to a reactive group via a linker. The dye reagent is a building block that can be incorporated in versatile locations in an oligonucleotide sequence. Depending on the specific needs, a dye reagent can react directly with the reactive site of the solid support and initiate the synthetic sequence of the base addition. A dye reagent can also react with a growing chain of oligonucleotide and continue the elongation of the sequence via a protected hydroxyl group on a different part of the dye. Finally, a dye reagent can also be used to terminate the elongation of an oligonucleotide at the 5'-terminus. As discussed above, "phosphoramidite regent", in which a dye is coupled to a phosphoramidite group, is particularly useful for automated oligonucleotide syntheses.

"Polar group" refers to a group of atoms as a whole having greater electronegativity and the tendency to attract electrons it is sharing with a nearby atom or group of atoms. A polar group is typically, but not necessarily, negatively charged. Examples of a polar group include sulfonic acid ($-SO_3H$), phosphonic acid ($-P(=O)(OH)_2$), arsonic acid ($-As(=O)(OH)_2$), and their esters and salts.

The term "arsonate" refers generally to an organic moiety substituted with free arsonic acids ($-As(=O)(OH)_2$) and/or arsonate esters. The term "arsonate ester" refers to either one of the two protected forms of a free arsonic acid. In particular, an arsonate ester can be an arsonate diester, represented by the formula $-As(=O)(OR)_2$, or an arsonate ortho ester, represented by the formula $-As(OR)_4$. Arsonate diester may favorably undergo a transformation akin to a ketal formation and provide an arsonate ortho ester, represented by the formula $-As(OR)_4$.

Each R is the same or different and independently alkyl, aryl or heteroaryl and are typically the reaction residue of alkyl-OH, aryl-OH and heteroaryl-OH. More typically, any two R groups of an arsonate ester may be linked together to provide a chelated form. In other words, arsonic acid substituents of a dye compound can be converted into its chelated ester form by reacting with chelating agents having two oxygen atoms separated by two or three carbon atoms. Such chelating agents may include ethylene glycols, glycol aldehydes, glyoxals, glycolic acids, glyoxylic acids, propylene glycols, pinacol (2,3-dimethyl-2,3-butanediol), 3-hydroxypropionic aldehydes, 3-hydroxypropionic acids, malonaldehydes and pyrocatechols.

The presence of the R groups in arsonate diester and arsonate orthoester neutralizes the charge of the arsonic acid, thereby enhancing the compatibility of a labeled dye reagent in the automated oligonucleotide synthesis. As will be discussed herein, the R groups are readily removable to provide the negatively charged arsonic acid polar group.

"Alkylarsonate" refers to an alkyl substituted with one or more arsonate groups. "Arylarsonate" refers to an aryl substituted with one or more arsonate groups. "Heteroarylarsonate" refers to a heteroaryl substituted with one or more arsonate groups.

"Solid support" refers to any support that is compatible with oligonucleotides synthesis, including, for example, glass, controlled pore glass (CPG), polymeric materials, polystyrene, coated glass and the like. The "solid support" can be used in the form of beads, waffles, arrays or chips made out of the materials listed above.

"Biologically compatible cation" refers to a biologically compatible, positively charged ion that does not have a deleterious effect on biomolecules. Suitable cations include, among others, $Na^+$, $K^+$, $Li^+$, $Cs^+$, $Ca^{2+}$ and $Mg^{2+}$, ammonium, alkylammonium or alkoxyammonium salts, or pyridinium salts.

"Minor groove binder" (MGB) refers to a radical of a molecule having a molecular weight of approximately 150 to approximately 2000 Daltons which binds in a non-intercalating manner into the minor groove of double stranded DNA, RNA or hybrids thereof with an association constant greater than approximately $10^3$ $M^{-1}$. Although a general chemical formula for all known minor groove binding compounds cannot be provided because such compounds have widely varying chemical structures, compounds which are capable of binding in the minor groove of DNA, generally speaking, have a crescent-shaped three dimensional structure. Typically, MGB has a chemical structure of several units of fused heterocycle rings coupled together via peptide bonds.

Most minor groove binding compounds of the prior art have a strong preference for A-T (adenine and thymine) rich regions of the B form of double stranded DNA. U.S. Pat. No. 5,801,155 discloses that oligonucleotides having a covalently attached minor groove binder (MGB) are more sequence specific for their complementary targets than unmodified oligonucleotides. In addition, the MGB-oligonucleotide conjugates show substantial increase in hybrid stability with complementary DNA target strands when compared to unmodified oligonucleotides, allowing hybridization with shorter oligonucleotides.

2. Novel Dyes and Dye Reagent

As noted above, dyes with enhanced polarity offer a number of useful applications primarily due to their high water solubility and biological compatibility. Dyes having sulfonic polar groups are widely used for labeling nucleic acids and proteins as well as staining biological materials. Some examples of commercially available dyes are presented on FIGS. 1 and 2.

Organic derivatives of arsonic acid $HAs(=O)(OH)_2$ have been known since 19$^{th}$ century to provide water solubility to azodyes. Great numbers of these compounds were synthesized by famous chemists such as Paul Ehrlich in a search for new dyes and drugs. Less toxic sulfonates became more popular over the next century for most applications when high polarity is an essential dye property. A relatively small number of arsonic dyes are being used today mostly for applications in analytical chemistry and biomedical research. Well-known and widely used reagent Arsenazo III (2,7-bis[(2-arsonophenyl)azo]-1,8-dihydroxy-3,6-naphthalenedisulfonic acid) for determination of Th, U, Zr [*Anal. Chim. Acta* 71, 375, 1974] and Cd, Zn [*Anal. Chim. Acta* 1974, 68, 73] was synthesized by Savvin S. B. in 1959 [for review see Basargin, N. N., Ivanov, V. M., Kuznetsov V. V. and Mikhailova A. V. "40 Years since the Discovery of the Arsenazo III Reagent" *J. Anal. Chem.* 55, No. 3, 2000]. Arsonic acid dyes are demonstrated to have specific affinities for proteins, and therefore can be used for selective staining or labeling of biological materials. Arsonophenylazoproteins, azodyes resulted from reaction of arsonophenyldiazonium salts with proteins, have been reported to have anticoagulant and antilymphoma properties [Broome J. D. and. Kidd J. G. "The Anticoagulant and Antilymphoma Properties of Arsenic Azoproteins: I. Anticoagulant Effects of Arsenic Azoproteins in Vivo and in Vitro: Comparison of Arsenicals as Anticoagulants and as Antilymphoma Agents: Molecular Structure in Relation to Anticoagulant and Antilymphoma Properties" *J. Exp. Med.*, 120: 449-466, 1964]. Azopenylarsonic dyes have been shown to form complexes with subtilisins [Glazer A. N. "The Time-Dependent Specific Interaction of 4-(4'-Aminophenylazo)phenylarsonic Acid with Subtilisins" *Proc. Nat. Acad. Sci., Biochemistry*, 59, 996-1002, 1968].

None of the above arsonic acid dyes is fluorescent. Fluorescent arsonic acid dyes, owing to their polarity and highly detectable fluorescence signals, therefore offer new advantages in technologies such as cell staining and labeling of proteins and nucleic acids. Because of their highly sensitive fluorescent signals, these fluorescent dyes are generally used at extremely low concentrations with no or very minimal adverse impact to the environment.

Trivalent arsenic or As(III)-based fluorescent dyes have been used as biological labels due to their high affinity to thiols (see, e.g., U.S. Pat. Nos. 6,933,384, 6,686,458, 6,451, 569, 6,054,271, 6,008,378 and 5,932,474.) However, concerns about the toxicity of arsenic (III) compounds place a significant limit to their applications.

Pentavalent arsenic compounds, also known as As (V), are far less toxic than As(III). The present invention thus provides novel fluorescence and quencher dyes substituted with one or more arsonic acid or arsonate ester groups. Each ester group present in the dye is capable of providing a negative charge when deprotected, thereby improves the properties of an oligonucleotide probe labeled with such a dye.

Arsonic acid group can be compatible with a number of known dyes. Arsonic acid group is compatible with a given dye when the arsonic acid group does not induce a measurable change in the spectroscopic properties of the dye, such as excitation and emission wavelengths, quantum yield or fluorescent life time. Examples of the dyes that can be modified with an arsonic acid group include, but are not limited to the following chromophores and their combinations: rhodamines, xanthenes, carbocyanines, phthalocyanines, porphirins, triphenylmethanes, squaraines, thiosquaraines, croconium dyes, tetrazolium dyes, indigo, azodyes, quinones, phenazines and safranines, phenothiazines, coumarins, phenanthridines, acridines and acridones, fluorenes and fluorenones, 4-bora-3a,4a-diaza-s-indacenes, 1,8-naphthalimides. Other substituents may include sulfonates and phosphonates for increased polarity. Fluorinated dyes having arsonic acid groups may exhibit increased polarity and brightness along with enhanced photostability and higher quantum yields of fluorescence. Fluorine atoms can be introduced into heterocyclic rings and into carbocyanine bridges.

In addition, the present invention provides dye reagents comprising the dyes of the invention, a linker and a reactive group. The dye reagents can be reactively conjugated to an oligonucleotide, a minor groove binder or a solid support. More specifically, the present invention provides modified polar fluorescence and quencher dye reagents where the polar arsonic acids substituents are masked in their ester forms. Dyes containing arsonate esters are soluble in organic solvents compatible with the phosphoramidite method of synthesis of oligonucleotides. The removal of the negative charges of the dyes enables them to be incorporated in the automated oligonucleotide synthesis. The negative charges are restored post-synthesis to afford an oligonucleotide labeled with a dye carrying one or more polar group. Therefore, these phosphoramidite reagents can be used for introduction of arsonate dyes into the 5'-end of synthetic oligonucleotide, internal positions or to the 3'-end in the reverse synthesis using 5'-phosphoramidite reagents. Upon completion of the oligonucleotide synthesis, the arsonate esters can be deprotected, and the negative charges will be restored.

Thus, in one embodiment, the present invention provides a fluorescent dye having an arsonate polar group, as well as a dye reagent comprising such a fluorescent dye. The fluorescent dye has an excitation between 340 nm and 1100 nm and fluorescence emission maximum between 440 and 1150 nm.

Specifically, in one embodiment, the compounds of the invention are 7-aminocouramine derivatives substituted by one or more arsonate groups. The 7-aminocouramine dyes of the present invention are represented by the following general Formula (I):

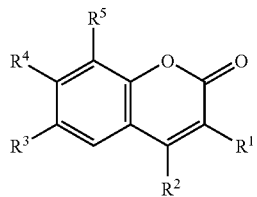

(I)

wherein,
$R^1$ is hydrogen, alkyl, —CHO, —NO$_2$, —CH$_2$R$^{11}$, —As(=O)(OR$^6$)(OR$^7$) or —As(OR$^6$)$_2$(OR$^7$)$_2$ or -L-R$_x$;
$R^2$ is hydrogen, —CN, alkyl, aralkyl, haloalkyl or —CH$_2$R$^{11}$;
$R^3$ is hydrogen, alkyl, halogen, —As(=O)(OR$^6$)(OR$^7$) or —As(OR$^6$)$_2$(OR$^7$)$_2$;
$R^4$ is —NR$^{12}$R$^{13}$, wherein R$^{12}$ and R$^{13}$ are the same or different and independently H, alkyl, aryl, alkylcarbonyl, arylcarbonyl or R$^{12}$ and R$^{13}$ together form a heterocycle;
$R^5$ is hydrogen, halogen, —As(=O)(OR$^6$)(OR$^7$) or —As(OR$^6$)$_2$(OR$^7$)$_2$;
$R^6$ and $R^7$ are the same or different and independently H, alkyl, aryl, or heteroaryl; or
$R^6$ and $R^7$ are linked together to form a 5 or 6-member heterocycle comprising the arsenic and the two oxygen atoms to which $R^6$ and $R^7$ are attached, wherein —R$^6$—R$^7$— is —[C(R$^8$)$_2$]$_w$— (w is 2 or 3), wherein each R$^8$ is the same or different and independently hydrogen, hydroxy, cyano, —OC(O)-alkyl, —OC(O)-aryl, alkyl, aryl, alkylcarbonyl, arylcarbonyl, —CH$_2$CN, —CH$_2$SO$_2$Me, —CH$_2$SO$_2$Ph, or two R$^8$ of adjacent carbons together with the carbons to which they are attached form an aryl or heteroaryl, or two R$^8$ of the same carbon form an oxo;
$R^{11}$ is —COOH, —As(=O)(OR$^6$)(OR$^7$) or —As(OR$^6$)$_2$(OR$^7$)$_2$;
L is a single covalent bond or a covalent linkage having 1-30 non-hydrogen atoms selected from the group consisting of C, N, O and S and is composed of any combination of single, double, triple or aromatic carbon-carbon bonds, carbon-nitrogen bonds, nitrogen-nitrogen bonds, carbon-oxygen bonds and carbon-sulfur bonds; and
$R_x$ is a reactive group,
provided, at least one of $R^1$, $R^3$, $R^5$ and $R^{11}$ is —As(=O)(OR$^6$)(OR$^7$) or —As(OR$^6$)$_2$(OR$^7$)$_2$.

When at least one of $R^1$ and $R^2$ comprises -L-R$_x$, Formula (I) represents an arsonate dye reagent that can be attached to an oligonucleotide, an MGB or a solid support. Typically, R$^{11}$ provides a reactive site to be coupled to a -L-R$_x$ moiety. For example, when R$^{11}$ is —COOH, the dye can be readily coupled to a -L-R$_x$ moiety having an —NH$_2$ group to provide an arsonate dye reagent. An example of such a carboxylic acid derivative of an arsonic acid dye is illustrated below:

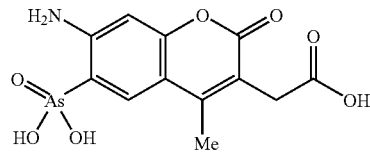

The linker is typically, but not necessarily, a linear group of atoms, such as an alkylene chain. In addition to having an —NH$_2$ group, the linker typically has another reactive site to be further coupled to a reactive group R$_x$.

For binding to a solid support, R$_x$ can be an amine-reactive group because most of the commercial solid supports, such as CPG, have an amine group. Examples of the amine reactive groups include carboxylic acid and activated carboxylic acid such as succinimidyl or pentafluorophenyl carboxylate ester. For binding to oligonucleotides, particularly during an automated synthesis, R$_x$ is a phosphoramidite group. Moreover, for purpose of automated oligonucleotide synthesis, the polar arsonic acid groups in such a dye reagent are typically masked in their ester forms, in particular, in their arsonate orthoester form.

A specific example of a dye reagent of Formula (I) has the following structure:

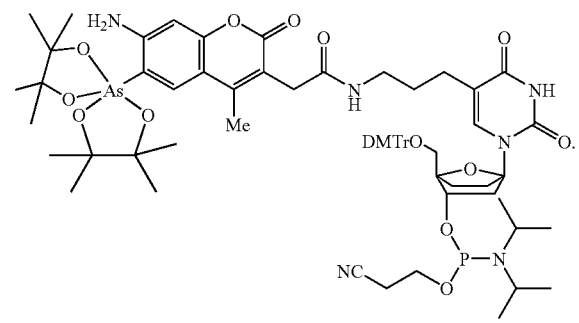

In this example, the 7-aminocouramine is substituted with an arsonate ortho ester. In addition, the linker moiety comprises a 5-hydroxy protected nucleoside (e.g., a 2-deoxyuridine). The reactive group is a phosphoramidite, which can be readily coupled with an oligonucleotide during an automated synthesis. The DMTr protected 5-hydroxy, after deprotection, can continue the chain of the base addition to complete the synthesis of a dye labeled oligonucleotide. Unlike the negatively charged arsonic acid group, the arsonate ester group is compatible with the reaction conditions in an automated synthesis.

In another embodiment, the compounds of the invention are represented by the general Formula (II):

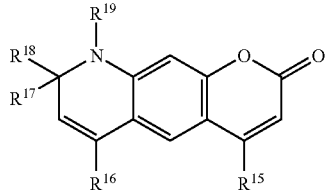
(II)

wherein, $R^{15}$ is hydrogen, alkyl, aralkyl, haloalkyl or —CN;

$R^{16}$ is —CH$_2$As(=O)(OR$^6$)(OR$^7$) or —CH$_2$As(OR$^6$)$_2$(OR$^7$)$_2$;

$R^6$ and $R^7$ are the same or different and independently H, alkyl, aryl, or heteroaryl; or $R^6$ and $R^7$ are linked together to form a 5 or 6-member heterocycle comprising the arsenic and the two oxygen atoms to which $R^6$ and $R^7$ are attached, wherein —R$^6$—R$^7$— is —[C(R$^8$)$_2$]$_w$— (w is 2 or 3), wherein each $R^8$ is the same or different and independently hydrogen, hydroxy, cyano, —OC(O)-alkyl, —OC(O)-aryl, alkyl, aryl, alkylcarbonyl, arylcarbonyl, —CH$_2$CN, —CH$_2$SO$_2$Me, —CH$_2$SO$_2$Ph, or two $R^8$ of adjacent carbons together with the carbons to which they are attached form an aryl or heteroaryl, or two $R^8$ of the same carbon form an oxo;

$R^{17}$ and $R^{18}$ are the same or different and independently hydrogen, alkyl or haloalkyl;

$R^{19}$ is hydrogen, alkyl optionally substituted with hydroxy, halogen, —COOH or —SO$_2$OH, aryl optionally substituted with hydroxy, halogen, —COOH or —SO$_2$OH, or -L-R$_x$;

L is a single covalent bond or a covalent linkage having 1-30 non-hydrogen atoms selected from the group consisting of C, N, O and S and is composed of any combination of single, double, triple or aromatic carbon-carbon bonds, carbon-nitrogen bonds, nitrogen-nitrogen bonds, carbon-oxygen bonds and carbon-sulfur bonds; and $R_x$ is a reactive group.

Typically, $R^{19}$ provides a reactive site to be coupled to a -L-R$_x$ moiety. For example, when $R^{19}$ comprises a —COOH group, the dye can be readily coupled to a -L-R$_x$ moiety having an —NH$_2$ group to provide an arsonate dye reagent. Alternatively, $R^{19}$ may comprise a —OH group, which can be coupled directly to a phosphoramidite group. The following examples represent dyes that can be readily converted to dye reagents:

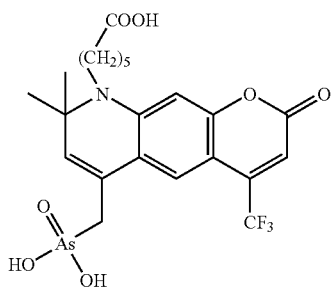

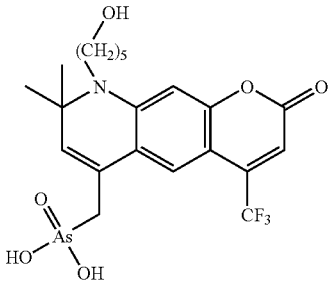

An example of a dye reagent of Formula (II) is represented by the following structure.

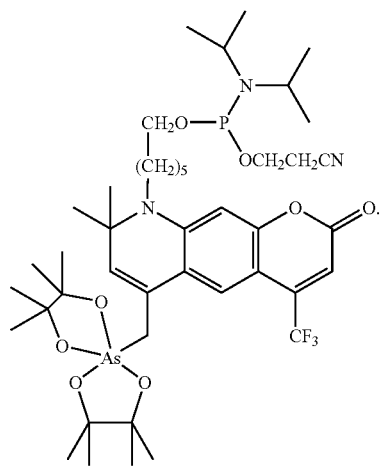

In this example, the linker is an alkylene chain, and the reactive group is a phosphoramidite group. The arsonic acid polar group is masked in an orthoester form. In an automated oligonucleotide synthesis, it can be used as the last building block in a predetermined sequence of an oligonucleotide probe.

In another embodiment, the compounds of the invention are rhodamines substituted by one or more arsonate ester group. These compounds can be represented by the following general Formula (III)

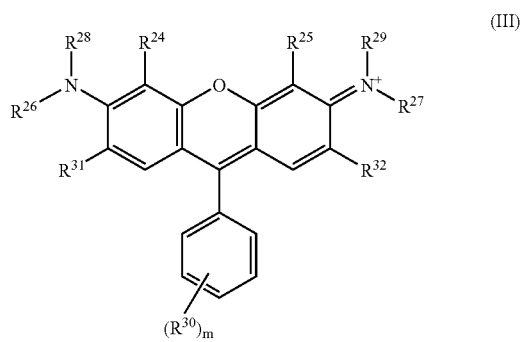
(III)

wherein, m is 1, 2, 3, 4 or 5;

$R^{24}$ and $R^{25}$ are the same or different and independently hydrogen, alkyl, halogen, —As(=O)(OR$^6$)(OR$^7$) or —As(OR$^6$)$_2$(OR$^7$)$_2$;

$R^{26}$, $R^{27}$ $R^{28}$ and $R^{29}$ are the same or different and independently hydrogen, alkyl or aryl optionally substituted by —As(=O)(OR$^6$)(OR$^7$) or —As(OR$^6$)$_2$(OR$^7$)$_2$;

$R^{31}$ are $R^{32}$ are the same or different and independently hydrogen, alkyl, halogen, —As(=O)(OR$^6$)(OR$^7$) or —As(OR$^6$)$_2$(OR$^7$)$_2$;

each $R^{30}$ is independently hydrogen, —C(O)R$^{33}$, halogen, alkyl, aralkyl, aryl, alkylthio, alkylcarbonyl, arylcarbonyl, —SO$_2$R$^{33}$, —As(=O)(OR$^6$)(OR$^7$), —As(OR$^6$)$_2$(OR$^7$)$_2$ or -L-R$_x$;

$R^{33}$ is hydroxy, —NH(CH$_2$)$_j$SO$_3$R$^{34}$, —NH(CH$_2$)$_j$As(=O)(OR$^{34}$)$_2$, —NH(CH$_2$)$_j$COOR$^{34}$, —NH(CH$_2$)$_j$OR$^{34}$ or —NH(CH$_2$)$_j$N(R$^{34}$)$_2$ (j is an integer between 2-6);

each $R^{34}$ is the same or different and independently hydrogen, alkyl, aryl or heteroaryl;

$R^{24}$ and $R^{28}$ may optionally form a 5 or 6-member heterocycle;

$R^{25}$ and $R^{29}$ may optionally form a 5 or 6-member heterocycle;

$R^{26}$ and $R^{28}$ may optionally form a 5-9 member heterocycle optionally substituted by —As(=O)(OR$^6$)(OR$^7$) or —As(OR$^6$)$_2$(OR$^7$)$_2$;

$R^{27}$ and $R^{29}$ may optionally form a 5-9 member heterocycle optionally substituted by —As(=O)(OR$^6$)(OR$^7$) or —As(OR$^6$)$_2$(OR$^7$)$_2$;

$R^{26}$ and $R^{31}$ may optionally form a 5 or 6-member heterocycle optionally substituted with hydrogen, alkyl —CH$_2$As(=O)(OR$^6$)(OR$^7$) or —CH$_2$As(OR$^6$)$_2$(OR$^7$)$_2$;

$R^{27}$ and $R^{32}$ may optionally form a 5 or 6-member heterocycle optionally substituted with hydrogen, alkyl —CH$_2$As(=O)(OR$^6$)(OR$^7$) or —CH$_2$As(OR$^6$)$_2$(OR$^7$)$_2$;

$R^6$ and $R^7$ are the same or different and independently H, alkyl, aryl, or heteroaryl; or $R^6$ and $R^7$ are linked together to form a 5 or 6-member heterocycle comprising the arsenic and the two oxygen atoms to which $R^6$ and $R^7$ are attached, wherein —R$^6$—R$^7$— is —[C(R$^8$)$_2$]$_w$— (w is 2 or 3), wherein each $R^8$ is the same or different and independently hydrogen, hydroxy, cyano, —OC(O)-alkyl, —OC(O)-aryl, alkyl, aryl, alkylcarbonyl, arylcarbonyl, —CH$_2$CN, —CH$_2$SO$_2$Me, —CH$_2$SO$_2$Ph, or two $R^8$ of adjacent carbons together with the carbons to which they are attached form an aryl or heteroaryl, or two $R^8$ of the same carbon form an oxo; and L is a single covalent bond or a covalent linkage having 1-30 non-hydrogen atoms selected from the group consisting of C, N, O and S and is composed of any combination of single, double, triple or aromatic carbon-carbon bonds, carbon-nitrogen bonds, nitrogen-nitrogen bonds, carbon-oxygen bonds and carbon-sulfur bonds; and $R_x$ is a reactive group, provided, at least one of the $R^{24}$, $R^{25}$, $R^{26}$ $R^{27}$, $R^{28}$, $R^{29}$, $R^{30}$, $R^{31}$, $R^{32}$ and $R^{33}$ is or comprises —As(=O)(OR$^6$)(OR$^7$) or —As(OR$^6$)$_2$(OR$^7$)$_2$.

In one embodiment, $R^{26}$, $R^{27}$ $R^{28}$ and $R^{29}$ are each hydrogen. $R^{24}$ and $R^{25}$ are each arsonic acid. The dye of Formula (III) thus has the following structure:

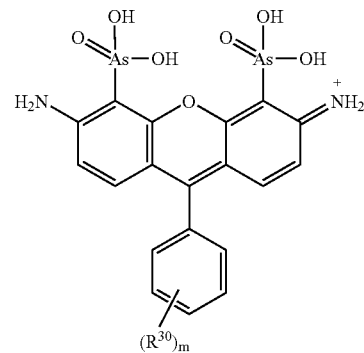

Typically, $R^{30}$ provides a reactive site to be coupled to a -L-R$_x$ moiety. For example, when $R^{30}$ is —COOH, the dye can be readily coupled to a -L-R$_x$ moiety having an —NH$_2$ group to provide an arsonate dye reagent. An example of such a carboxylic acid derivative of an arsonic acid dye is illustrated below:

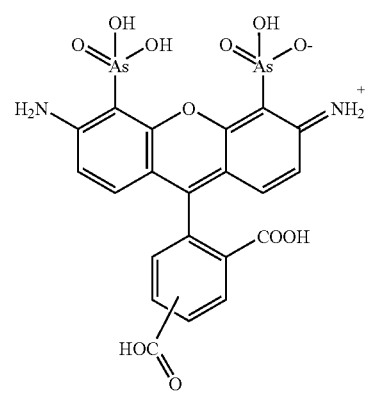

In another embodiment, $R^{26}$ and $R^{31}$ may optionally form a 5 or 6-member heterocycle, and $R^{27}$ and $R^{32}$ may optionally form a 5 or 6-member heterocycle. Exemplary compounds have the following molecular frameworks, according to Formula (IIIA) and (IIIB), wherein each of the 5 or 6-member rings are optionally substituted with $R^{54}$ and $R^{55}$, respectively. Each $R^{54}$ and $R^{55}$ are the same or different and independently hydrogen, alkyl, —CH$_2$As(=O)(OR$^6$)(OR$^7$) or —CH$_2$As(OR$^6$)$_2$(OR$^7$)$_2$. The dashed bonds indicate the possibility of different degrees of unsaturation in the N-containing heterocycles.

(IIIA)

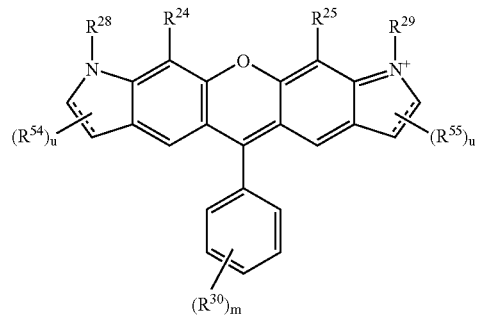

(IIIB)

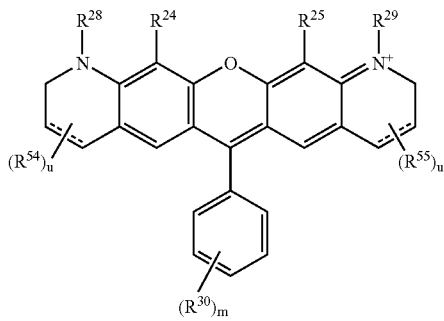

Typically, the N-containing heterocycles of Formulae (IIIA) and (IIIB) are further substituted with one or more substituents $R^{54}$ and $R^{55}$. Each $R^{54}$ and $R^{55}$ are the same or different and independently hydrogen, alkyl, or alkyl substituted with a polar arsonic acid group. For example, $R^{54}$ and $R^{55}$ are each —$CH_2As(=O)(OH)_2$.

In addition, the phenyl group is substituted with one or more $R^{30}$ groups. Typically, $R^{30}$ provides a -L-$R_x$ moiety of a corresponding dye reagent. For example, a -L-$R_x$ moiety such as —$NH(CH_2)_jSO_3R^{34}$, —$NH(CH_2)_jAs(=O)(OR^{34})_2$, —$NH(CH_2)_jCOOR^{34}$, —$NH(CH_2)_jOR^{34}$ or —$NH(CH_2)_jN(R^{34})_2$, (j is an integer between 2-6), can be coupled to a —$SO_3H$ or a —COOH substituent of the phenyl group. $R^{34}$ is, typically, a reactive group ($R_x$) and can be alkyl, aryl, heteroaryl. For example, $R^{34}$ is pentafluorophenyl or maleimide. Examples of carboxylic acid derivatives of a dye of Formulae (IIIA) and (IIIB) are illustrated below. Some of the corresponding dye reagents are shown in Table I.

In a further embodiment, $R^{24}$ and $R^{28}$ of Formula (IIIB) may optionally form a 5 or 6-member heterocycle, and $R^{25}$ and $R^{29}$ may optionally form a 5 or 6-member heterocycle. Exemplary compounds have the following molecular frameworks according to Formula (IIIC):

(IIIC)

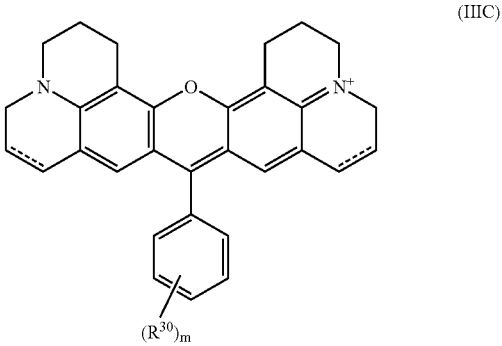

The dashed bonds indicate the possibility of different degrees of unsaturation in the N-containing heterocycles. Each N-containing heterocycle can be optionally substituted with —$CH_2As(=O)(OR^6)(OR^7)$ or —$CH_2As(OR^6)_2(OR^7)_2$;

Typically, $R^{30}$ provides additional polar groups. For example, $R^{30}$ is —$SO_2OH$, —$SO_2NH(CH_2)_jSO_3H$, —$SO_2NH(CH_2)_jAs(=O)(OH)_2$, —$SO_2NH(CH_2)_jCOOH$ or —$SO_2NH(CH_2)_jOH$ (j is an integer between 2-6.)

Alternatively, $R^{30}$ provides a -L-$R_x$ moiety of a corresponding dye reagent. For example, a -L-$R_x$ moiety such as —$NH(CH_2)_jSO_3R^{34}$, —$NH(CH_2)_jAs(=O)(OR^{34})_2$, —$NH(CH_2)_jCOOR^{34}$, —$NH(CH_2)_jOR^{34}$ or —$NH(CH_2)_jN(R^{34})_2$, (j is an integer between 2-6), can be coupled to a —$SO_3H$ or a —COOH substituent of the phenyl group. $R^{34}$ is, typically, a reactive group ($R_x$) and can be alkyl, aryl, heteroaryl. For example, $R^{34}$ is pentafluorophenyl or maleimide. Examples of such dye reagent of Formulae (IIIC) are shown in Table I.

In a further embodiment, $R^{27}$ and $R^{29}$ may optionally form a 5-9 member heterocycle, and $R^{26}$ and $R^{28}$ may optionally form a 5-9 member heterocycle, each heterocycle may be optionally substituted by —$As(=O)(OR^6)(OR^7)$ or —$As(OR^6)_2(OR^7)_2$. In one embodiment, each N-containing heterocycle is a 5 or 6-member ring. In another embodiment, each N-containing heterocycle is a 9-member bicyclic ring. An exemplary molecular framework Formula (IIID) is shown below:

(IIID)

It is noted that not all compounds of Formula (III) are fluorescent. When the nitrogen can rotate freely, in other words, when it is not locked into a fused ring with the benzene ring, the compound is capable of dispersing light energy into heat. Such compounds can be used as quenchers, as defined herein. For example, compounds represented by Formulae (IIIA)-(IIIC) are fluorescent; compounds represented by Formula (IIID) are quenchers.

As discussed above, when one of the $R^{30}$ groups is -L-$R_x$, the compound of Formula (III) is a dye reagent. In particular, for purpose of automated oligonucleotide synthesis, the polar groups in a dye reagent are typically masked in their arsonate ester forms. Specific examples of fluorescent rhodamine dye reagents and rhodamine quencher dye reagents of Formula (III) are shown in Table 1. Additional rhodamine quencher dyes in their activated ester forms are illustrated in FIG. 7.

TABLE I

IIIa

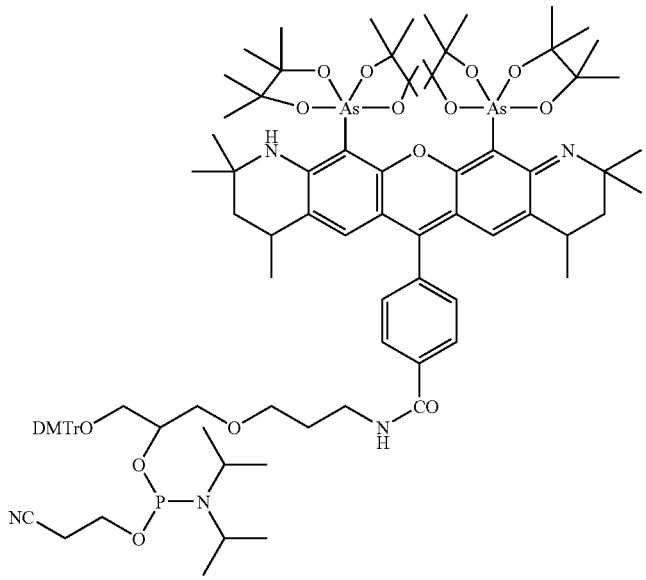

IIIb

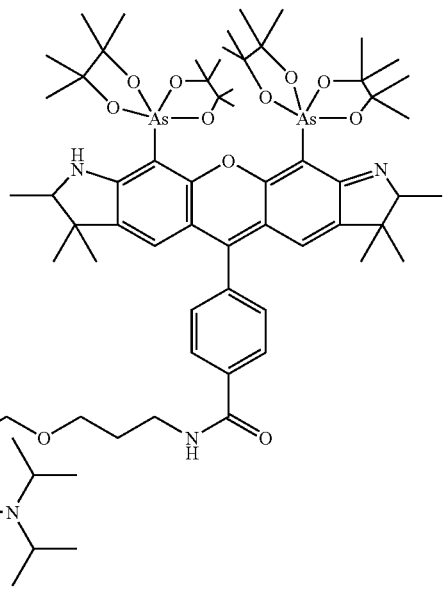

TABLE I-continued
IIIc[a]
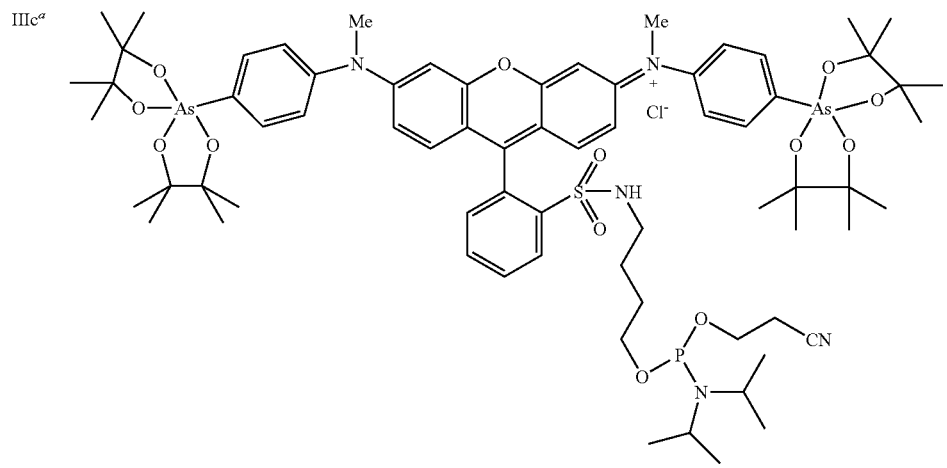
IIId[b]
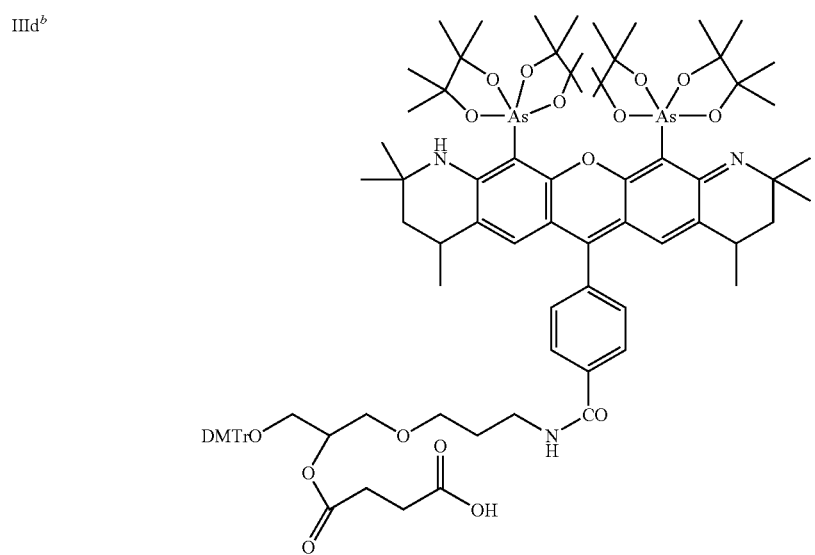
IIIe[a]
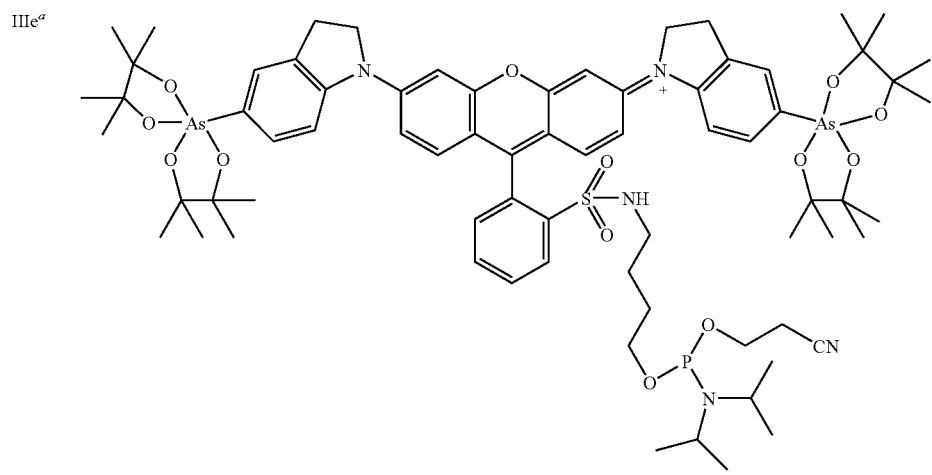

TABLE I-continued

IIIf
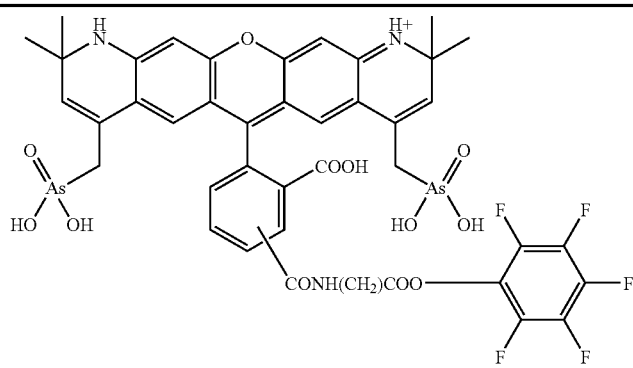

IIIg[a]
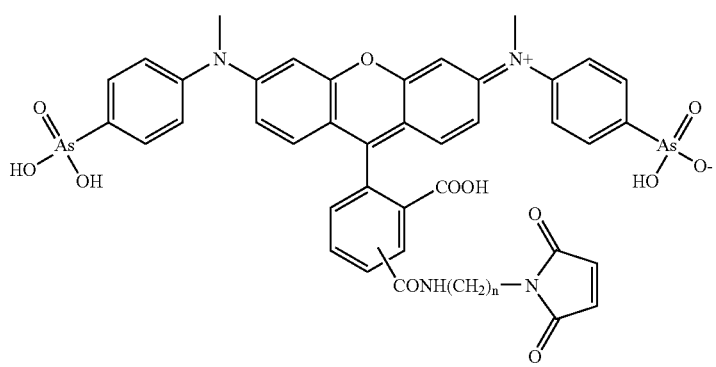

IIIh
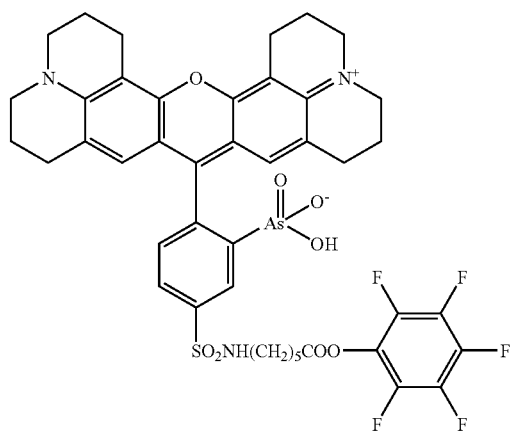

[a]Quencher dye
[b]The reactive carboxylic group couples to a —NH$_2$ group of a CPG support.

In another embodiment, the present invention provides fluorescence quencher dyes with enhanced polarity, and their corresponding dye reagents for automated synthesis. The quencher dyes and their reagents can be presented by the following general Formula (IV):

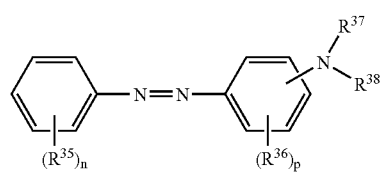

(IV)

wherein,
each $R^{35}$ is the same or different and independently hydrogen, halogen, —NO$_2$, —CN, —SO$_3^-$, alkoxy, amine, dialkylamine, monoalkylamine, —N═N—$R^{39}$, —As(═O)(OR$^6$)(OR$^7$) or —As(OR$^6$)$_2$(OR$^7$)$_2$;
n is 1, 2 or 3;
p is 1 or 2;
each $R^{36}$ is the same or different and independently hydrogen, halogen, —NO$_2$, —CN, —SO$_3^-$, alkoxy, amine, dialkylamine, monoalkylamine, —N═N—$R^{39}$, —As(═O)(OR$^6$)(OR$^7$) or —As(OR$^6$)$_2$(OR$^7$)$_2$;
$R^6$ and $R^7$ are the same or different and independently H, alkyl, aryl, or heteroaryl; or
$R^6$ and $R^7$ are linked together to form a 5 or 6-member heterocycle comprising the arsenic and the two oxygen atoms to which $R^6$ and $R^7$ are attached, wherein —$R^6$—$R^7$— is —[C(R$^8$)$_2$]$_w$— (w is 2 or 3), wherein each R$^8$ is the same or different and independently hydrogen, hydroxy, cyano, —OC(O)-alkyl, —OC(O)-aryl, alkyl, aryl, alkylcarbonyl, arylcarbonyl, —CH$_2$CN, —CH$_2$SO$_2$Me, —CH$_2$SO$_2$Ph, or two R$^8$ of adjacent carbons together with the carbons to which they are attached form an aryl or heteroaryl, or two R$^8$ of the same carbon form an oxo;

R$^{37}$ and R$^{38}$ are the same or different and independently hydrogen, alkyl, aralkyl, aryl or -L-R$_x$;

R$^{39}$ is aryl or heteroaryl optionally substituted with one or more —As(=O)(OR$^6$)(OR$^7$) or —As(OR$^6$)$_2$(OR$^7$)$_2$;

L is a single covalent bond or a covalent linkage having 1-30 non-hydrogen atoms selected from the group consisting of C, N, O and S and is composed of any combination of single, double, triple or aromatic carbon-carbon bonds, carbon-nitrogen bonds, nitrogen-nitrogen bonds, carbon-oxygen bonds and carbon-sulfur bonds; and R$_x$ is a reactive group, provided, at least one of the R$^{35}$ and R$^{36}$ is —As(=O)(OR$^6$)(OR$^7$) or —As(OR$^6$)$_2$(OR$^7$)$_2$.

When at least one of R$^{37}$ and R$^{38}$ is -L-R$_x$, the present invention provides a dye reagent suitable for automated oligonucleotide synthesis. Examples of fluorescence quencher dye reagent with arsonate groups are shown below:

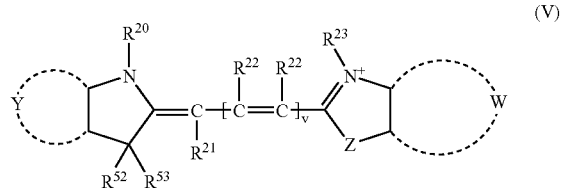

wherein, v is 0, 1, 2, 3, 4, 5 or 6;

Y represents atoms necessary to form one or two fused aromatic rings having 6 atoms in each ring, each ring atom is the same or different and independently =CR$^{46}$—, =N$^+$R$^{47}$— or =N—;

W represents atoms necessary to form one or two fused aromatic rings having 6 atoms in each ring, each ring atom is the same or different and independently =CR$^{46}$—, =N$^+$R$^{47}$— or =N—;

Z is —O—, —S—, —Se—, —C(R$^{48}$)$_2$— or —NR$^{49}$—;

R$^{20}$ and R$^{23}$ are the same or different and independently alkyl, aralkyl or substituted alkyl substituted with hydroxy, cyano, nitro, amino, sulfonyl, phosphonyl, —As(=O)(OR$^6$)(OR$^7$), —As(OR$^6$)$_2$(OR$^7$)$_2$, —COOH, alkoxy, monoalkylamino, dialkylamino or trialkylamonium or L-R$_x$;

R$^{52}$ and R$^{53}$ are the same or different and independently hydrogen, alkyl, alkyl substituted hydroxy, —COOH, halogen, cyano, nitro, amine, alkylamino, dialkylamino, sulfonyl, phosphonyl, —As(=O)(OR$^6$)(OR$^7$), As(OR$^6$)$_2$(OR$^7$)$_2$ or L-R$_x$;

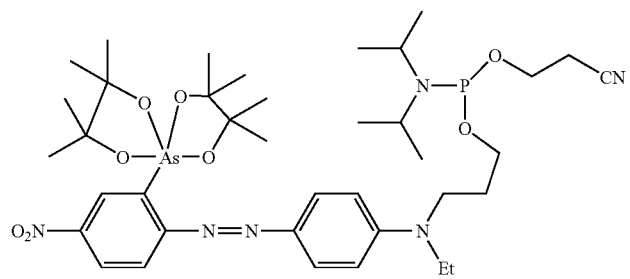

(IVa)

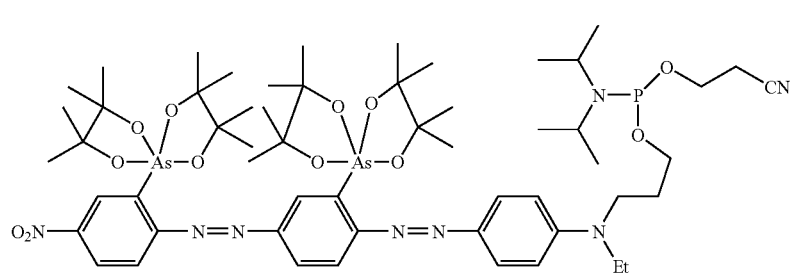

(IVb)

Other representative linkers and reactive groups can be those as described in U.S. Pat. Nos. 6,653,473 and 6,727,356. Additional examples of polar quencher dyes reagents are illustrated in FIG. 10.

In another embodiment, the present invention provides fluorescent carbocyanine dye derivatives and dye reagents having the following general Formula (V):

$R^{21}$ and each $R^{22}$ are the same or different and independently hydrogen, halogen, alkoxy, hydroxy, mercapto, aryloxy, heterocycle, iminium ion, L-$R_x$, or two adjacent $R^{21}$ and $R^{22}$ or any two adjacent $R^{22}$ form a 4, 5 or 6 member carbocycle, optionally substituted with alkyl, halogen or oxo; or two $R^{22}$ that are one carbon away from each other, together with the carbons to which they are attached, form a 4, 5 or 6 member carbocycle, optionally substituted with alkyl, halogen, alkylthio, arylthio, alkoxy, aryloxy, oxo (=O), =S or =C($R^{50}$)$_2$;

each $R^{46}$ and $R^{47}$ is the same or different and independently hydrogen, alkyl, aryl, halogen, cyano, nitro, amine, alkylamino, dialkylamino, sulfonyl, phosphonyl, —As(=O)(OR$^6$)(OR$^7$), As(OR$^6$)$_2$(OR$^7$)$_2$ or L-$R_x$;

each $R^{48}$ and $R^{49}$ is the same or different and independently hydrogen or alkyl optionally substituted with hydroxy, —COOH, halogen, cyano, nitro, amine, alkylamino, dialkylamino, sulfonyl, phosphonyl, —As(=O)(OR$^6$)(OR$^7$), As(OR$^6$)$_2$(OR$^7$)$_2$ or L-$R_x$;

each $R^{50}$ is the same or different and independently hydrogen, alkyl, cyano, —C(O)NHR$^{48}$;

$R^6$ and $R^7$ are the same or different and independently H, alkyl, aryl, or heteroaryl; or $R^6$ and $R^7$ are linked together to form a 5 or 6-member heterocycle comprising the arsenic and the two oxygen atoms to which $R^6$ and $R^7$ are attached, wherein —$R^6$—$R^7$— is —[C($R^8$)$_2$]$_w$— (w is 2 or 3), wherein each $R^8$ is the same or different and independently hydrogen, hydroxy, cyano, —OC(O)-alkyl, —OC(O)-aryl, alkyl, aryl, alkylcarbonyl, arylcarbonyl, —CH$_2$CN, —CH$_2$SO$_2$Me, —CH$_2$SO$_2$Ph, or two $R^8$ of adjacent carbons together with the carbons to which they are attached form an aryl or heteroaryl, or two $R^8$ of the same carbon form an oxo;

L is a single covalent bond or a covalent linkage having 1-30 non-hydrogen atoms selected from the group consisting of C, N, O and S and is composed of any combination of single, double, triple or aromatic carbon-carbon bonds, carbon-nitrogen bonds, nitrogen-nitrogen bonds, carbon-oxygen bonds and carbon-sulfur bonds; and $R_x$ is a reactive group, provided, at least one of the $R^{20}$, $R^{23}$ $R^{46}$, $R^{47}$, $R^{48}$, $R^{49}$, $R^{52}$ and $R^{53}$ is —As(=O)(OR$^6$)(OR$^7$) or As(OR$^6$)$_2$(OR$^7$)$_2$.

Specifically, in one embodiment, Formula (V) is a Cy5 cyanine dye derivative, represented by Formula (Va):

(Va)

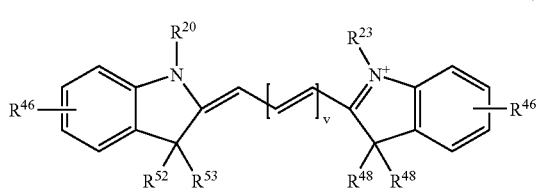

wherein, $R^{20}$, $R^{23}$, $R^{48}$, $R^{46}$, $R^{52}$ and $R^{53}$ are as previously defined.

In a more specific embodiment, each $R^{48}$, $R^{52}$ and $R^{53}$ is methyl, each $R^{20}$ and $R^{23}$ is the same or different and independently —(CH$_2$)$_t$SO$_3$H, —(CH$_2$)$_t$AsO$_3$H$_2$, —(CH$_2$)$_t$COOH or —(CH$_2$)$_t$OH (t is an integer between 1-6), and each $R^{46}$ is —As(=O)(OR$^6$)(OR$^7$) or As(OR$^6$)$_2$(OR$^7$)$_2$.

In a further embodiment, Formula (V) is another type of Cy5 cyanine dye derivative, represented by Formula (Vb):

(Vb)

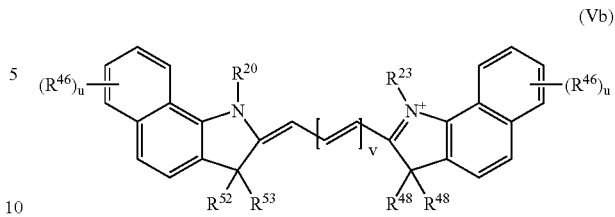

wherein, $R^{20}$, $R^{23}$, $R^{48}$, $R^{46}$, $R^{52}$ and $R^{53}$ are as previously defined, u is 1 or 2.

In a more specific embodiment, each $R^{52}$, $R^{53}$ and $R^{48}$ is methyl, each $R^{20}$ and $R^{23}$ is the same or different and independently —(CH$_2$)$_t$SO$_3$H, —(CH$_2$)$_t$AsO$_3$H$_2$, —(CH$_2$)$_t$COOH or —(CH$_2$)$_t$OH (t is an integer between 1-6), and each $R^{46}$ is —As(=O)(OR$^6$)(OR$^7$) or As(OR$^6$)$_2$(OR$^7$)$_2$.

In another embodiment, two $R^{22}$ that are one carbon away from each other, together with the carbons to which they are attached, form a 4, 5 or 6 member carbocycle. These compounds can be more specifically represented by Formula (Vc) below:

(Vc)

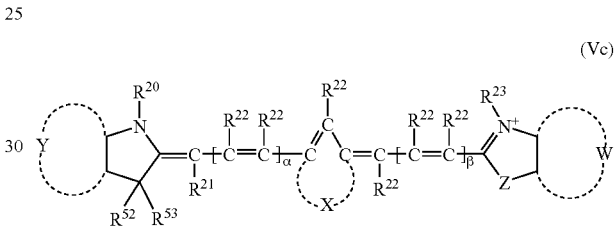

wherein,

X represents atoms necessary to form one 4-, 5- or 6-member carbocycle ring, the carbocycle ring being optionally substituted with alkyl, halogen, alkylthio, arylthio, alkoxy, aryloxy, oxo (=O), =S or =C($R^{50}$)$_2$; and $\alpha+\beta=v-2$, while all the other R groups, Y and W are as previously defined.

Specifically, in one embodiment, the carbocycle is a cyclobutene and $\alpha$ and $\beta$ are each zero, Y and W are each fused benzene. These dyes are generally referred as squaraines and thiosquaraines dyes and can be represented by Formula (Vd) below:

(Vd)

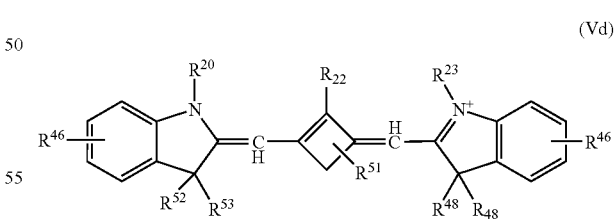

wherein, $R^{51}$ is alkyl, halogen, alkylthio, arylthio, alkoxy, aryloxy, oxo (=O), =S or =C($R^{50}$)$_2$, and all the other R groups are as previously defined.

More specifically, each $R^{48}$, $R^{52}$ and $R^{53}$ is methyl, each $R^{20}$ and $R^{23}$ is the same or different and independently —(CH$_2$)$_t$SO$_3$H, —(CH$_2$)$_t$AsO$_3$H$_2$, —(CH$_2$)$_t$COOH or —(CH$_2$)$_t$OH (t is an integer between 1-6), each $R^{46}$ is —As(=O)(OR$^6$)(OR$^7$) or As(OR$^6$)$_2$(OR$^7$)$_2$, and $R^{22}$ is hydroxy, mercapto or substituted alkyl.

Squaraines and thiosquaraines dyes with arsonic acid groups present a practically useful combination of high water solubility and unique spectral properties of this class of dyes. These dyes are particular useful for biological conjugation and staining since their spectral properties dramatically depend on the environment [U.S. Patent Publication No. 2003/0235846]. The squaraine-based biological labels exhibit high Stokes' shift, lower quantum yield ($\phi$=0.15) as free dyes in water solutions and very high quantum yields ($\phi$=0.6-0.7) when bound to biomolecules [Oswald B., Patsenker L., Duschl J., Szmacinski H., Wolfbeis O. S., Terpetschnig E. "Synthesis, spectral properties, and detection limits of reactive squaraine dyes, a new class of diode laser compatible fluorescent protein labels" *Bioconjug Chem*. November-December, 10(6), pp 925-31, 1999].

In another specific embodiment, the carbocycle is a cyclohexene, $\alpha$ and $\beta$ are each 1, Y and W are each fused benzene, compounds of Formula (V) are fluorescent IR dyes. They can be represented according to Formula (Ve) below.

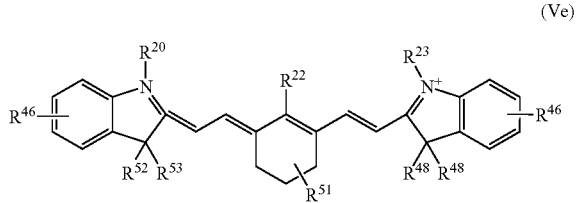

(Ve)

wherein, $R^{51}$ is alkyl, halogen, alkylthio, arylthio, alkoxy, aryloxy, oxo (=O), =S or =C($R^{50}$)$_2$, and all the other R groups are as previously defined.

More specifically, each $R^{48}$, $R^{52}$ and $R^{53}$ is methyl, each $R^{20}$ and $R^{23}$ is the same or different and independently —(CH$_2$)$_t$SO$_3$H, —(CH$_2$)$_t$AsO$_3$H$_2$, —(CH$_2$)$_t$COOH or —(CH$_2$)$_t$OH (t is an integer between 1-6), each $R^{46}$ is —As(=O)(OR$^6$)(OR$^7$) or As(OR$^6$)$_2$(OR$^7$)$_2$, and $R^{22}$ is hydroxy, mercapto or substituted alkyl.

In another specific embodiment, the carbocycle is a cyclohexene, $\alpha$ and $\beta$ are each 1, Y and W are each fused naphthalene, compounds of Formula (V) are fluorescent IR dyes. They can be represented according to Formula (Vf) below.

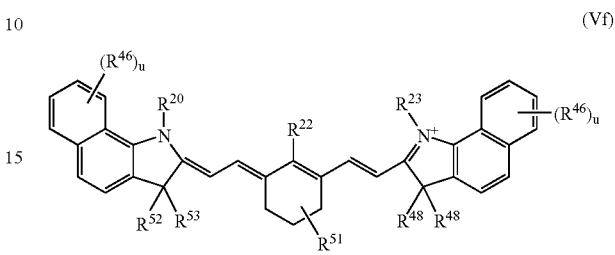

(Vf)

wherein, $R^{51}$ is alkyl, halogen, alkylthio, arylthio, alkoxy, aryloxy, oxo (=O), =S or =C($R^{50}$)$_2$, u is 1 or 2, and all the other R groups are as previously defined.

More specifically, each $R^{48}$, $R^{52}$ and $R^{53}$ is methyl, each $R^{20}$ and $R^{23}$ is the same or different and independently —(CH$_2$)$_t$SO$_3$H, —(CH$_2$)$_t$AsO$_3$H$_2$, —(CH$_2$)$_t$COOH or —(CH$_2$)$_t$OH (t is an integer between 1-6), each $R^{46}$ is —As(=O)(OR$^6$)(OR$^7$) or As(OR$^6$)$_2$(OR$^7$)$_2$, and $R^{22}$ is hydroxy, mercapto or substituted alkyl.

When at least one of $R^{20}$, $R^{23}$, $R^{46}$, $R^{47}$, $R^{48}$, $R^{49}$, $R^{52}$ and $R^{53}$ is -L-R$_x$, the present invention provides a dye reagent suitable for automated oligonucleotide synthesis.

In one embodiment, R$_x$ is an activated carboxylic acid in its pentafluorophenyl ester form. The group is particularly amine-reactive and is capable of attaching to an MGB, a solid support, a dye or an oligonucleotide having an amine functional group. Specific examples are shown below:

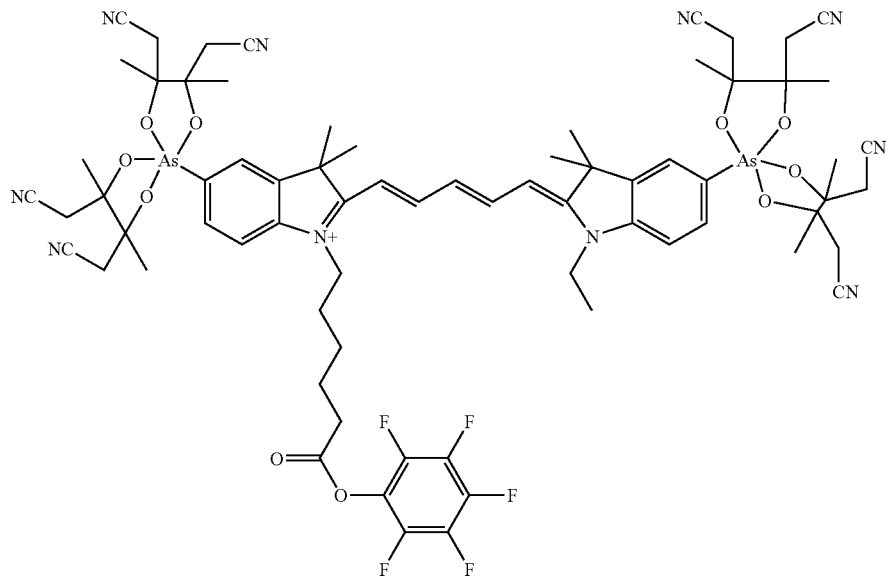

-continued

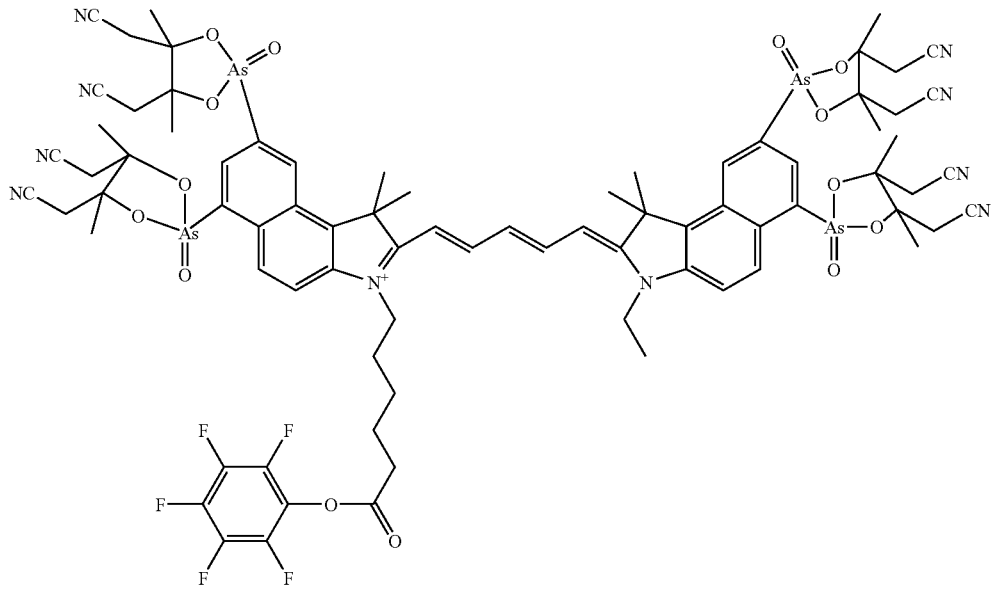

In a further embodiment, the present invention provides a modified fluorescent IR dye with enhanced polarity and stability having the following general Formula (VI):

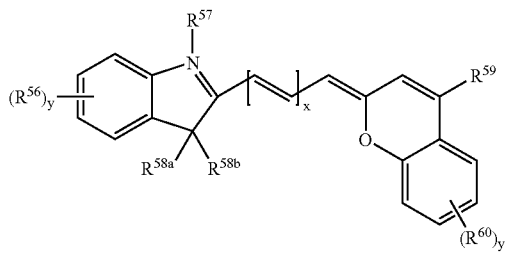

(VI)

wherein, y is 1, 2 or 3;

x is 0, 1, 2, or 3;

each $R^{56}$ is the same or different and independently hydrogen, halogen, hydroxy, —As(=O)(OR$^6$)(OR$^7$) or —As(OR$^6$)$_2$(OR$^7$)$_2$;

$R^6$ and $R^7$ are the same or different and independently H, alkyl, aryl, or heteroaryl; or $R^6$ and $R^7$ are linked together to form a 5 or 6-member heterocycle comprising the arsenic and the two oxygen atoms to which $R^6$ and $R^7$ are attached, wherein —R$^6$—R$^7$— is —[C(R$^8$)$_2$]$_w$— (w is 2 or 3), wherein each $R^8$ is the same or different and independently hydrogen, hydroxy, cyano, —OC(O)-alkyl, —OC(O)-aryl, alkyl, aryl, alkylcarbonyl, arylcarbonyl, —CH$_2$CN, —CH$_2$SO$_2$Me, —CH$_2$SO$_2$Ph, or two $R^8$ of adjacent carbons together with the carbons to which they are attached form an aryl or heteroaryl, or two $R^8$ of the same carbon form an oxo;

$R^{57}$ is alkyl, aralkyl or alkyl substituted with hydroxy, cyano, nitro, amino, sulfonyl, phosphonyl, —As(=O)(OR$^6$)(OR$^7$), —As(OR$^6$)$_2$(OR$^7$)$_2$, —COOH, alkoxy, monoalkylamino, dialkylamino or trialkylamonium or L-R$_x$;

$R^{58a}$ and $R^{58b}$ are the same or different and independently hydrogen, alkyl, alkyl substituted with hydroxy, —COOH, halogen, cyano, nitro, amine, alkylamino, dialkylamino, sulfonyl, phosphonyl, —As(=O)(OR$^6$)(OR$^7$), As(OR$^6$)$_2$(OR$^7$)$_2$ or L-R$_x$;

$R^{59}$ is hydrogen, alkyl or aralkyl;

each $R^{60}$ is the same or different and independently hydrogen, —NR$^{61a}$R$^{61b}$, alkyl, aryl, —As(=O)(OR$^6$)(OR$^7$), —As(OR$^6$)$_2$(OR$^7$)$_2$;

each $R^{61a}$ and $R^{61b}$ is the same or different and independently hydrogen, alkyl, alkyl substituted with hydroxy, —COOH, halogen, cyano, nitro, amine, alkylamino, dialkylamino, sulfonyl, phosphonyl, —As(=O)(OR$^6$)(OR$^7$), As(OR$^6$)$_2$(OR$^7$)$_2$ or L-R$_x$;

L is a single covalent bond or a covalent linkage having 1-30 non-hydrogen atoms selected from the group consisting of C, N, O and S and is composed of any combination of single, double, triple or aromatic carbon-carbon bonds, carbon-nitrogen bonds, nitrogen-nitrogen bonds, carbon-oxygen bonds and carbon-sulfur bonds; and $R_x$ is a reactive group, provided, at least one of $R^{56}$, $R^{58a}$, $R^{58b}$, $R^{60}$ and $R^{61a}$ and $R^{61b}$ is or comprises —As(=O)(OR$^6$)(OR$^7$) or —As(OR$^6$)$_2$(OR$^7$)$_2$.

Typical examples of compounds of Formula (VI) can be further represented by Formula (VIa), wherein, $R^{60}$ is an arsonic acid group, $R^{57}$ is an alkyl or alkylene chain terminated with a polar group such as —SO$_3$H, —AsO$_3$H$_2$, —COOH and —OH, $R^{59}$ is a t-butyl group and $R^{60}$ is a dialkylamino group.

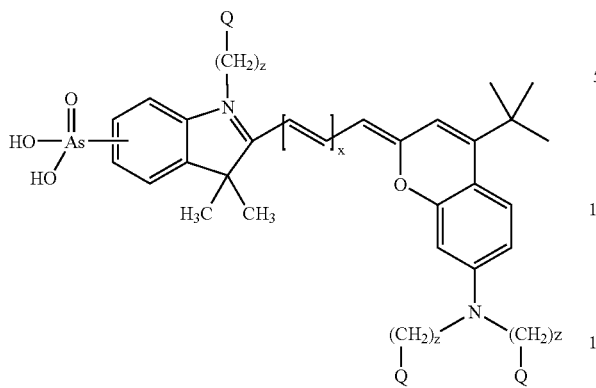

each Q is independently H, —SO₃H, —AsO3H2, —COOH or —OH z is 1-6 (VIa)

In a further embodiment, the present invention provides another modified fluorescent IR dye with enhanced polarity and stability having the following general Formula (VII):

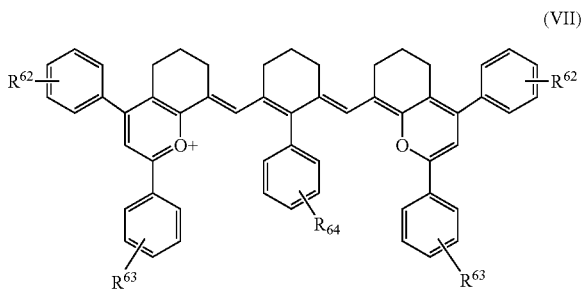

wherein, each $R^{62}$ is the same or different and independently hydrogen, halogen, hydroxy, —As(=O)(OR⁶)(OR⁷) or —As(OR⁶)₂(OR⁷)₂, alkyl, alkyl substituted with hydroxy, —COOH, halogen, cyano, nitro, amine, alkylamino, dialkylamino, sulfonyl, phosphonyl, —As(=O)(OR⁶)(OR⁷), As(OR⁶)₂(OR⁷)₂ or L-$R_x$;

$R^6$ and $R^7$ are the same or different and independently H, alkyl, aryl, or heteroaryl; or $R^6$ and $R^7$ are linked together to form a 5 or 6-member heterocycle comprising the arsenic and the two oxygen atoms to which $R^6$ and $R^7$ are attached, wherein —R⁶—R⁷— is —[C(R⁸)₂]$_w$— (w is 2 or 3), wherein each $R^8$ is the same or different and independently hydrogen, hydroxy, cyano, —OC(O)-alkyl, —OC(O)-aryl, alkyl, aryl, alkylcarbonyl, arylcarbonyl, —CH₂CN, —CH₂SO₂Me, —CH₂SO₂Ph, or two $R^8$ of adjacent carbons together with the carbons to which they are attached form an aryl or heteroaryl, or two $R^8$ of the same carbon form an oxo;

each $R^{63}$ and $R^{64}$ are the same or different and independently hydrogen, halogen, hydroxy, —As(=O)(OR⁶)(OR⁷) or —As(OR⁶)₂(OR⁷)₂, alkyl, alkyl substituted with hydroxy, —COOH, halogen, cyano, nitro, amine, alkylamino, dialkylamino, sulfonyl, phosphonyl, —As(=O)(OR⁶)(OR⁷), As(OR⁶)₂(OR⁷)₂ or L-$R_x$;

L is a single covalent bond or a covalent linkage having 1-30 non-hydrogen atoms selected from the group consisting of C, N, O and S and is composed of any combination of single, double, triple or aromatic carbon-carbon bonds, carbon-nitrogen bonds, nitrogen-nitrogen bonds, carbon-oxygen bonds and carbon-sulfur bonds; and $R_x$ is a reactive group, provided, at least one of $R^{62}$, $R^{63}$ and $R^{64}$ is or comprises —As(=O)(OR⁶)(OR⁷) or —As(OR⁶)₂(OR⁷)₂.

In a further embodiment, the present invention provides a fluorescent xanthene derivative substituted by one or more arsonate ester group. These compounds can be represented by the following general Formula (VIII)

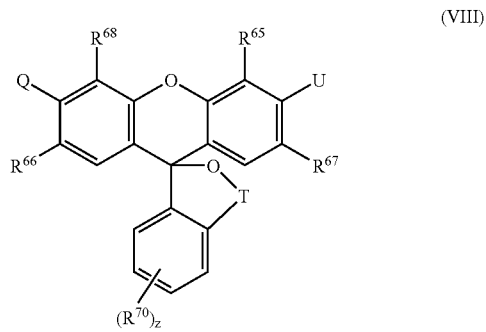

wherein, z is 1, 2 or 3;

T is >C=O or >S(=O)₂;

Q is —OR⁷¹ or —NR⁷²R⁷³;

U is —OR⁷⁴ or —NR⁷⁵R⁷⁶;

each $R^{68}$ and $R^{65}$ are the same or different and independently hydrogen, halogen, hydroxy, alkyl, aryl or —CH₂As(=O)(OR⁶)(OR⁷) or —CH₂As(OR⁶)₂(OR⁷)₂;

each $R^{66}$ and $R^{67}$ are the same or different and independently hydrogen, halogen, hydroxy, alkyl or L-$R_x$;

each $R^{70}$ is the same or different and independently hydrogen, halogen, alkyl, —As(=O)(OR⁶)(OR⁷), —As(OR⁶)₂(OR⁷)₂ or L-$R_x$;

$R^6$ and $R^7$ are the same or different and independently H, alkyl, aryl, or heteroaryl; or $R^6$ and $R^7$ are linked together to form a 5 or 6-member heterocycle comprising the arsenic and the two oxygen atoms to which $R^6$ and $R^7$ are attached, wherein —R⁶—R⁷— is —[C(R⁸)₂]$_w$— (w is 2 or 3), wherein each $R^8$ is the same or different and independently hydrogen, hydroxy, cyano, —OC(O)-alkyl, —OC(O)-aryl, alkyl, aryl, alkylcarbonyl, arylcarbonyl, —CH₂CN, —CH₂SO₂Me, —CH₂SO₂Ph, or two $R^8$ of adjacent carbons together with the carbons to which they are attached form an aryl or heteroaryl, or two $R^8$ of the same carbon form an oxo;

each $R^{71}$ and $R^{74}$ are the same or different and independently is hydrogen, alkylcarbonyl or arylcarbonyl;

each $R^{72}$, $R^{73}$, $R^{75}$ and $R^{76}$ are the same or different and independently hydrogen, alkyl or aryl; or $R^{71}$ and $R^{68}$, together with the carbons to which they are attached, form a 5 or 6 member heterocycle; or $R^{74}$ and $R^{65}$, together with the carbons to which they are attached, form a 5 or 6 member heterocycle; or $R^{72}$ and $R^{68}$, together with the carbons to which they are attached, form a 5 or 6 member heterocycle; or $R^{73}$ and $R^{66}$, together with the carbons to which they are attached, form a 5 or 6 member heterocycle; or $R^{75}$ and $R^{65}$, together with the carbons to which they are attached, form a 5 or 6 member heterocycle; or $R^{76}$ and $R^{67}$, together with the carbons to which they are attached, form a 5 or 6 member heterocycle;

L is a single covalent bond or a covalent linkage having 1-30 non-hydrogen atoms selected from the group consisting of C, N, O and S and is composed of any combination of single, double, triple or aromatic carbon-carbon bonds, carbon-nitrogen bonds, nitrogen-nitrogen bonds, carbon-oxygen bonds and carbon-sulfur bonds; and $R_x$ is a reactive group, provided, at least one of $R^{65}$, $R^{66}$ $R^{67}$, $R^{68}$ and $R^{71}$ is or comprises —As(=O)(OR$^6$)(OR$^7$) or —As(OR$^6$)$_2$(OR$^7$)$_2$.

Typically, $R^{71}$ and $R^{74}$ are each alkylcarbonyl, more typically, t-butylcarbonyl.

When $R^{74}$ and $R^{65}$, together with the carbons to which they are attached, form a 5 or 6 member heterocycle, compounds of Formula (VIII) can be more specifically represented by Formula (VIIIa) below:

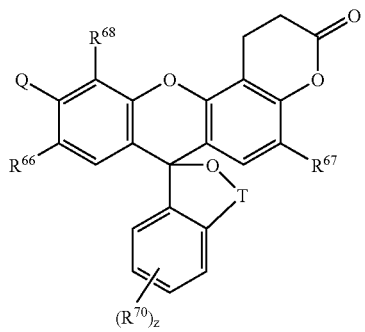

(VIIIa)

When $R^{75}$ and $R^{65}$, together with the carbons to which they are attached, form a 5 or 6 member heterocycle; and $R^{76}$ and $R^{67}$, together with the carbons to which they are attached, form a 5 or 6 member heterocycle, compounds of Formula (VIII) can be more specifically represented by Formula (VIIIb) below:

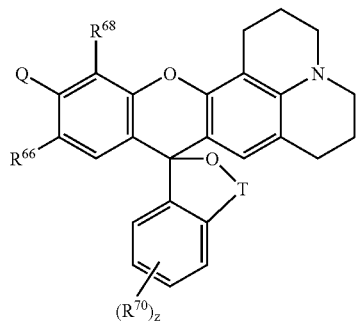

When at least one of $R^{66}$; $R^{67}$ and $R^{70}$ is -L-$R_x$, the present invention provides a xanthene dye reagent suitable for automated oligonucleotide synthesis.

In one embodiment, $R_x$ is phosphoramidite group for automated oligonucleotide synthesis. In another embodiment, $R_x$ is a carboxylic acid, an isothiocyanate, or a maleimide group an activated carboxylic acid in its pentafluorophenyl ester form. Specific xanthene dye reagents are illustrated in FIGS. 8 and 9.

In a further embodiment, the present invention provides a modified MGB with enhanced polarity and hydrophilicity having the following general Formula (IX):

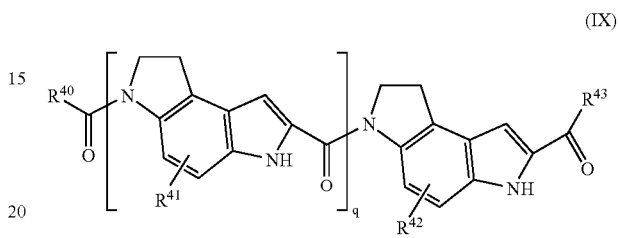

(IX)

wherein, $R^{40}$ and $R^{43}$ are the same or different and independently hydrogen, hydroxy, amino, alkyl, aryl, alkoxy or -L-$R_x$, provided at least one of $R^{40}$ and $R^{43}$ is -L-$R_x$;

each $R^{41}$ is independently hydrogen, halogen, hydroxy, sulfonyl, phosphonyl, —As(=O)(OR$^6$)(OR$^7$) or —As(OR$^6$)$_2$ (OR$^7$)$_2$;

$R^6$ and $R^7$ are the same or different and independently H, alkyl, aryl, or heteroaryl; or $R^6$ and $R^7$ are linked together to form a 5 or 6-member heterocycle comprising the arsenic and the two oxygen atoms to which $R^6$ and $R^7$ are attached, wherein —$R^6$—$R^7$— is —[C(R$^8$)$_2$]$_w$— (w is 2 or 3), wherein each $R^8$ is the same or different and independently hydrogen, hydroxy, cyano, —OC(O)-alkyl, —OC(O)-aryl, alkyl, aryl, alkylcarbonyl, arylcarbonyl, —CH$_2$CN, —CH$_2$SO$_2$Me, —CH$_2$SO$_2$Ph, or two $R^8$ of adjacent carbons together with the carbons to which they are attached form an aryl or heteroaryl, or two $R^8$ of the same carbon form an oxo;

q is 0, 1 or 2;

$R^{42}$ is hydrogen, halogen, hydroxy, —As(=O)(OR$^6$)(OR$^7$) or —As(OR$^6$)$_2$(OR$^7$)$_2$;

L is a single covalent bond or a covalent linkage having 1-30 non-hydrogen atoms selected from the group consisting of C, N, O and S and is composed of any combination of single, double, triple or aromatic carbon-carbon bonds, carbon-nitrogen bonds, nitrogen-nitrogen bonds, carbon-oxygen bonds and carbon-sulfur bonds; and $R_x$ is a reactive group, provided, at least one of $R^{41}$ and $R^{42}$ is —As(=O)(OR$^6$)(OR$^7$) or —As(OR$^6$)$_2$(OR$^7$)$_2$.

In one embodiment, the present invention provides an MGB of Formula (IX) wherein at least one of $R^{41}$ and $R^{42}$ is —As(=O)(OR$^6$)(OR$^7$) or —As(OR$^6$)$_2$(OR$^7$)$_2$.

The MGB of the present invention are reactively attachable to an oligonucleotide, a dye and a solid support via the reactive group. Moreover, for purpose of automated oligonucleotide synthesis, the polar groups in a dye reagent are typically masked in their arsonate ester forms. The following are two specific examples of MGB having polar groups:

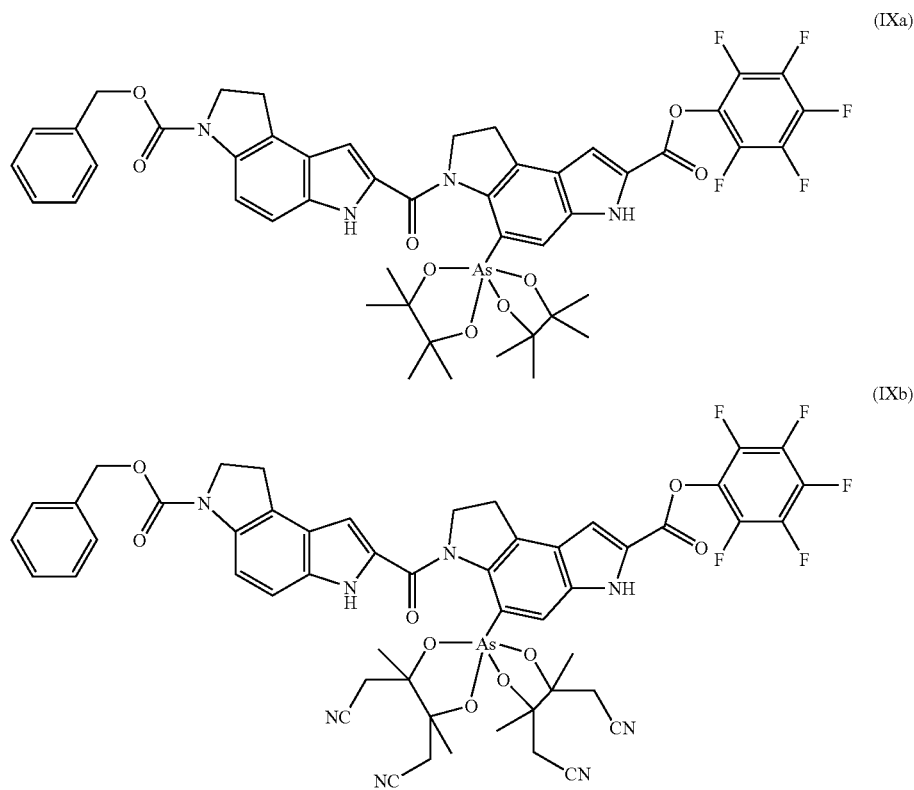

In these examples, the reactive groups are activated carboxylic acid in their pentafluorophenyl ester form. The group is particularly amine-reactive and is capable of attaching to MGB, a solid support, a dye or an oligonucleotide having an amine functional group.

3. Applications and Methods of Using the Polar Dyes

In one aspect, the present invention provides a method of using a dye compound having one or more polar arsonic group in staining a biological sample by combining a dye compound of Formula (I)-(VIII) having one or more arsonate group —As(=O)(OR$^6$)(OR$^7$) or —As(OR$^6$)$_2$(OR$^7$)$_2$, with a biological sample in a concentration sufficient to yield a detectable optical response under a desired condition.

In one aspect of the invention, the dye compounds of the invention are used to directly stain or label a sample so that the sample can be identified or quantitated. For instance, such dyes may be added as part of an assay for a biological target analyte, as a detectable tracer element in a biological or non-biological fluid; or for such purposes as photodynamic therapy of tumors, in which a dyed sample is irradiated to selectively destroy tumor cells and tissues; or to photoablate arterial plaque or cells, usually through the photosensitized production of singlet oxygen. In one preferred embodiment, the dye conjugate is used to stain a sample that comprises a ligand for which the conjugated substance is a complementary member of a specific binding pair.

Typically, the sample is obtained directly from a liquid source or as a wash from a solid material (organic or inorganic) a growth medium in which cells have been introduced for culturing, or a buffer solution in which cells have been placed for evaluation. Where the sample comprises cells, the cells are optionally single cells, including microorganisms, or multiple cells associated with other cells in two or three dimensional layers, including multicellular organisms, embryos, tissues, biopsies, filaments, biofilms, etc.

Alternatively, the sample is a solid, optionally a smear or scrape or a retentate removed from a liquid or vapor by filtration. In one aspect of the invention, the sample is obtained from a biological fluid, including separated or unfiltered biological fluids such as urine, cerebrospinal fluid, blood, lymph fluids, tissue homogenate, interstitial fluid, cell extracts, mucus, saliva, sputum, stool, physiological secretions or other similar fluids. Alternatively, the sample is obtained from an environmental source such as soil, water, or air; or from an industrial source such as taken from a waste stream, a water source, a supply line, or a production lot.

In yet another embodiment, the sample is present on or in solid or semi-solid matrix. In one aspect of the invention, the matrix is a membrane. In another aspect, the matrix is an electrophoretic gel, such as is used for separating and characterizing nucleic acids or proteins, or is a blot prepared by transfer from an electrophoretic gel to a membrane. In another aspect, the matrix is a silicon chip or glass slide, and the analyte of interest has been immobilized on the chip or slide in an array (e.g. the sample comprises proteins or nucleic acid polymers in a microarray). In yet another aspect, the matrix is a microwell plate or microfluidic chip, and the sample is analyzed by automated methods, typically by various methods of high-throughput screening, such as drug screening.

The dye compounds of the invention are generally utilized by combining a dye compound of the invention as described above with the sample of interest under conditions selected to yield a detectable optical response. The term "dye compound" is used herein to refer to all aspects of the claimed dyes, including both reactive dyes and dyes conjugated to a biological substance or biomolecule. The dye compound typically forms a covalent or non-covalent association or complex with an element of the sample, or is simply present within the bounds of the sample or portion of the sample. The sample is then illuminated at a wavelength selected to elicit the optical response. Typically, staining the sample is used to determine a specified characteristic of the sample by further comparing the optical response with a standard or expected response.

A detectable optical response means a change in, or occurrence of, an optical signal that is detectable either by observation or instrumentally. Typically, the detectable response is a change in fluorescence, such as a change in the intensity, excitation or emission wavelength distribution of fluorescence, fluorescence lifetime, fluorescence polarization, or a combination thereof. The degree and/or location of staining, compared with a standard or expected response, indicates whether and to what degree the sample possesses a given characteristic. Some dyes of the invention may exhibit little fluorescence emission, but are still useful as chromophoric dyes. Such chromophores are useful as energy acceptors in FRET applications, or to simply impart the desired color to a sample or portion of a sample.

For biological applications, the dye compounds of the invention are typically used in an aqueous, mostly aqueous or aqueous-miscible solution prepared according to methods generally known in the art. The exact concentration of dye compound is dependent upon the experimental conditions and the desired results, but typically ranges from about one nanomolar to one millimolar or more. The optimal concentration is determined by systematic variation until satisfactory results with minimal background fluorescence are accomplished.

The dye compounds are most advantageously used to stain samples with biological components. The sample may comprise heterogeneous mixtures of components (including intact cells, cell extracts, bacteria, viruses, organelles, and mixtures thereof), or a single component or homogeneous group of components (e.g. natural or synthetic amino acid, nucleic acid or carbohydrate polymers, or lipid membrane complexes). These dyes are generally non-toxic to living cells and other biological components, within the concentrations of use.

The dye compound is combined with the sample in any way that facilitates contact between the dye compound and the sample components of interest. Typically, the dye compound or a solution containing the dye compound is simply added to the sample. Certain dyes of the invention, particularly those that are substituted by one or more sulfonic acid or arsonic acid moieties, tend to be impermeable to membranes of biological cells, and once inside viable cells are typically well retained. Treatments that permeabilize the plasma membrane, such as electroporation, shock treatments or high extracellular ATP can be used to introduce selected dye compounds into cells. Alternatively, selected dye compounds can be physically inserted into cells, e.g. by pressure microinjection, scrape loading, patch clamp methods, or phagocytosis.

Arsonate dyes in their neutral ester forms may adhere to or penetrate biological membranes. Optionally, the ester forms may hydrolyze in the microenvironment providing a polar form of the dye on either side of the membrane or inside the cell, therefore providing a research or diagnostic tool.

Dyes that incorporate an aliphatic amine or a hydrazine residue can be microinjected into cells, where they can be fixed in place by aldehyde fixatives such as formaldehyde or glutaraldehyde. This fixability makes such dyes useful for intracellular applications such as neuronal tracing.

Dye compounds that possess a lipophilic substituent, such as phospholipids, will non-covalently incorporate into lipid assemblies, e.g. for use as probes for membrane structure; or for incorporation in liposomes, lipoproteins, films, plastics, lipophilic microspheres or similar materials; or for tracing. Lipophilic dyes are useful as fluorescent probes of membrane structure.

Chemically reactive dye compounds will covalently attach to a corresponding functional group on a wide variety of materials, forming dye conjugates as described above. Using dye compounds to label reactive sites on the surface of cells, in cell membranes or in intracellular compartments such as organelles, or in the cell's cytoplasm, permits the determination of their presence or quantity, accessibility, or their spatial and temporal distribution in the sample. Photo-reactive dyes can be used similarly to photo-label components of the outer membrane of biological cells or as photo-fixable polar tracers for cells.

Preferred compounds that can be used for the methods of the invention include those where $R_x$ is a carboxylic acid, an activated ester of a carboxylic acid, an amine, an azide, a hydrazide, a haloacetamide, an alkyl halide, an isothiocyanate, or a maleimide group; and those where the biological substance is an antibody, a peptide, a lectin, a polysaccharide, a nucleotide, a nucleoside, an oligonucleotide, a nucleic acid polymer, an ion-complexing moiety, a lipid, or a non-biological organic polymer or polymeric microparticle, that is optionally bound to one or more additional fluorophores that are the same or different.

Optionally, the sample is washed after staining to remove residual, excess or unbound dye compound. The sample is optionally combined with one or more other solutions in the course of staining, including wash solutions, permeabilization and/or fixation solutions, and solutions containing additional detection reagents. An additional detection reagent typically produces a detectable response due to the presence of a specific cell component, intracellular substance, or cellular condition, according to methods generally known in the art. Where the additional detection reagent has, or yields a product with, spectral properties that differ from those of the subject dye compounds, multi-color applications are possible. This is particularly useful where the additional detection reagent is a dye or dye-conjugate of the present invention having spectral properties that are detectably distinct from those of the staining dye.

The compounds of the invention that are dye conjugates are used according to methods extensively known in the art; e.g. use of antibody conjugates in microscopy and immunofluorescent assays; and nucleotide or oligonucleotide conjugates for nucleic acid hybridization assays and nucleic acid sequencing (e.g., U.S. Pat. No. 5,332,666 to Prober, et al. (1994); U.S. Pat. No. 5,171,534 to Smith, et al. (1992); U.S. Pat. No. 4,997,928 to Hobbs (1991); and WO Appl. 94/05688 to Menchen, et al.; all incorporated by reference). Dye-conjugates of multiple independent dyes of the invention possess utility for multi-color applications.

At any time after or during staining, the sample is illuminated with a wavelength of light selected to give a detectable optical response, and observed with a means for detecting the optical response. Equipment that is useful for illuminating the dye compounds of the invention includes, but is not limited to, hand-held ultraviolet lamps, mercury arc lamps, xenon lamps, lasers and laser diodes. These illumination sources are optionally integrated into laser scanners, fluorescence microplate readers, standard or minifluorometers, or chromatographic detectors. Preferred embodiments of the invention are dyes that are be excitable at or near the wavelengths 633-636 nm, 647 nm, 660 nm, 680 nm and beyond 700 nm, as these regions closely match the output of relatively inexpensive excitation sources.

The optical response is optionally detected by visual inspection, or by use of any of the following devices: CCD cameras, video cameras, photographic film, laser-scanning devices, fluorometers, photodiodes, quantum counters, epifluorescence microscopes, scanning microscopes, flow cytometers, fluorescence microplate readers, or by means for amplifying the signal such as photomultiplier tubes. Where the sample is examined using a flow cytometer, examination of the sample optionally includes sorting portions of the sample according to their fluorescence response.

In another aspect, the present invention provides a method of using a dye reagent of Formula (I)-(VIII), wherein $R_x$ is a phosphoramidite group, in an automated oligonucleotide synthesis, comprising:

performing automated synthesis of oligonucleotide using phosphoramidite method to provide a dye-labeled oligonucleotide, wherein a dye reagent is conjugated to a solid support or an elongating chain of oligonucleotide, isolating the dye-labeled oligonucleotide from the reaction medium; and deprotecting the polar groups of the dye-labeled oligonucleotide to provide a dye-labeled oligonucleotide having negatively charged polar groups.

Detailed descriptions of the procedures for solid phase synthesis of oligonucleotides by phosphite-triester, phosphotriester, and H-phosphonyl chemistries are widely available. See, for example, Itakura, U.S. Pat. No. 4,401,796; Caruthers, et al., U.S. Pat. Nos. 4,458,066 and 4,500,707; Beaucage, et al., Tetrahedron Lett., 22:1859-1862 (1981); Matteucci, et al., J. Am. Chem. Soc., 103:3185-3191 (1981); Caruthers, et al., Genetic Engineering, 4:1-17 (1982); Jones, chapter 2, Atkinson, et al., chapter 3, and Sproat, et al., chapter 4, in Oligonucleotide Synthesis: A Practical Approach, Gait (ed.), IRL Press, Washington D.C. (1984); Froehler, et al., Tetrahedron Left., 27:469-472 (1986); Froehler, et al., Nucleic Acids Res., 14:5399-5407 (1986); Sinha, et al. Tetrahedron Lett., 24:5843-5846 (1983); and Sinha, et al., Nucl. Acids Res., 12:4539-4557 (1984) which are incorporated herein by reference in their entireties.

Generally, the timing of delivery and concentration of monomeric nucleotides utilized in a coupling cycle will not differ from the protocols typical for commercial phosphoramidites used in commercial DNA synthesizers. In these cases, one may merely add the solution containing the monomers to a receptacle on a port provided for an extra phosphoramidite on a commercial synthesizer (e.g., model 380B, Applied Biosystems, Foster City, Calif., U.S.A.). However, where the coupling efficiency of a particular monomer is substantially lower than the other phosphoramidites, it may be necessary to alter the timing of delivery or the concentration of the reagent in order to optimize the synthesis. Means of optimizing oligonucleotide synthesis protocols to correct for low coupling efficiencies are well known to those of skill in the art. Generally one merely increases the concentration of the reagent or the amount of the reagent delivered to achieve a higher coupling efficiency. Methods of determining coupling efficiency are also well known. For example, where the 5'-hydroxyl protecting group is dimethoxytrityl (DMTr), coupling efficiency may be determined by measuring the DMTr cation concentration during the acidic removal of the DMTr group. DMTr cation concentration is usually determined by spectrophotometrically monitoring the acid wash. The acid/DMTr solution is a bright orange color. Alternatively, since capping prevents further extension of an oligonucleotide where coupling has failed, coupling efficiency may be estimated by comparing the ratio of truncated to full length oligonucleotides utilizing, for example, capillary electrophoresis or HPLC.

Solid phase oligonucleotide synthesis may be performed using a number of solid supports. A suitable support is one that provides a functional group for the attachment of a protected monomer, which will become the 3' terminal base in the synthesized oligonucleotide. The support must be inert to the reagents utilized in the particular synthesis chemistry. Suitable supports are well known to those of skill in the art. Solid support materials include, but are not limited to polyacryloylmorpholide, silica, controlled pore glass (CPG), polystyrene, polystyrene/latex, and carboxyl-functionalized Teflon®. Preferred supports are amino-functionalized controlled pore glass and polystyrene.

Solid phase oligonucleotide synthesis requires, as a starting point, a fully protected monomer (e.g., a protected nucleoside) coupled to the solid support. This coupling is typically through the 3'-hydroxyl. Typically, a linker group is covalently bound to the 3'-hydroxyl on one end and covalently bound to the solid support on the other end. The first synthesis cycle then couples a nucleotide monomer, via its 3'-phosphate, to the 5'-hydroxyl of the bound nucleoside through a condensation reaction that forms a 3'-5' phosphodiester linkage. Subsequent synthesis cycles add nucleotide monomers, including $P_1$-modified monomers, to the 5'-hydroxyl of the last bound nucleotide. In this manner, an oligonucleotide is synthesized in a 3' to 5' direction producing a "growing" oligonucleotide with its 3' terminus attached to the solid support.

Numerous means of linking nucleoside monomers to a solid support are known to those skilled in the art. Typically, monomers covalently linked through a succinate or hemisuccinate to controlled pore glass are generally used. Conventional protected nucleosides coupled through a hemisuccinate to controlled pore glass are commercially available from a number of sources (e.g., Glen Research, Sterling, Vermont, U.S.A.; Applied Biosystenis, Foster City, Calif., U.S.A.; and Pharmacia LKB, Piscataway, N.J., U.S.A.).

Once the full length oligonucleotide is synthesized, the oligonucleotide is deprotected and cleaved from the solid support prior to use. Cleavage and deprotection may occur simultaneously or sequentially in any order. The two procedures may be interspersed so that some protecting groups are removed from the oligonucleotide before it is cleaved off the solid support and other groups are deprotected from the cleaved oligonucleotide in solution. The sequence of events depends on the particular blocking groups present, the particular linkage to a solid support, and the preferences of the individuals performing the synthesis. Where deprotection precedes cleavage, the protecting groups may be washed away from the oligonucleotide, which remains bound on the solid support. Conversely, where deprotection follows cleavage, the removed protecting groups will remain in solution with the oligonucleotide. Often the oligonucleotide will require isolation from these protecting groups prior to use.

In a preferred embodiment, and most commercial DNA syntheses, the protecting group on the 5'-hydroxyl is removed at the last stage of synthesis. The oligonucleotide is then cleaved off the solid support, and the remaining deprotection occurs in solution. Removal of the 5'-hydroxyl protecting group typically requires treatment with the same reagent utilized throughout the synthesis to remove the terminal 5'-hydroxyl protecting groups prior to coupling the next nucleotide monomer. Where the 5'-hydroxyl protecting group is a dimethoxytrityl group, deprotection can be accomplished by treatment with acetic acid, dicloroacetic acid, trichloroacetic acid or trifluoroacetic acid.

Where the oligonucleotide is a ribonucleotide and the 2'-hydroxyl group is blocked with a tert-butyldimethylsilyl (TBDMS) moiety, the latter group may be removed using tetrabutylammonium fluoride in tetrahydrofuran at the end of synthesis. See Wu, et al., J. Org. Chem. 55:4717-4724 (1990). Phenoxyacetyl protecting groups can be removed with anhydrous ammonia in alcohol (under these conditions the TBDMS groups are stable and the oligonucleotide is not cleaved). The benzoyl protecting group of cytidine is also removed with anhydrous ammonia in alcohol.

Cleaved and fully deprotected oligonucleotides may be used directly (after lyophilization or evaporation to remove the deprotection reagent) or they may be purified prior to use. Purification of synthetic oligonucleotides is generally desired to isolate the full length oligonucleotide from the protecting groups that were removed in the deprotection step and, more importantly, from the truncated oligonucleotides that were formed when oligonucleotides that failed to couple with the next nucleotide monomer were capped during synthesis.

Oligonucleotide purification techniques are well known to those of skill in the art. Methods include, but are not limited to, thin layer chromatography (TLC) on silica plates, gel electrophoresis, size fractionation (e.g., using a Sephadex column), reverse phase high performance liquid chromatography (HPLC) and anion exchange chromatography (e.g., using the mono-Q column, Pharmacia-LKB, Piscataway, N.J., U.S.A.). For a discussion of oligonucleotide purification see McLaughlin, et al., chapter 5, and Wu, et al., chapter 6 in Oligonucleotide Synthesis: A Practical Approach, Gait (ed.), IRL, Press, Washington, D.C., (1984).

4. Dye-labeled Oligonucleotide Probes

The present invention further provides dye-labeled oligonucleotides probes, or dye-oligonucleotide conjugates, which are useful in detecting complementary DNA or RNA targets.

The oligonucleotides of the present invention are single-stranded, natural or synthetic DNA or RNA, PNA (peptide nucleic acids) and LNA (locked nucleic acids) that incorporate at least one of the dye labels of Formula (I)-(VIII). The dye labels are incorporated into the sequence of an oligonucleotide via covalent bonding. In doing so, dye reagents equipped with reactive groups are coupled to a solid support or an oligonucleotide, thereby are introduced to a sequence of oligonucleotide at pre-determined locations.

As discussed above, the dye reagents of the present invention are particularly suitable for, but are not limited to, the automated synthesis of oligonucleotides using the phosphoramidite method. The reactive groups of such dye reagents are phosphoramidites, for example, a cyanoethyl protected phosphoramidite. The polar groups in a dye reagent are masked in their ester forms such that the dye reagent does not carry any negative charges. The masked dye reagent is thus compatible with the anhydrous and mildly acidic conditions required in the automated synthesis. Upon completion of the oligonucleotide synthesis, the ester protecting groups are removed and the negatively charged polar groups, such as, $-AsO_3^{2-}$ or $-AsO_3H^-$, are regenerated.

Thus, in another embodiment, the present invention provides an oligonucleotide labeled with a fluorescent and/or quencher dye having one or more $-As(=O)(OR^6)_2$ or $-As(OR^6)_2(OR^7)_2$, wherein, $R^6$ and $R^7$ are the same or different and independently H, alkyl, aryl, or heteroaryl; or $R^6$ and $R^7$ are linked together to form a 5 or 6-member heterocycle comprising the arsenic and the two oxygen atoms to which $R^6$ and $R^7$ are attached, wherein $-R^6-R^7-$ is $-[C(R^8)_2]_w-$ (w is 2 or 3), wherein each $R^8$ is the same or different and independently hydrogen, hydroxy, cyano, $-OC(O)$-alkyl, $-OC(O)$-aryl, alkyl, aryl, alkylcarbonyl, arylcarbonyl, $-CH_2CN$, $-CH_2SO_2Me$, $-CH_2SO_2Ph$, or two $R^8$ of adjacent carbons together with the carbons to which they are attached form an aryl or heteroaryl, or two $R^8$ of the same carbon form an oxo.

In a further embodiment, the dye-labeled oligonucleotide further comprises one or more minor grove binders (MGB) for improved binding efficiency and hybridization stability. The MGB itself can be optionally modified to comprise one or more polar groups for enhanced polarity and hydrophilicity in order to be more compatible with the hybridization condition. More specifically, the oligonucleotide of the present invention can be optionally conjugated to an MGB of Formula (VI).

In one embodiment, the dye-labeled oligonucleotides are prepared during post-synthetic conjugation by introducing the dye to an oligonucleotide on a solid support or in a solution.

In another embodiment, the oligonucleotides of the present invention are prepared by automated synthesis comprising the following steps:

protecting all negatively charged polar groups of a dye by esterification such that the dye no longer carries negative charges, the dye further comprising a reactive group capable of conjugating to an oligonucleotide;

performing automated synthesis of oligonucleotide using phosphoramidite method to provide a dye-labeled oligonucleotide;

isolating the dye-labeled oligonucleotide from the reaction medium; and deprotecting the polar groups of the dye-labeled oligonucleotide to provide the negatively charged polar group.

More specifically, the oligonucleotides of the present invention are prepared by automated synthesis comprising the following steps:

providing a dye reagent of Formula (I)-(VIII) having one or more $-As(=O)(OR^6)(OR^7)$ or $-As(OR^6)_2(OR^7)_2$, wherein, $R^6$ and $R^7$ are the same or different and independently H, alkyl, aryl, or heteroaryl; or $R^6$ and $R^7$ are linked together to form a 5 or 6-member heterocycle comprising the arsenic and the two oxygen atoms to which $R^6$ and $R^7$ are attached, wherein $-R^6-R^7-$ is $-[C(R^8)_2]_w-$ (w is 2 or 3), wherein each $R^8$ is the same or different and independently hydrogen, hydroxy, cyano, $-OC(O)$-alkyl, $-OC(O)$-aryl, alkyl, aryl, alkylcarbonyl, arylcarbonyl, $-CH_2CN$, $-CH_2SO_2Me$, $-CH_2SO_2Ph$, or two $R^8$ of adjacent carbons together with the carbons to which they are attached form an aryl or heteroaryl, or two $R^8$ of the same carbon form an oxo;

performing automated synthesis of oligonucleotide using phosphoramidite method to provide a dye-labeled oligonucleotide;

deprotecting $-As(=O)(OR^6)(OR^7)$ or $-As(OR^6)_2(OR^7)_2$ of the dye-labeled oligonucleotide to provide a dye-labeled oligonucleotide having negatively charged polar group selected from $-AsO_3^{2-}$ or $-AsO_3H^-$; and isolating the dye-labeled oligonucleotide from the reaction medium.

The dye-labeled oligonucleotides of the present invention are useful as probes for detecting a complementary strand of nucleic acid in a biological sample in a variety of DNA amplification/quantification strategies including, for example, 5'-nuclease assay, Strand Displacement Amplification (SDA), Nucleic Acid Sequence-Based Amplification (NASBA), Rolling Circle Amplification (RCA), as well as for direct detection of targets in solution phase or solid phase (e.g. array) assays.

Furthermore, the dye-labeled oligonucleotide of the present invention can be used as probes in substantially any formats such as TAQMAN™ probes, molecular beacons, SCORPIONS™ probes/primers, SUNRISE™ probes, conformationally assisted probes, light up probes and Invader Detection probes. WO01/86001 describes nucleic acid probes having dark quenchers in nucleic acid amplification, detection and quantification, which application is incorporated herein in its entirety.

Thus, the present invention provides a method of using the oligonucleotide conjugated to one or more dye compounds of Formulae (I-III) and (V-VIII) to directly detect a target having a complementary sequence to the oligonucleotide, the oligonucleotide further optionally comprising an MGB optionally substituted with one or more arsonic polar groups, comprising the steps of:

adding a dye-labeled oligonucleotide probe to a biological sample, wherein the probe is complementary or substantially complementary to a target nucleic acid;

allowing the probe to hybridize with the target nucleic acid under an appropriate condition and for sufficient amount of time; and detecting fluorescence emitted from the dye.

The oligonucleotide bearing both a quencher dye and a fluorescent reporter dye with one or both of the dyes having at least one polar arsonic acid group, are particularly useful as probes in real time polymerase chain reaction (PCR). The PCR technology amplifies specific DNA sequences, thus allowing DNA probes assays to be executed from a single DNA target . copy. The "real time" modification of the PCR technology allows for the detection of the progress of PCR as it occurs using spectofluoremetric temperature cyclers. Three popular assay formats use DNA probes that become fluorescent as the PCR progresses include TAQMAN™, molecular beacons and SCORPIONS™ primers, all of which are hybridization of probes relying on fluorescence resonance energy transfer (FRET) for quantitation.

TAQMAN™ Probes are oligonucleotides that contain a fluorescent dye, typically on the 5' base, and a quenching dye, typically located on the 3' base. When irradiated, the excited fluorescent dye transfers energy to the nearby quenching dye molecule rather than fluorescing, resulting in a non-fluorescent substrate. TAQMAN™ probes are designed to hybridize to an internal region of a PCR product. During PCR, when the polymerase replicates a template on which a TAQMAN™ probe is bound, the 5' exonuclease activity of the polymerase cleaves the probe. This separates the fluorescent and quenching dyes and FRET no longer occurs. Fluorescence increases in each cycle, proportional to the rate of probe cleavage.

Molecular beacons also contain fluorescent and quenching dyes, but FRET only occurs when the quenching dye is directly adjacent to the fluorescent dye. Molecular beacons are designed to adopt a hairpin structure while free in solution, bringing the fluorescent dye and quencher in close proximity. When a molecular beacon hybridizes to a target, the fluorescent dye and quencher are separated, FRET does not occur, and the fluorescent dye emits light upon irradiation. Unlike TAQMAN™ probes, molecular beacons are designed to remain intact during the amplification reaction, and must rebind to target in every cycle for signal measurement.

SCORPIONS™ probes and primers are a proprietary technology of the DxS Ltd. Scorpion® primers are bi-functional molecules in which a primer is covalently linked to a probe. The molecules also contain a fluorophore (reporter) and a quencher. In the absence of a target, the quencher nearly absorbs the fluorescence emitted by the fluorophore. During the PCR reaction, in the presence of the target, the fluorophore and the quencher become separate from each other, which leads to an increase in the fluorescence emitted. The fluorescence can be detected and measured in the reaction tube.

The SCORPIONS™ primer typically carries a probe element at the 5'-end. The probe is a self-complementary stem sequence with a fluorophore at one end and a quencher at the other. The primer sequence is modified at the 5'-end. It contains a PCR blocker at the start of the hairpin loop (usually HEG monomers are added as blocking agent). In the initial PCR cycles, the primer hybridizes to the target and extension occurs due to the action of polymerase. SCORPIONS™ primers can be used to examine and identify point mutations by using multiple probes. Each probe can be tagged with a different flourophore to produce different colors.

In SCORPIONS™ primers, the probe is physically coupled to the primer which means that the reaction leading to signal generation is a unimolecular one. This is in contrast to the bi-molecular collisions required.by other technologies such as TAQMAN™ or Molecular Beacons.

After one cycle of PCR extension completes, the newly synthesized target region will be attached to the same strand as the probe. Following the second cycle of denaturation and annealing, the probe and the target hybridize. The denaturation of the hairpin loop requires less energy than the new DNA duplex produced. Consequently, the hairpin sequence hybridizes to a part of the newly produced PCR product. This results in the separation of the fluorophore from the quencher and causes emission.

TAQMAN™ probes, molecular beacons and SCORPIONS™ primers allow multiple DNA species to be measured in the same sample (multiplex PCR), since fluorescent dyes with different emission spectra may be attached to the different probes. Multiplex PCR allows internal controls to be co-amplified and permits allele discrimination in single-tube, homogeneous assays. These hybridization probes will only hybridize to true targets in a PCR and not to primer-dimers or other spurious products.

Therefore, in one aspect, the oligonucleotide of the present invention comprises a fluorescent and a quencher dye of the present invention in a conformation such that the fluorescent dye is quenched by the quencher dye, wherein one or both dyes comprise one or more arsonic polar groups. The oligonucleotide is useful as a "molecular beacon" in a real time PCR.

In one embodiment, the present invention provides a method of detecting amplification of a target sequence in real life using a TaqMan™ assay, comprising:

providing a dye-labeled oligonucleotide probe comprising an oligonucleotide conjugated to a quencher dye of Formula (IV) and a fluorescent dye of any of the Formulae (I-III) and (V-VIII), each dye having one or more polar arsonate group, wherein the probe is in a conformation allowing the fluorescent dye to be quenched by the quencher dye;

adding the dye-labeled oligonucleotide probe to a PCR reaction medium;

running the PCR temperature cycles to allow the probe to hybridize with the target and get cleaved by Taq polymerase when the target is present; and reading the fluorescence signal from the cleaved dye in the real time.

In another embodiment, the present invention provides a method of detecting amplification of a target sequence in real life using a Molecular Beacon assay, the method comprising the steps of:

providing a dye-labeled oligonucleotide probe comprising an oligonucleotide conjugated to a quencher dye of Formula (IV) and a fluorescent dye of any of the Formulae (I-III) and (V-VIII), each dye having one or more polar arsonate group, wherein the probe is in a conformation allowing the fluorescent dye to be quenched by the quencher dye;

adding the dye-labeled oligonucleotide probe to a PCR reaction medium;

running the PCR temperature cycles to allow the probe to hybridize with the target thereby separating the fluorescent dye and the quencher dye when the target is present; and reading the fluorescence signal from the unquenched fluorescent dye in the real time.

In a further embodiment, the present invention provides a method of detecting amplification of a target sequence in real life using a SCORPIONS™ Probe assay, the method comprising the steps of:

providing a dye-labeled oligonucleotide probe comprising a primer, an oligonucleotide conjugated to a quencher dye of Formula (IV) and a fluorescent dye of any of the Formulae (I-III) and (V-VIII), each dye having one or more polar arsonate group, wherein the probe is in a conformation allowing the fluorescent dye to be quenched by the quencher dye;

adding the dye-labeled oligonucleotide probe to a PCR reaction medium;

running the PCR temperature cycles to allow the primer to hybridize with a target DNA, thereby extending the probe on target DNA;

heat denaturing the extended probe to cause the quencher dye to disassociate;

cooling the extended probe to allow for an internal rearrangement which causes the fluorescent dye to fluorescence in a target specific manner; and reading the fluorescence signal from the fluorescent dye in the real time.

5. Synthesis a. General Schemes of Incorporating Arsonate Groups

Arsonate dyes can be prepared starting from commercially available arylarsonic acids, which can be subsequently assembled into dye compounds. This approach can be illustrated by a synthesis of arsonic acid carbocyanine dyes according to Scheme 1.

In particular, arsanilic acid (A2) can be converted into corresponding diazonium salt (A3) by treatment with sodium nitrite in hydrochloric acid according to a known literature method [Bart *Justus Liebigs Ann. Chem.* 429, 100, 1922.] The diazonium salt can be reduced into corresponding hydrazine (A4) using tin(II) chloride by analogy to known procedure [Zhang, Peng; Meng, Jiben; Li, Xiaoliu; Matsuura, Teruo; Wang, Yongmei *J. Heterocycl. Chem.* 39, 1, pp 179-184, 2002.] Fisher cyclization of the hydrazine A4 provides the corresponding indole (A5) and indolinium salts (A6) analogously to the methods reported for synthesizing similar sulfonyl indoles [Mujumdar R. B., Ernst L. A., Mujumdar S. R., Lewis C. J. and Waggoner A. S. *Bioconjugate Chem.*, 4(2), pp 105-111, 1993]. These publications further describe methods for making sulfonyl carbocyanine dyes from the sulfonyl indoles, which methods can be used to assemble the arsonate carbocyanine dyes of the present invention. Likewise, the methods described in these publications for preparing different N-substitutions can be equally applied to the preparation of arsonate dyes (A1) with diverse N-substituents. Typically, the N-substituent provides linkers with reactive groups (the -L-$R_x$ moiety) for introducing the dyes into nucleic acids, proteins and other biomolecules.

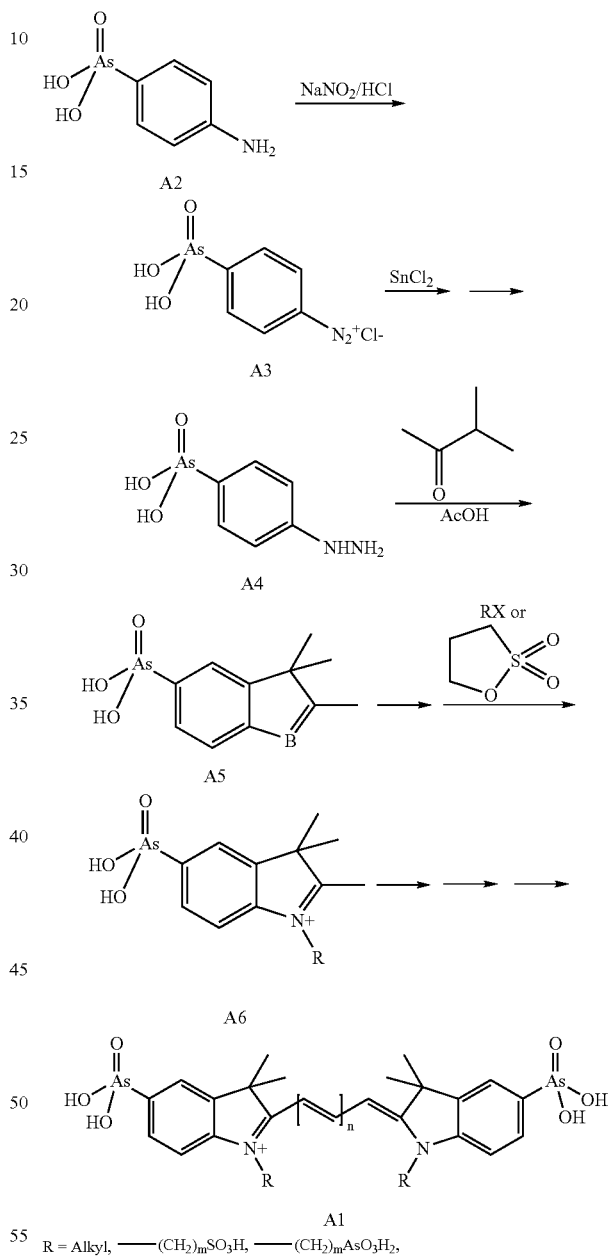

Alternatively, aryl arsonate dyes can be prepared by directly introducing arsonic groups into a dye molecule according to any of the two approaches illustrated in Scheme 2.

In one approach, an arsonate group is directly introduced to an aromatic component of a dye molecule (B2) via electrophilic substitution by reacting the dye with arsenic electrophilic reagents, such as arsenic acid [Ehrlich, Bertheim Chem Ber., 40, p. 3293, 1907; Benda, Kahn *Chem. Ber.*, 41, pp 1674-1676, 1908] or arsenic trichloride [Varma, Raman, *J. Indian Chem Soc.*, 16, pp 515-516, 1939] to provide an arsenite intermediate B3. A subsequent oxidation converts the arsenite intermediate B3 to arsonate B1 [Gough, King *J. Chem. Soc.*, pp 669-683, 1930]. Arsonates B1 can be converted back to dichloroarsenites B3 by treatment with $PCl_3$ [Ehrlich, Bertheim, *Chem. Ber.*, 43, p 918, 1910; *Chem. Ber.*, 44, p 1264, 1911] or $SO_2$—$I_2$—HCl reagent [Gavrilov V. I., Khusnutdinova F. M., Gornova N. N *J. Gen. Chem. USSR (Engl. Transl.)*, 57, pp 300-303, 1987; *Zh. Obshch. Khim.*, 57, 2, pp 350-354, 1987].

In a second approach, the arsonate group can be introduced into a dye molecule by displacing an amino group of an amino dye B4. Specifically, the amino group is first converted to a diazonium salt B5, which undergoes copper-catalyzed replacement of arsenite (Bart's reaction) followed by oxidation into arsonic substituent to yield B1 [Bardos, T. J. et al. *J. Med. Chem.*, 9, pp 221-227, 1966].

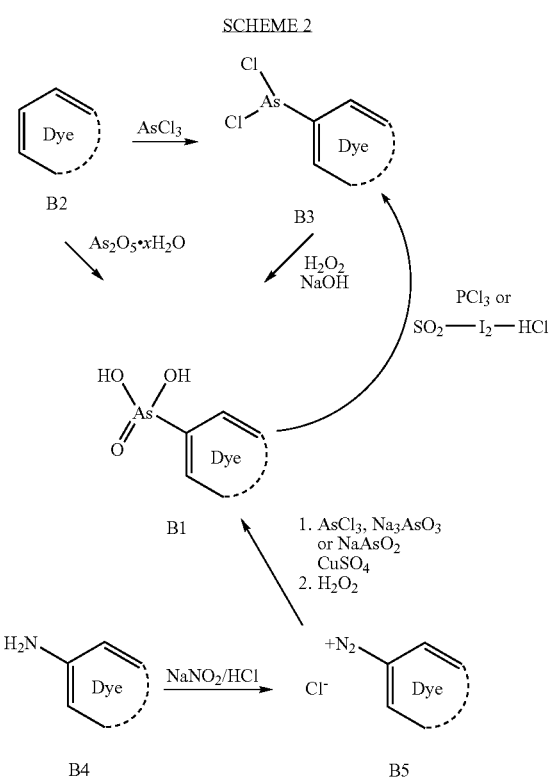

SCHEME 2

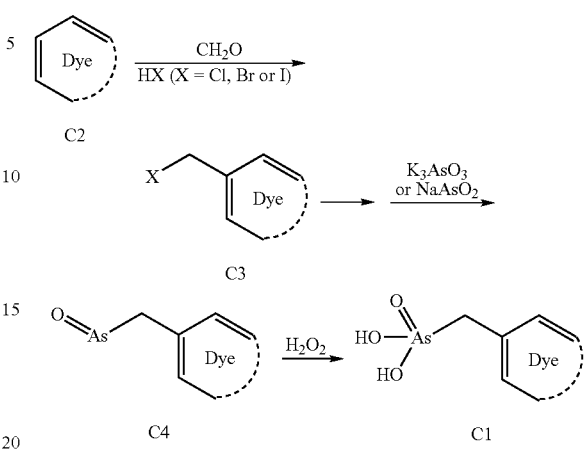

SCHEME 3

Aliphatic arsonates (C1) can be obtained according to Scheme 3. In this approach, an aromatic component of a dye (C2) is first alkylated. The alkylation includes, but not limited to, chloromethylation [Dacka, Stanislaw *Pol. J. Chem.*, 57, 10-12, pp 1345-1352, 1983], bromomethylation [Gibson, S. et al., *Tetrahedron*, 25, pp 5047-5057, 1969] or iodomethylation [Sandin, Fieser *J. Am. Chem. Soc.* 62, pp 3098-3103, 1940]. The alkylated dye (C3) is then converted to an inorganic arsenite (C4) followed by an oxidation step to provide C1 [Quick; Adams *J. Am. Chem. Soc.* 44, p 811, 1922; Chernokal'skii, B. D. et al. *J. Gen. Chem. USSR (Engl. Transl.)*, 36, pp 1674-1675, 1966; *Zh. Obshch. Khim.* 36, 1677-1679, 1966; Dehn, Mc Grath *J. Am. Chem. Soc.* 28, p 352, 1906].

b. Protection and Deprotection of Arsonate Dyes.

Polar arsonic acid dyes, Dye-As(=O)(OH)$_2$, can be transformed into convenient non-polar forms, such as arsonic diesters, Dye-As(=O)(OR)$_2$, according to known techniques. As discussed above, such protected forms are compatible with automated oligonucleotide synthesis and can be used in applications when high dyes polarity in not desirable for conjugation or staining purposes.

Arsonic diesters dyes can be obtained by treating arsonic acids with alcohols in the presence of $CaC_2$ or $CuSO_4$ [Chernokal'skii B. D. et al., *J. Gen. Chem. USSR (Engl. Transl.)*, 36, pp 1670-1673, 1966; *Zh. Obshch. Khim.*, 36, pp 1673-1676, 1966]. An alternative method for preparation of arsonic diesters is based on reacting arsenites dichlorides with alcohols with subsequent oxidation into the arsonic diesters [Werbel et al., *J. Org. Chem.*, 22, p 452, 1957]. Typical protective groups are —$CH_2CH_2CN$ and —$CMe_2$—$CMe_2$— (pinacol). These groups are compatible with oligonucleotide synthesis conditions and can be readily removed by applying the deprotection methods as illustrated in Scheme 4.

Cyanoethyl esters are commonly used for protecting phosphates in automated synthesis of oligonucleotides [Atkinson, T. and Smith, *Oligonucleotide synthesis*: a practical approach, Gait, M. J. (editor), IRL Press Limited, Oxford, 1984]. This group can be removed in the presence of ammonia or DBU and the mechanism is believed to involve β-elimination. Thus, in one approach, arsonic cyanoethyl esters (D2) can be deprotected in a similar manner to provide arsonic acid dyes (D1).

Alternatively, an arsonic acid can be initially converted to an ortho ester (D3) by reacting with 2,3-dihydroxy-2,3-dimethyl-succininitrile (Bailey et al., *J. Org. Chem.*, 28, 1963, p. 828-831 in a manner similar to a common noncyclic cyanoethyl protecting group. The ester can undergo β-elimination in the presence of ammonia to return the arsonate diester to its free acid form (D1). Similarly, a 2,3-dimethyl-1,4-bis(phenylsulfodioxo)butane-2,3-diol reagent for protection of a dye arsonic acid (D4) can be prepared by known procedure [Farkas, F. et al., *Helv. ChimActa* 74(7), 1991, p. 1511-1519]. The diester can undergo β-elimination in the presence of an acid to return the arsonate diester to its free acid form (D1).

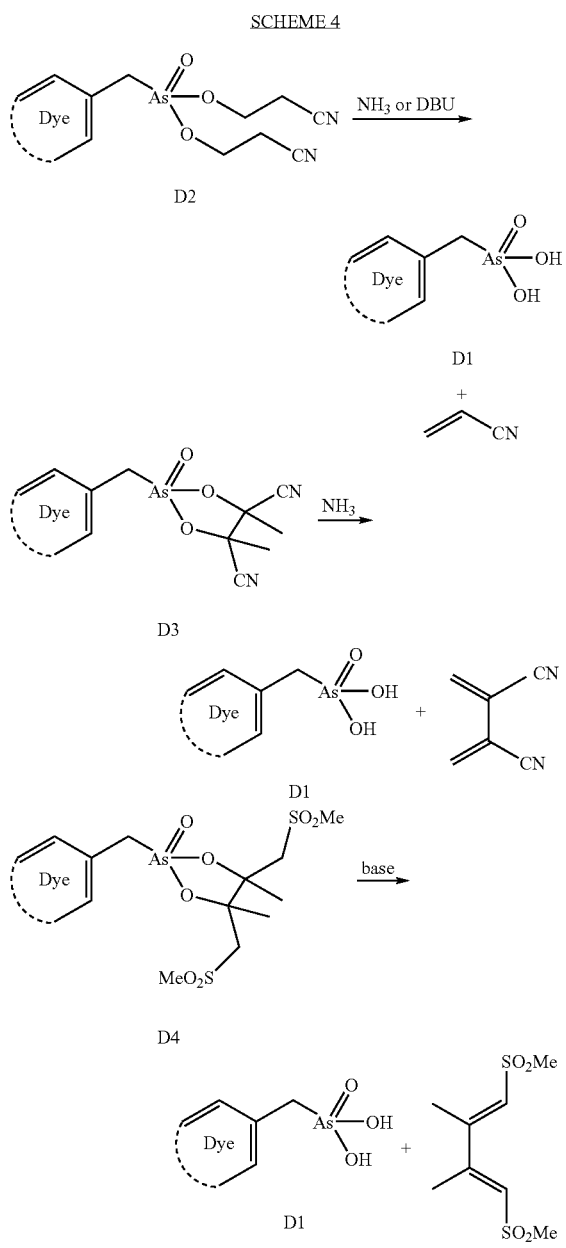

SCHEME 4

Chelating protection is preferred for arsonic acids due to the simplicity of the protection conditions, enhanced stability afforded by the chelates under aqueous conditions, and the ease of deprotection for selected derivatives. As noted above, arsonic acid of a dye can also be masked in its ortho esters form: Dye-As(OR)$_4$ by a direct reaction of arsonic acids with alcohols and phenols (ROH). A chelated form of ortho ester is particularly favorable wherein two of the R groups are linked together to form a cyclic ester: Dye-As(O$_2$W)$_2$. Typically, the chelated ortho ester can be obtained by direct reaction with diols, including pyrocatechols, under dehydrating conditions such as azeotropic elimination of water with benzene [Casey J. P., Mislow K. J. Chem. Soc. D, pp 1410-1411, 1970]. The extent of esterification (diester vs. orthoester) largely depends on the nature of the chelating agent and conditions of reaction and isolation. Some examples of such reactions are shown in FIG. 3.

More specifically, arsonic acid substituents of a dye compound can be converted into its chelate ortho ester form by reacting with chelating reagents having two reactive oxygens separated by two or three carbon atoms. Typically, a diol-based chelating reagent can be represented by the general formula W(OH)$_2$, wherein W is —[C(R$^8$)$_2$]$_w$— (w is 2 or 3), each R$^8$ is the same or different and independently hydrogen, hydroxy, cyano, —OC(O)-alkyl, —OC(O)-aryl, alkyl, aryl, alkylcarbonyl, arylcarbonyl, —CH$_2$CN, —CH$_2$SO$_2$Me, —CH$_2$SO$_2$Ph, or two R$^8$ of adjacent carbons together with the carbons to which they are attached form an aryl or heteroaryl, or two R$^8$ of the same carbon form an oxo.

Examples of the suitable chelating reagents include, but are not limited to, ethylene glycols, glycol aldehydes, glyoxals, glycolic acids, glyoxylic acids, propylene glycols, pinacol, 3-hydroxypropionic aldehydes, 3-hydroxypropionic acids, malonaldehydes and pyrocatechols.

Chelating protection of arsonic acids with these reagents can be achieved in the presence of dehydrating reagents, such as acetic anhydride, under conditions disclosed in [Salmi, Merivuori, Laaksonen Suom. Kemistil. B; 19; 1946; 102, 107]. Moreover, these chelating (protecting) groups can be designed to eliminate under standard ammonia deprotection conditions. For this purpose, the protective groups should be optimized to provide a substantial stability in ordinary aqueous conditions at pH 1-8 and eliminate under aqueous ammonia conditions. The ammonia can act as a nucleophile, as a base or both. Such mechanisms for ammonia deprotection are well established in oligonucleotide synthesis for deprotection of bases and phosphates [Atkinson, T. and Smith, 1984].

Particularly useful protective reagents are pinacol (2,3-dimethyl-2,3-butanediol), 2,4-dimethyl-2,4-pentanediol and 2-hydroxyisobutyric acid. As shown in Example 11, pinacol and arsonic acid dye form stable bis-pinacolate orthoester chelate that can be hydrolyzed with aqueous ammonia at room temperature. 2,4-Dimethyl-2,4-pentanediol forms stable diester chelate that is also degradable with ammonia. 2-Hydroxyisobutyric acid forms a (1:1) chelate that is not stable under aqueous conditions but stable in organic solutions.

Specially designed diols may serve the duel purpose of simultaneously protecting the arsonic acid and providing a chemical moiety that facilitates with the elimination of the protecting group. To that end, Scheme 5 illustrates diols (E1, E2 and E3) with appendages such as —CH$_2$CH$_2$CN, —C(Me)CN and —C(Me)CH$_2$SO$_2$Ph, which can undergo β-elimination according to the mechanisms previously shown in Scheme 4.

SCHEME 5

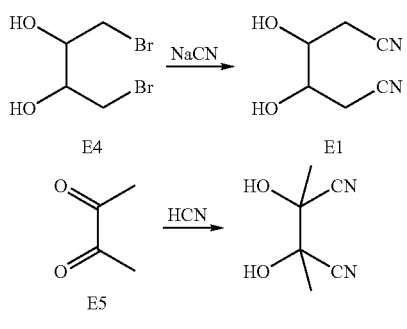

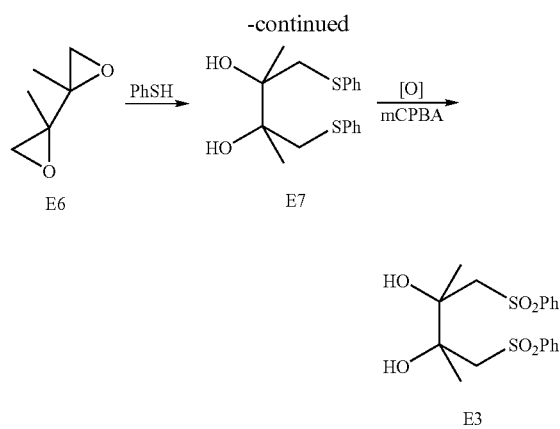

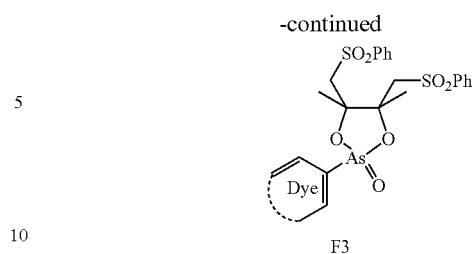

Deprotection of the chelates 3a (FIG. 3) and F1 was achieved by ammonia treatment aided by β-elimination for 3a or γ-cyclization for F1. Deprotection of F2 requires strong base such as DBU to form an intermediate F3, which undergoes subsequent further deprotection under the basic conditions. [4-(4'-Dimethylaminophenylazo)phenyl]arsonic acid [Barrowcliff, Pyman, Remfry J. Chem. Soc., 93, p 1900, 1908] can be used as a simple mode compound for demonstrating how to optimize conditions of protection and deprotection of arsonic acid group in dyes.

In particular, diol E1 was synthesized according to known procedure [Przybytek Chem. Ber., 17, p 1095, 1884]. The diketone E5 was reacted with HCN producing diol E2 according to Bailey et al., 1963. 1,2:3,4-Diepoxy-2,3-dimethylbutane was reacted with thiophenol by following Farkas, F. et al., 1991 procedure to produce diol E7 that was oxidized by m-chloroperbenzoic acid (mCPBA) into a protective reagent E3. The diols E1-E3 can react with arsonic acid dyes under dehydrating conditions [Salmi, Merivuori, Laaksonen, 1946] to provide corresponding arsonic ortho ester chelates 3a (FIG. 3), F1 and F2 (Scheme 6).

As illustrated in Scheme 7, the above compound was reduced to dichloroarsino derivative by treatment with PCl₃ [Ehrlich, Bertheim, 1910-1911] or SO₂—I₂—HCl reagent [Gavrilov V. I., Khusnutdinova F. M., Gornova N. N. 1987]. The dichloroarsino dye derivative is treated with alcohols followed by a subsequent oxidation to afford the corresponding arsonic acid diesters [Werbel et al., 1957].

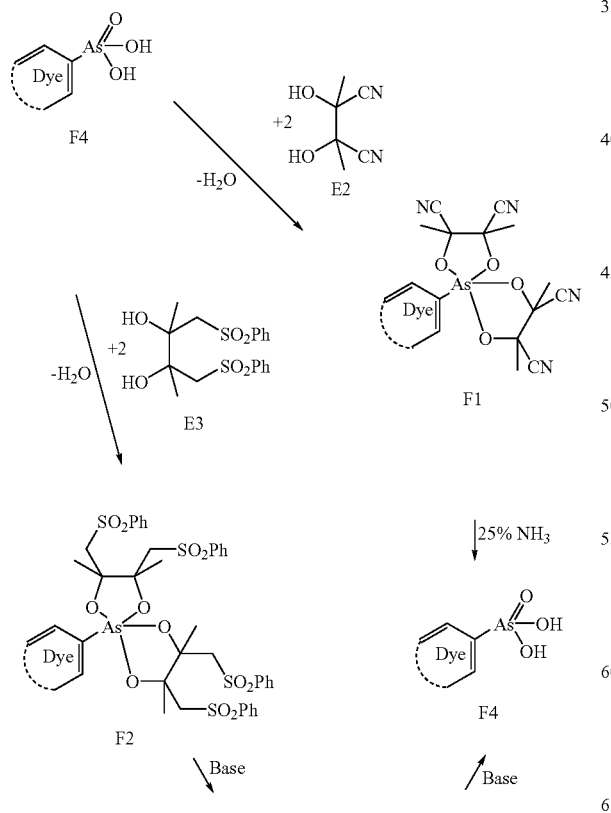

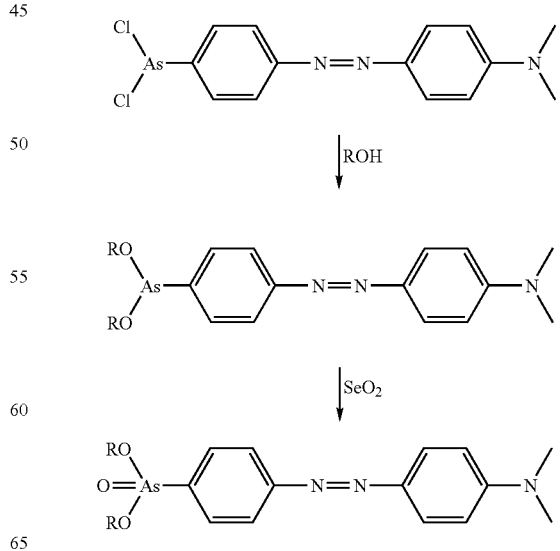

6. Experimentals and Examples

General

All chemicals and solvents, including anhydrous solvents were purchased from Sigma-Aldrich, TCI, Lancaster or other chemicals suppliers. Controlled pore glasses (CPGs) can be purchased from CPG, Inc. or other commercial sources. Evaporation refers to removal of solvents under reduced pressure using rotary evaporator and a diaphragm pump. The structures of the synthesized dyes were established using NMR instruments such as Varian or Bruker, and mass spectroscopy on Finnigan or Waters instruments. Reaction mixtures were analyzed by chromatography using HPLC or LC-MS on Varian, Waters or Agilent instruments or by TLC using EM silica gel TLC plates. UV-VIS spectra were taken on a number of commercially available spectrometers such as Perkin-Elmer. The automated oligonucleotide synthesizer is purchased from Applied Biosystem.

Real-time PCR was performed using Cepheid SmartCycler®.

Sulfonyl dyes (such as Alexa 532) are available from Molecular Probes, Inc. Cy™ dyes are available from Amersham Biosciences UK Limited.

Pyrocatechol (catechol), glyoxylic acid, glyoxal, ethylene glycol, 1,4-dibromo-2,3-butanediol, p- and o-arsanilic asid were purchased from Sigma-Aldrich.

1-Acetyl-2,3-dihydro-indol-5-ylamine was obtained from indoline by a procedure [Prasad G. K. B., Burchat A., Weeratunga G., Watts I., Dmitrienko G. I., *Tetrahedron Lett.*, 32(38), pp 5035-5038, 1991].

1-Acetyl-2,3-dihydro-indol-5-ylamine-6-arsonic acid was obtained by mixing of equivalent amounts of 1-acetyl-2,3-dihydro-indol-5-ylamine and $H_3AsO_4$, drying and refluxing of the resulted salt in decane for 20 hr.

6-Acetyl-3,6,7,8-tetrahydrobenzo[1,2-b:4,3-b']dipyrrole-2-ethoxycarbonyl-5-arsonic acid, MGB building block, was obtained from 1-acetyl-2,3-dihydro-indol-5-ylamine-6-arsonic acid following a Fisher cyclization procedure for a non-arsonated compound [Samsoniya Sh. A., Kadzhrishvili D. O., Gordeev E. N., Zhigachev V. E., Kurkovskaya L. N., Suvorov N. N. *Chem. Heterocycl. Compd. (Engl. Transl.)*, 18(4), pp 382-385, 1982; *Khim. Geterotsikl. Soedin.*, 18(4), pp 504-507, 1982].

MGB reagents containing arsonic acid group as shown in FIG. 5 was prepared from 6-acetyl-3,6,7,8-tetrahydrobenzo [1,2-b:4,3-b']dipyrrole-2-ethoxycarbonyl-5-arsonic acid by using of published procedures for non-acid analogs [Boger D. L., Coleman R. S., Invergo B. J., Sakya S. M., Ishizaki T., et al. *J. Am. Chem. Soc.*, 112, 12, pp 4623-4632, 1990] with a subsequent protection of the arsonic acid group by methods described below.

3,4-Dihydroxyadiponitrile (E1) was obtained according to a published procedure [Przybytek *Chem. Ber.*, 17, p 1095, 1884].

2,3-Dihydroxy-2,3-dimethyl-succininitrile was obtained as described by Bailey et al., *J. Org. Chem.*, 28, 1963, p. 828-831.

2,3-Dimethyl-1,4-bis(phenylthio)butane-2,3-diol was prepared by known procedure [Farkas, F. et al., *Helv. Chim Acta* 74(7), 1991, p. 1511-1519] and oxidized into 2,3-dimethyl-1,4-bis(phenylthiodioxo)butane-2,3-diol using m-chloroperbenzoic acid.

4-Hydrazinophenylarsonic acid (A4) was obtained by analogy to 4-hydrazinobenzoic acid using a method described in [Zhang, Peng; Meng, Jiben; Li, Xiaoliu; Matsuura, Teruo; Wang, Yongmei *J. Heterocycl. Chem.* 39, 1, pp 179-184, 2002].

[4-(4'-Dimethylaminophenylazo)phenyl]arsonic acid was obtained according to methods described by Barrowcliff, Pyman, Remfry *J. Chem. Soc.*, 93, p 1900, 1908].

Method A

Method A provides a typical procedure for DMTr-protection of primary alcohol groups in linkers and nucleosides. Generically speaking, a compound having a primary alcohol (10 mmol) was dissolved in dry pyridine (100 mL) and stirred under argon at room temperature. 4,4'-Dimethoxytrityl chloride (DMTrCl, 3.5 g, 10.3 mmol) was added in one portion and stirred for 5 hr. The mixture was evaporated and taken into dichloromethane (500 mL), washed with saturated $NaHCO_3$ and saturated NaCl solutions (200 mL each) and dried over $Na_2SO_4$. The extract was evaporated and the residue purified by flash chromatography on silica gel using a mixture of ethyl acetate, dichloromethane and methanol to produce the DMTr-protected alcohol.

Method B

Method B provides a general method for immobilization on CPG (see, also, Atkinson, T. and Smith, *Oligonucleotide synthesis: a practical approach*, Gait, M. J. (editor), IRL Press Limited, Oxford, 1984). Scheme 8 illustrates a xanthene dye of Formula (III) having arsonate groups, a linker group, wherein a primary alcohol is protected by DMTr. The linker group is modified via reaction with a succinic anhydride to provide a reactive group —COOH, which in turn is coupled to an amino group on a CPG.

Generically speaking, to a solution of compound 1 (1.0 mmol) in dry DMF (10 mL) was added succinic anhydride (0.15 g, 1.5 mmol), triethylamine (0.25 mL) and 4-dimethylaminopyridine (DMAP, 0.01 g) as a catalyst, and the reaction mixture was stirred overnight at room temperature and quenched by treatment with 1 mL of water for 1 hr to hydrolyze the un-reacted anhydride. The mixture was evaporated and taken into dichloromethane (50 mL), washed with saturated 2 M $NaHSO_4$ and saturated NaCl solutions (20 mL each) and dried over $Na_2SO_4$. The extract was evaporated and quickly run through a silica gel column using a mixture of ethyl acetate, dichloromethane and methanol. The purified material should be free of succinic acid. The succinate intermediate was redissolved in dry DMF (10 mL), treated with amino-CPG (1 g) and dicyclohexylcarbodiimide (DCC, 0.31 g, 1.5 mmol) and stirred under argon overnight. The modified CPG E was collected by filtration and purified by thorough wash with ether. The loading was quantified by detritylation of the modified CPG with an acid and measuring of the released DMTr group by optical density. This modified CPG 2 was used directly for introduction of the arsonate dye to the 3'-end of the oligonucleotide probe.

SCHEME 8
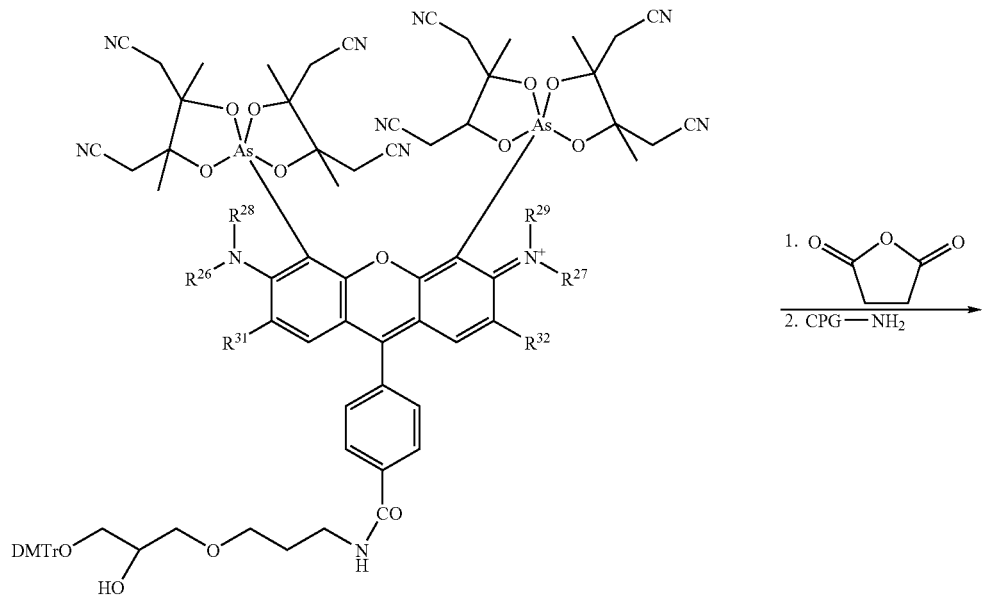
1
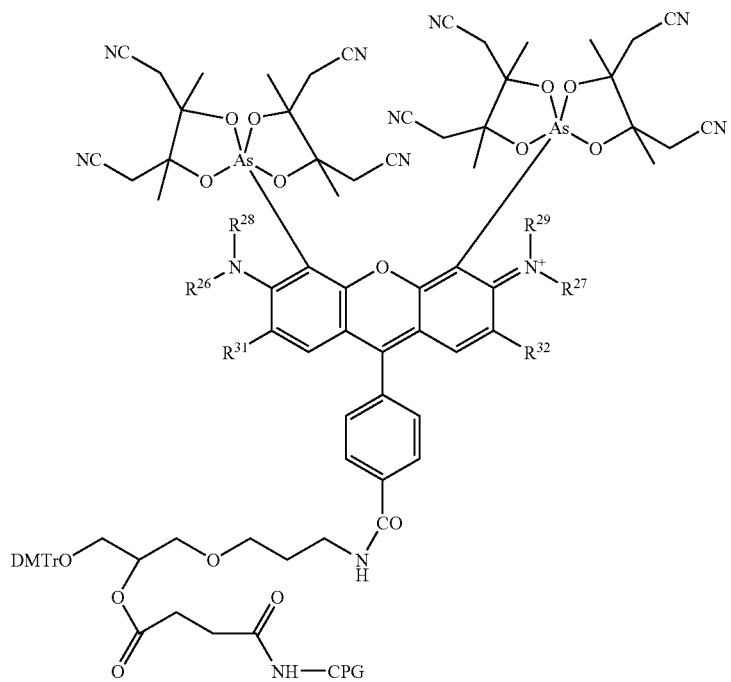
2

Method C
Method C provides a general method for preparation of phosphoramidites see, also, Atkinson, T., and Smith, *Oligo nucleotide synthesis: a practical approach*, Gait, M. J. (editor), IRL Press Limited, Oxford, 1984). The following Scheme 9 illustrates a xanthene dye of Formula (III) 1 undergoes a standard synthesis to provide a phosphoramidite compound 3.
SCHEME 9
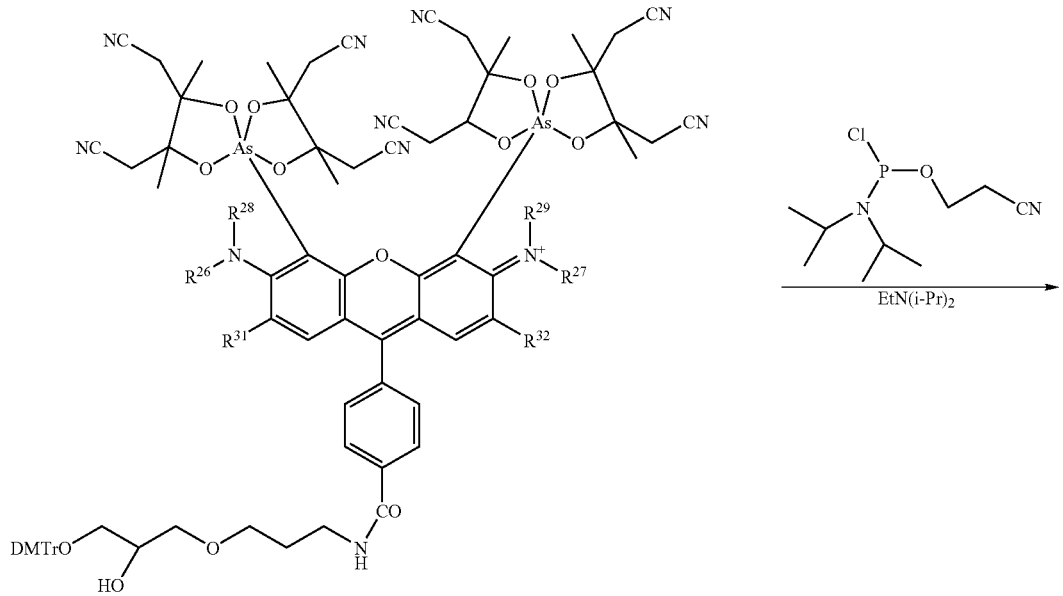
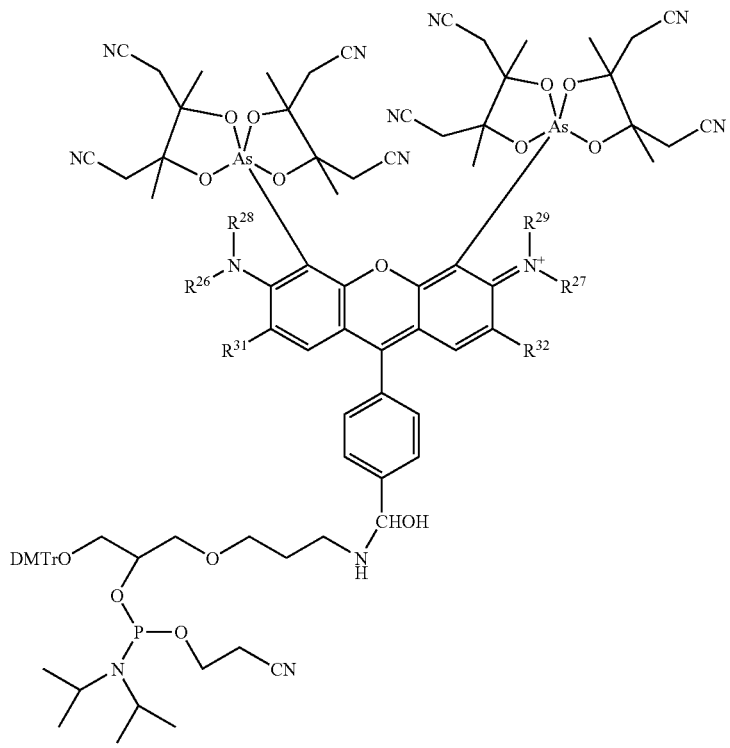

Generically speaking, to a solution of compound 1 (1.0 mmol) in dry dichloromethane (20 mL) was added N-ethyl-N,N-diisopropylamine (0.2 g, 1.55 mmol), stirred under argon at room temperature and treated drop wise with chlorophosphite (2.5 g, 1.06 mmol). The reaction mixture was stirred for 1 hr and washed with saturated NaHCO$_3$ and saturated NaCl solutions (20 mL each) and dried over Na$_2$SO$_4$. The extract was evaporated, re-dissolved in a minimal amount of ether and precipitated into stirred hexanes. The solid 3 was collected by filtration, dried under vacuum and used directly for introduction of the arsonate dye into internal position, to 3'- or 5'-end of the oligonucleotide probe.

Method D

Method D provides a general method for preparing arsonate diesters. Arsonate diester dyes and MGBs having arsonate groups was obtained by treating arsenites dichlorides with alcohols followed by an oxidation step [Werbel et al., *J. Org. Chem.*, 22, p 452, 1957]. Examples of suitable alcohols include, but not limited to HOCH$_2$CH$_2$CN, HOCMe$_2$—CMe$_2$OH (pinacol). Scheme 10 illustrates a dye or an MGB (4) having an arsenite dichloride (—AsCl$_2$) group undergoes esterification in the presence of pinacol to produce an intermediate arsenite 5. Subsequent oxidation of 5 by SeO$_2$ or H$_2$O$_2$ produces the dye (or MGB) cyanoethyl arsonate diester 6.

SCHEME 10

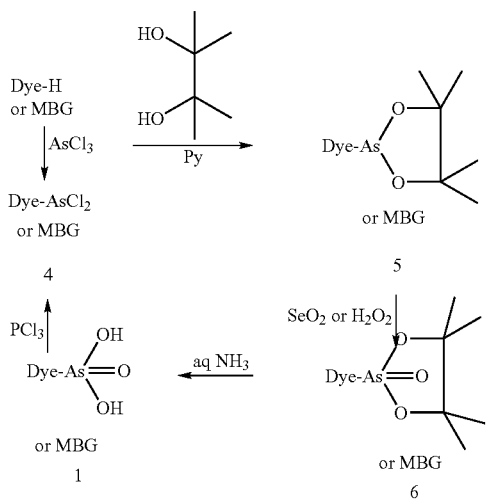

In particular, dyes or MGBs having arsenite dichlorides 4 were obtained from the corresponding arsonic acids 1 by PCl$_3$ treatment [Ehrlich, Bertheim, 1910-1911] or by direct electrophilic substitution of dyes or MGBs with AsCl$_3$ [Varma, et al., 1939].

Generically speaking, a suspension of arsonic acid dye or MGB 1 (1.0 mmol) in phosphorous trichloride (20 ml) was slowly heated under argon to 60°. The mixture was stirred for 15 min and evaporated by rotavap to form arsenite dichloride 4. No further purification necessary since compound 4 is moisture sensitive. Alternatively, a suspension of an unsubstituted dye or MGB (1.0 mmol) in arsenic trichloride (10 ml) was slowly heated with stirring under argon to 100°. The mixture was stirred for 30 min and poured into dry ether or hexanes precipitating arsenite dichloride 4. The dichloroarsenite 4 was dried by evaporation with xylenes and used directly in the next step of esterification. To a solution of dichloroarsenite 4 (1.0 mmol) in dry pyridine (10 mL) was added pinacol (0.13 g, 1.1 mmol) under argon, and the mixture was stirred for 3 hr at room temperature. The mixture was evaporated and the residue purified by flash chromatography on silica gel using a mixture of ethyl acetate, dichloromethane and methanol producing compound 5. Arsenite diester 5 was oxidized into arsonate diester 6 in 1 M solution in 1,4-dioxane, acetone or DMF by treatment with an equivalent amount of SeO$_2$ with stirring at 60° for 3 hr, filtering from a red Se precipitate trough Celite and evaporation using rotavap. Traces of DMF were removed by co-evaporation with xylenes before deposition to silica gel column. The mixture was purified by flash chromatography using a mixture of ethyl acetate, dichloromethane and methanol producing arsonate diester 6.

The protected arsonate dye or MGB 6 was immobilized on CPG or converted into a phosphoramidite reagent using Methods A-C as describe above.

The oligonucleotide syntheses using described phosphoramidites and CPGs were performed using standard protocols of automated oligonucleotide synthesis [Atkinson, T. and Smith, *Oligonucleotide synthesis: a practical approach*, Gait, M. J. (Editor), IRL Press Limited, Oxford, 1984]. The subsequent deprotection of the arsonate esters in ammonia was performed under conditions as illustrated in Scheme 10.

Method E

Method E provides a general method for chelating protection of arsonic acid dyes. The method can provide both diester and orthoester-protected arsonates. The outcome of the reaction depends largely of the nature/structure of the chelating agent, reaction conditions and treatments during isolation. Selected examples of ammonia-labile chelating protective groups are shown in FIG. 3.

A solution of an arsonic acid dye derivative (0.1 mmol) in acetic acid (5 mL) was prepared by simply dissolving the acid form or by H$_2$SO$_4$ (equivalent amount) addition to corresponding amount of sodium, potassium or trialkylammonium salt of the arsonate dye in the acetic acid (5 mL). The resultant solution was treated with a 1.5-fold excess of a chelating agent, diol or pyrocatechol to each arsonic acid group: 0.3 mmol for dyes with one arsonic acid group and 0.6 mmol for dyes with two arsonic acid groups. Other chelating agents such as glycol aldehydes, glyoxals, glycolic acids, glyoxylic acids, 3-hydroxypropionic aldehydes, 3-hydroxypropionic acids, malonaldehydes were used in a similar manner as described herein.

Chelating reaction was carried out in the presence of acetic anhydride (0.2 mL, 2.1 mmol) at room temperature for 1 hr or by multiple vacuum evaporations with equal volume of xylenes to remove the water by-product. Fresh xylenes and acetic acid in equal portions were added prior to each evaporation. The evaporation needs to be repeated at least twice. Actual number of evaporations or reaction time and temperature largely depend on the protecting chelating agents, diol or pyrocatechol used and needs to be optimized using TCL for monitoring the reaction progress. Typically, TLC on silica gel plates was performed in a solvent system 2-butanone:formic acid:MeOH:water (12:1:1:1). The product (Dye-As(O$_2$W)$_2$, was isolated by flash chromatography on silica gel using EtOAc:AcOH:MeOH mixtures or by RP HPLC. More specifically, O$_2$W (i.e., —O—W—O—) is a diol (including pyrocatechol) residue, and W is as defined herein,

Method F

Method F provides a general method for preparation of activated esters of carboxylic acid derivatives of arsonic acid dyes.

To a 0.56M solution of a dye-carboxylic acid conjugate in dry triethylamine (3.1 mL) and dichloromethane (40 mL) under argon is added pentafluorophenyl trifluoroacetate (3.84 mL), and the mixture is stirred at room temperature for 1 hr. Hexanes (40 mL) is added to precipitate the pentafluorophenyl ester product of the arsonic acid triethylammonium of the dye. This activated ester was purified by silica gel chromatography of RP HPLC under neutral or acidic conditions. The reagent was ion-exchanged into a sodium or potassium salt form, if necessary, or it was used directly for bioconjugations with amines using standard protocols [Invitrogen, *The Handbook—A Guide to Fluorescent Probes and Labeling Technologies*, Chapter 1—Fluorophores and Their Amine-Reactive Derivatives].

Method G

Measuring of degradation/deprotection rate of arsonate esters-protected dye.

A protected dye (1 mg) and Methyl Red dye (0.5 mg, internal standard, $\lambda_{max}$ 482 nm) were dissolved in MeOH (5 mL) and mixed with a buffer or 25% aqueous ammonia (45 mL). Samples (1 mL) were taken over a period of degradation. The samples were quickly placed under vacuum to remove ammonia and redissolved in MeOH or used directly for HPLC analysis in buffers in a range of pH 1.6 (0.1% trifluoroacetic acid)—7.5 (0.1M triethylammonium acetate). HPLC analysis was performed on Phenomenex Gemini 5 um C18 110A column (250×4.6 mm) using 0-100% gradient of MeCN in 0.1M triethylammonium acetate (pH 7.5) buffer. The chromatogram was detected in a range 200-600 nm using Varian ProStar PDA detector. Calculations of the relative concentrations were performed based on peaks area at 520 nm. An internal standard gives a peak at 8.6 min ($\lambda_{max}$ 482 nm).

FIG. 12 illustrates an example of a typical kinetic curve corresponding to the base-induced deprotection of a bis-pinacol protected azodye.

EXAMPLES

The following examples illustrate specific dye reagents of the present invention and their preparation. Detailed experimental procedures were obtained according to any appropriate combination of the Methods A-F.

Example 1

Example 1 is a phosphoramidite dye reagent of Formula (II) having an arsonate ester. The dye reagent is suitable for automated oligonucleotide synthesis using the phosphoramidite method.

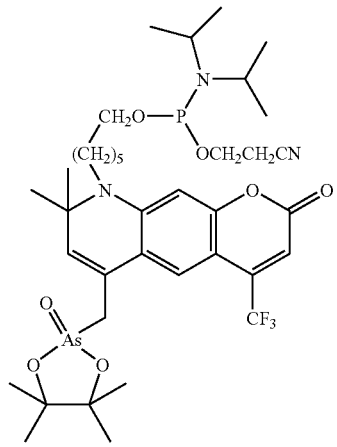

The dye reagent was prepared according to Methods C and D.

Example 2

Example 2 shows a carboxylic acid dye reagent of Formula (III) having two arsonate ortho esters. The dye reagent is suitable for attaching to a solid support such as CPG to initiate an oligonucleotide synthesis.

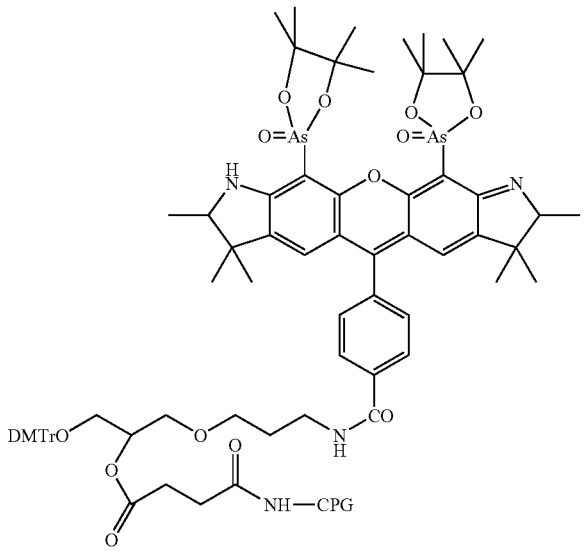

The dye reagent was prepared according to Methods B and D.

Example 3

Example 3 shows a phosphoramidite dye reagent of Formula (III) having two arsonate diesters employing pinacol as a protective chelating agent. The dye reagent is suitable for automated oligonucleotide synthesis using the phosphoramidite method.

The dye reagent was prepared according to Methods A, C, D and E. More detailed synthetic pathway is further illustrated in FIG. 4.

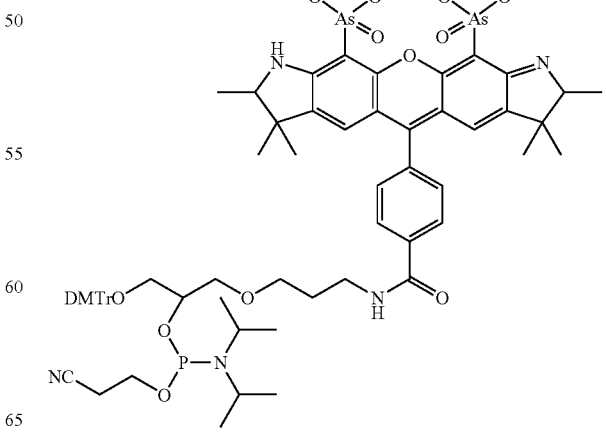

Example 4

Example 4 shows an MGB intermediate of Formula (IX) having a chelated arsonate ester. The MGB was prepared as illustrated in FIG. 5. The activated ester was obtained using Method E.

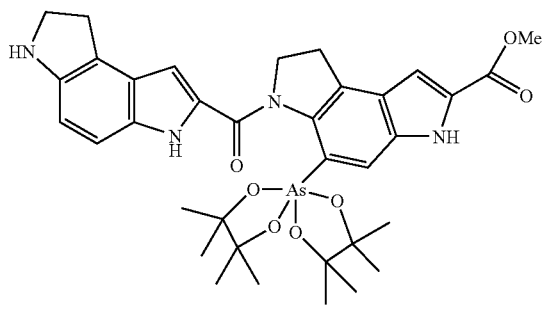

Example 5

Example 5 shows an MGB of Formula (VI) having an arsonate ester and an activated reactive group (the pentafluorophenyl ester of —COOH).

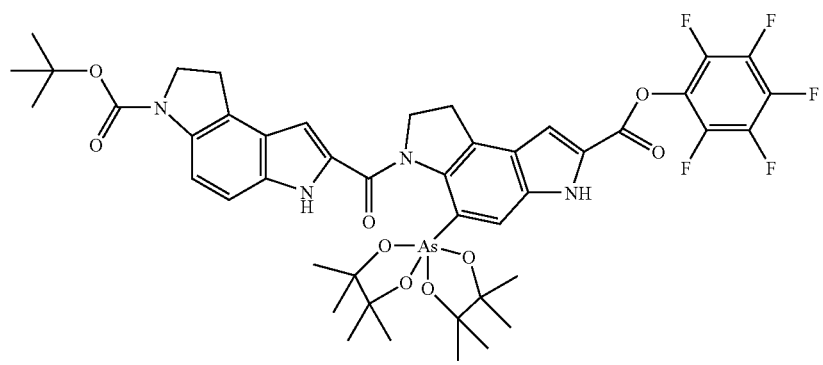

The MGB having a chelated arsonate ester was prepared using an N-protected pyrroloindole subunit and according to Method E using pinacol as a diol. Connection of two pyrroloindole subunits was performed according to the synthetic pathway as previously illustrated in FIG. 5. The subsequent protections and deprotection are further illustrated in FIG. 6. The activated ester (pentafluorophenyl ester) was obtained using Method F. This activated ester was used for bioconjugation or for introduction of the third MGB subunit into the reagent.

Example 6

Example 6 shows a fluorescence quencher dye reagent of Formula (IV) having an arsonate ester and a phosphoramidite reactive group. The dye reagent is suitable for automated oligonucleotide synthesis using the phosphoramidite method.

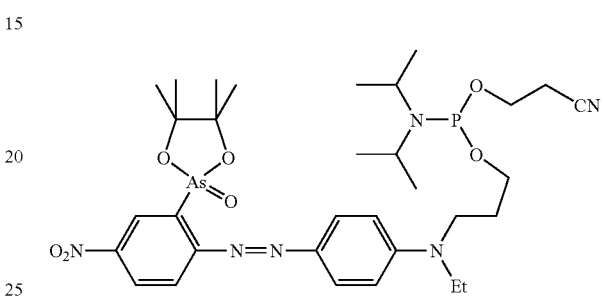

The fluorescence quencher dye reagent was prepared according to Method C.

Example 7

Synthesis of a polar carbocyanine dye G1 of Formula (Va) is illustrated in Scheme 11. The dye compound G1, was prepared from 4-hydrazinophenylarsonic acid (A4) through the intermediates G2-G4.

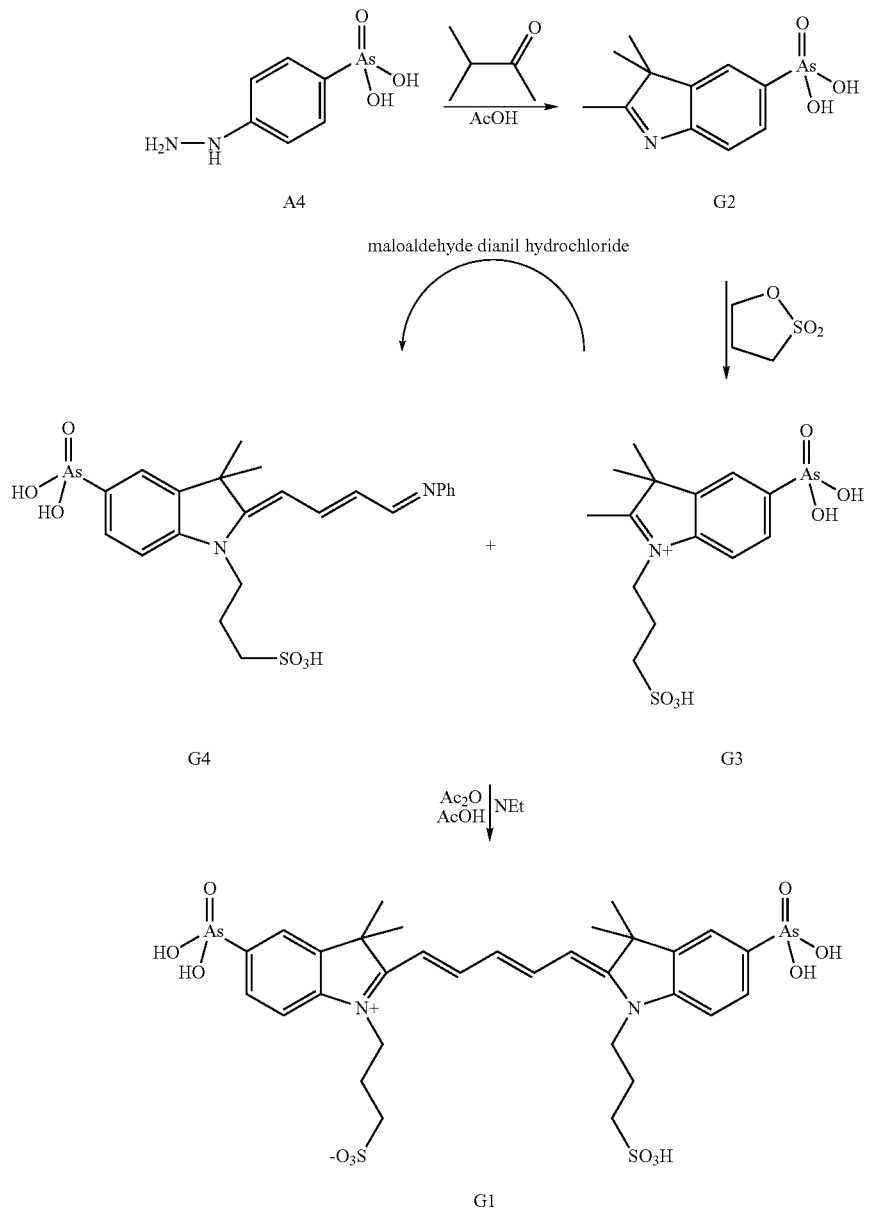

SCHEME 11

In particular, the intermediate 2,3,3-Trimethylindoleninium-5-arsonic acid (G2) was obtained in a similar manner as the Fisher cyclization of sulfophenyl hydrazine to provide 2,3,3-trimethylindoleninium-5-sulfonyl [Mujumdar R. B., Ernst L. A., Mujumdar S. R., Lewis C. J. and Waggoner A. S. *Bioconjugate Chem.*, 4(2), pp 105-111, 1993].

1-(γ-Sulfonatopropyl)-2,3,3-trimethylindoleninium-5-arsonic acid (G3) was obtained following the same general procedure described by Mujumdar R. B., et al., 1993 by treating compound G2 with 1,3-propanesultone.

Intermediate G4 was obtained by a modification of the method described by Mujumdar R. B., 1993. A solution of N-substituted indolenine G3 (0.14 g, 0.31 mmol) and malonaldehyde dianil hydrochloride (0.09 g, 0.35 mmol) in a mixture of acetic acid (2 mL) and triethylamine (0.05 mL) is stirred under Ar at reflux for 30 min. The reaction was monitored by HPLC by disappearance of the starting indolenine G3 and change of the UV spectrum of the mixture. Reaction mixture is treated by ether. Compound G4 was isolated as an unstable solid precipitate, and it was used in the next step for preparation of symmetrical or asymmetrical dyes without further purification.

The dye, 2-{5-[3',3'-Dimethyl-1'-(3-sulfopropyl)-1',3'-dihydroindolylidene-5'-arsonate]-penta-1,3-dienyl}-3,3-dimethyl-1-(3-sulfopropyl)-3H-indolium-5-arsonic acid (G1) was obtained using a general procedure published in a literature for sulfocyanine dyes [Briggs, M. S., Burns, D. D., Cooper, M. E., Gregory, S. *J. Chem. Commun.*, 23, 2000, pp 2323-2324]. The excitation and emission spectra of G1 are shown in FIG. 11.

Example 8

Synthesis of IR dye H1

Synthesis of representative IR dye H1 of Formula (VIa) is shown in Scheme 12. In this example, x is 2, $R^{57}$ is —$(CH_2)_3$ $SO_3H$, $R^{61a}$ and $R^{61b}$ are each ethyl groups, and $R^{58a}$ and $R^{58b}$ are each methyl groups.

SCHEME 12

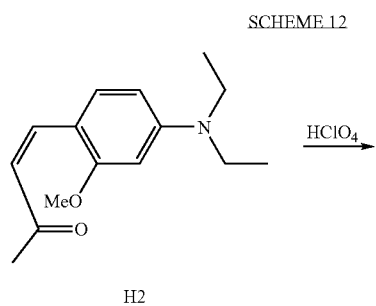

H2

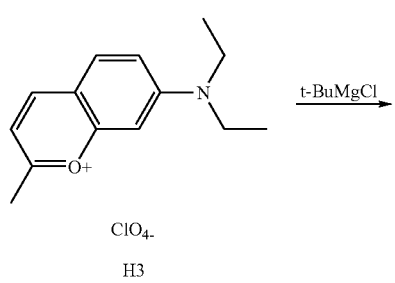

H3

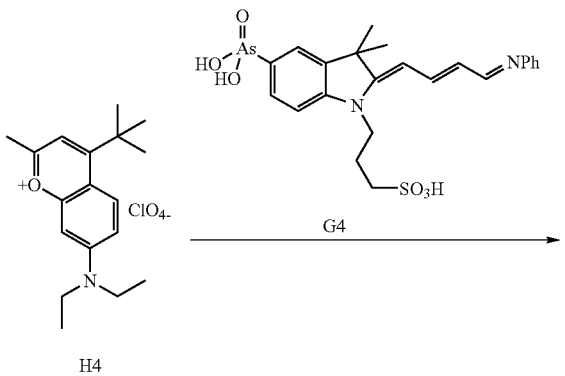

H4

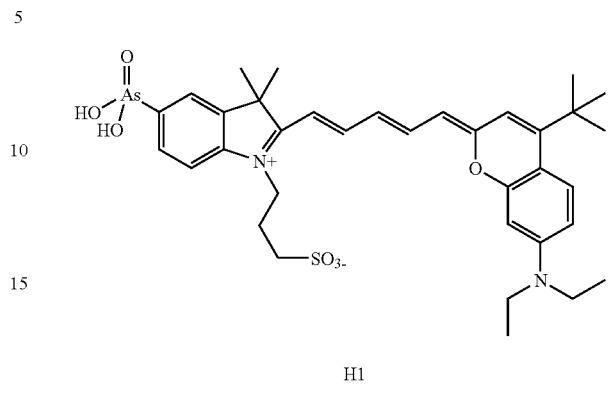

H1

H2 was obtained according to [Ducki S., Hadfield J. A., Hepworth L. A., Lawrence N. J., Liu C-Y., McGown A. T. Bioorg. Med. Chem. Lett., 7(24), pp 3091-3094, 1997].

Intermediate H3 is obtained from acid-catalyzed cyclization of H2. A subsequent reaction with t-BuMgCl produces 2-methyl-4-tert-butyl-7-(N,N-diethylamino)chromenylium perchlorate H4. [Doddi G., Ercolani G. J. Chem. Soc. Perkin Trans. 2, pp 271-276, 1986].

The dye 1-(γ-Sulfonatopropyl)-3,3-dimethyl-2-[3-(4-t-butylbenzopyran-2-ylidene)propen-1-yl]-3H-indolium-5-arsonic acid (H1) was obtained by condensation of intermediate G4 described above and chromelinium perchlorate H4 by a general procedure published in a literature for sulfocyanine dyes [Briggs, M. S., et al., 2000].

Example 9

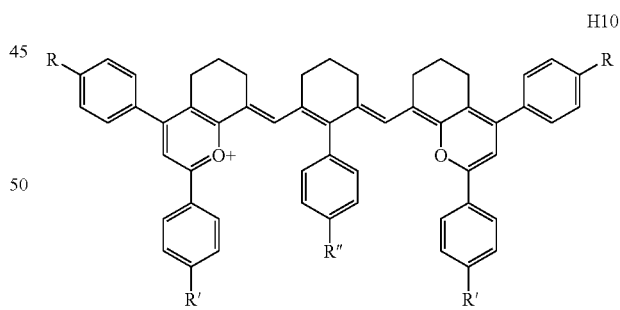

Synthesis of IR dye H10

IR dyes series H10 of Formula (VII) were synthesized according to a published procedure for a non-substituted IR dye [Ishchenko A. A., Kudinova M. A., Slominskii Yu. L., Tolmachev A. I. J. Org. Chem. USSR (Engl. Transl.), pp 150-157, 1986; Zh. Org. Khim., 22(1), pp 170-179, 1986]. An example of a synthesis of a dye H10 is illustrated in Scheme 13.

SCHEME 13

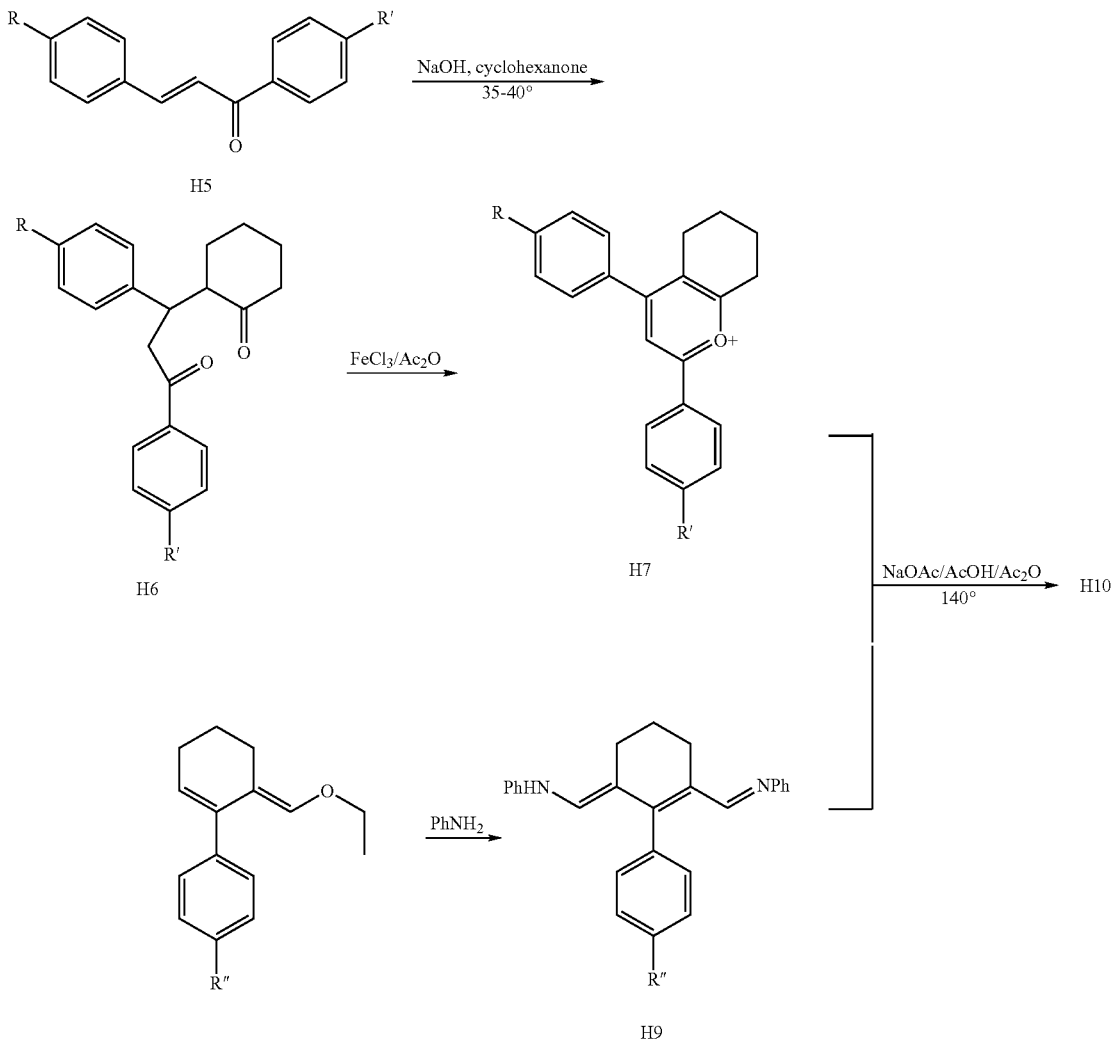

In particular, R,R'-substituted intermediate H7 was obtained by condensation of arsonate substituted H5 with cyclohexanone under basic conditions followed by oxidative cyclization of the resulting H6 in the presence of FeCl₃ [Allen, Sallans *Can. J. Res.*, 9, pp 574-579, 1933]. Intermediate H9 was obtained from R"-substituted H8 [Makin S. M., Pomogaev A. I., Boiko T. N., Nikiforova A. P. *J. Org. Chem. USSR (Engl. Transl.)*, 17(11), pp 2033-2036, 1981; *Zh. Org. Khim.*, 17(11), pp 2277-2281, 1981; Makin S. M., Pomogaev A. I. *J. Org. Chem. USSR (Engl. Transl.)*, 18(10), 1982, pp 1918-1920; *Zh. Org. Khim.*, 18(10), pp 2176-2179, 1982]. H9 was then coupled to two equivalents of H7 to provide the fluorescent IR dye H10.

Example 10

Squaraines and thiosquaraines dyes with arsonic acid groups of Formula (Vd) were synthesized from 2,3,3-trimethylindoleninium-5-arsonic acid (G2) and its derivatives, such as 1-(γ-sulfonatopropyl)-2,3,3-trimethylindoleninium-5-arsonic acid (G3), as described in US Patent Publication No: US 2003/0235846.

Example 11

[4-(4'-Dimethylaminophenylazo)phenyl]arsonic acid bis-pinacolate

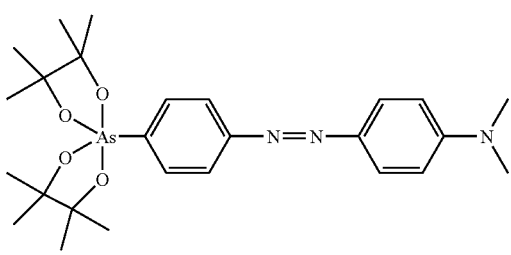

The above compound was obtained according to the procedure as outlined in Method E using pinacol as a diol chelating reagent. The water removal was accomplished by two evaporations with xylenes. The crude product was isolated by flash chromatography on silica gel and EtOAc:MeOH (10:1) as a mobile phase. The product crystallized from MeOH forming orange-yellow solid, m.p. 239-242°. Single orange spot on a silica gel plate, $R_f$=0.5 (CHCl$_3$—MeOH 10:1). $^1$H NMR (DMSO-d$_6$) δ, ppm: 1.0 (s, 12H, Me), 1.22 (s, 12H, Me), 3.08 (s, 6H, NMe$_2$), 6.83 (d, 2H, Ar), 7.83 (dd, 4H, Ar), 8.10 (d, 2H, Ar).

The compound is stable in a range of pH 1.6-7.5 in aqueous buffers, but degrades in 25% aqueous ammonia whereby the ortho ester hydrolyzes. Degradation in ammonia was measured according to Method G. Rate of degradation ($\tau_{1/2}$) at room temperature is approximately 3 hr. A full kinetics of the deprotection is presented in FIG. 12. The bis-pinacol-protected dye (peak at 13.3 min, $\lambda_{max}$ 430 nm) and apparent mono-pinacol-protected intermediate (peak at 9.50 min, $\lambda_{max}$ 440 nm) have absorbance in the same region. Fully deprotected dye (peak at 6.0 min) has a maximum absorption at $\lambda_{max}$ 480 nm.

Example 12

[4-(4'-Dimethylaminophenylazo)phenyl]arsonic acid 2,4-dimethyl-2,4-pentanediol chelate

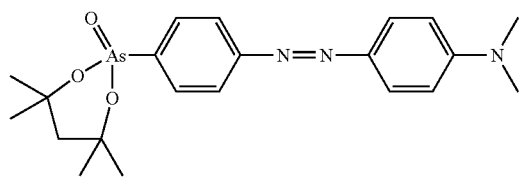

The above compound was obtained according to the procedure as outlined in Method E using 2,4-dimethyl-2,4-pentanediol (Aldrich) as a diol chelating reagent. The water removal was accomplished by two evaporations with xylenes. The crude product was isolated by flash chromatography on silica gel and EtOAc:MeOH (10:1) as a mobile phase. The product crystallized from MeOH forming orange-yellow solid, m.p. 234-238°. Single orange spot on a silica gel plate, $R_f$=0.5 (CHCl$_3$—MeOH 10:1).). $^1$H NMR (DMSO-d$_6$) δ, ppm: 1.50 (s, 6H, Me), 1.60 (s, 6H, Me), 2.25 (q, 2H, CH$_2$), 3.08 (s, 6H, NMe$_2$), 6.90 (d, 2H, Ar), 7.80-8.05 (m, 6H, Ar).

The compound is relatively stable in a range of pH 1.6-7.5 in aqueous buffers, but degrades quickly in 25% aqueous ammonia. Degradation in ammonia was measured according to Method G. Rate of full degradation ($\tau_{1/2}$) at room temperature is approximately 15 min. 2,4-Dimethyl-2,4-pentanediol-protected dye was observed on HPLC as a peak at 8.9 min ($\lambda_{max}$ 449 nm). Deprotected dye (peak at 6.0 min) has a maximum absorption at $\lambda_{max}$ 480 nm. Practically full deprotection was observed after 4 hr.

Example 13

[4-(4'-Dimethylaminophenylazo)phenyl]arsonic acid, chelate with 2-hydroxy-isobutyric acid

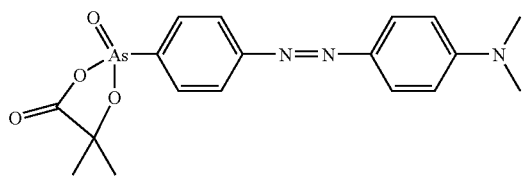

The above compound was obtained according to the procedure as outline in Method E using 2-hydroxyisobutyric acid as a chelating reagent. The water removal was accomplished by two evaporations with xylenes. The crude product was isolated by flash chromatography on silica gel and EtOAc as a mobile phase. The product crystallized from MeOH forming orange-yellow solid, m.p. 233-235°. $^1$H NMR (DMSO-d$_6$) δ, ppm: 1.45 (s, 3H, Me), 1.60 (s, 3H, Me), 3.12 (s, 6H, NMe$_2$), 6.90 (d, 2H, Ar), 7.70-8.20 (m, 6H, Ar).

The compound is very unstable in a range of pH 1.6-7.5 in aqueous buffers, it degrades instantly in acidic conditions and within minutes at pH 7.5. Degradation in buffers was measured according to Method G. Rate of full degradation ($\tau_{1/2}$) at room temperature and pH 7.5 is approximately 10 min. Practically full deprotection was observed after 2 hr.

Example 14

[4-(4'-Dimethylaminophenylazo)phenyl]arsonic acid bis-catechol chelate

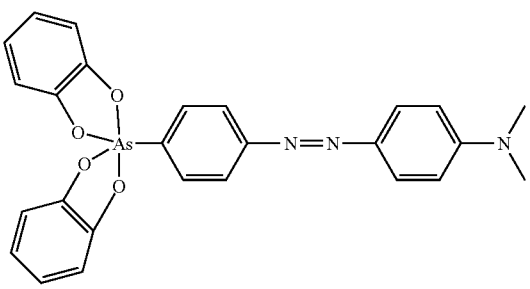

This compound was obtained according to the procedure as outline in Method E using 1,2-dihydroxybenzene (pyrocatechol) as a chelating reagent, The resulting water was removed by two evaporations with xylenes. The compound crystallized from the reaction mixture and was collected on a filter, washed with MeOH to provide a brown solid, m.p. 220° (decomp.).

The compound is very stable in a range of pH 1.6-7.5 in aqueous buffers; and it is very stable in 25% aqueous ammonia at room temperature. No degradation of the compound was observed over 3 days period. HPLC showed a peak at 8.0 min, $\lambda_{max}$ 425 nm).

Example 15

Real Time PCR Assay

Oligonucleotide probes (Cephied Probes) prepared with BHQ-1 and BHQ-2 quencher dyes (Black Hole Quenchers from Biosearch Technologies, Inc.) attached to 3'-end and a fluorescent dyes of the present invention conjugated to 5'-end were tested in the following Real Time(RT)-PCR Assay:

Fluorescent monitoring was performed in a Cepheid SmartCycler®. Each reaction contained 1× PCR Buffer (Invitrogen 10× PCR buffer stock), 400 µM each dNTP, 250 nM each primer, 200 nM Cepheid probe, 20 Units/25 µl SuperAse-In Inhibitor, 3 units/25 µl Platinum Taq polymerase, 1 Unit/25 µl Sensiscript RT polymerase, 1 ng/25 µl K562 RNA as template. The cycling program was 15 minutes at 42° C. (1 cycle), 45 cycles of 15 seconds at 95° C., then 30 seconds at 60° C.

RT-PCR detection in K562 RNA was conducted with 250 nM of forward primer (5' CAT TCG GGC CGA GAT GTC 3') and 250 nM of reverse primer (5' CTC CAG GCC AGA AAG AGA GAG TAG 3').

Amplification of the target was verified by an exponential increase of the fluorescent signal. The fluorescent signal crossed a specified threshold at an average of 25 cycles.

All of the above U.S. patents, U.S. patent application publications, U.S. patent applications, foreign patents, foreign patent applications and non-patent publications referred to in this specification and/or listed in the Application Data Sheet, are incorporated herein by reference, in their entirety.

From the foregoing it will be appreciated that, although specific embodiments of the invention have been described herein for purposes of illustration, various modifications may be made without deviating from the spirit and scope of the invention. Accordingly, the invention is not limited except as by the appended claims.

The invention claimed is:

1. A polar fluorescent dye comprising a compound of Formula (V):

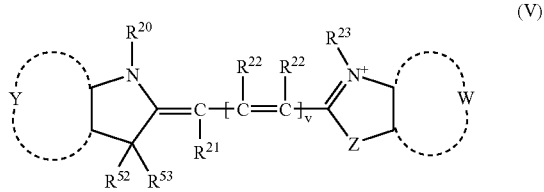

(V)

wherein, v is 0, 1, 2, 3, 4, 5 or 6;

Y represents atoms necessary to form one or two fused aromatic rings having 6 atoms in each ring, each ring atom is the same or different and independently $=CR^{46}-$, $=N^+R^{47}-$ or $=N-$;

W represents atoms necessary to form one or two fused aromatic rings having 6 atoms in each ring, each ring atom is the same or different and independently $=CR^{46}-$, $=N^+R^{47}-$ or $=N-$;

Z is $-O-$, $-S-$, $-Se-$, $-C(R^{48})_2-$ or $-NR^{49}-$;

$R^{20}$ and $R^{23}$ are the same or different and are independently alkyl, aralkyl or substituted alkyl substituted with hydroxy, cyano, nitro, amino, sulfonyl, phosphonyl, $-As(=O)(OR^6)(OR^7)$, $-As(OR^6)_2(OR^7)_2$, $-COOH$, alkoxy, monoalkylamino, dialkylamino or trialkylamonium or L-$R_x$;

$R^{52}$ and $R^{53}$ are the same or different and independently hydrogen, alkyl, alkyl substituted hydroxy, $-COOH$, halogen, cyano, nitro, amine, alkylamino, dialkylamino, sulfonyl, phosphonyl, $-As(=O)(OR^6)(OR^7)$, $As(OR^6)_2(OR^7)_2$ or L-$R_x$;

$R^{21}$ and each $R^{22}$ are the same or different and independently hydrogen, halogen, alkoxy, hydroxy, mercapto, aryloxy, heterocycle, iminium ion, L-$R_x$, or two adjacent $R^{21}$ and $R^{22}$ or any two adjacent $R^{22}$ form a 4, 5 or 6 member carbocycle, optionally substituted with alkyl, halogen or oxo; or two $R^{22}$ that are one carbon away from each other, together with the carbons to which they are attached, form a 4, 5 or 6 member carbocycle, optionally substituted with alkyl, halogen, alkylthio, arylthio, alkoxy, aryloxy, oxo (=O), =S or =C($R^{50}$)$_2$;

each $R^{46}$ and $R^{47}$ is the same or different and independently hydrogen, alkyl, aryl, halogen, cyano, nitro, amine, alkylamino, dialkylamino, sulfonyl, phosphonyl, $-As(=O)(OR^6)(OR^7)$, $As(OR^6)_2(OR^7)_2$ or L-$R_x$;

each $R^{48}$ and $R^{49}$ is the same or different and independently hydrogen or alkyl optionally substituted with hydroxy, $-COOH$, halogen, cyano, nitro, amine, alkylamino, dialkylamino, sulfonyl, phosphonyl, $-As(=O)(OR^6)(OR^7)$, $-As(OR^6)_2(OR^7)_2$ or L-$R_x$;

each $R^{50}$ is the same or different and independently hydrogen, alkyl, cyano, $-C(O)NHR^{48}$;

$R^6$ and $R^7$ are the same or different and independently H, alkyl, aryl, or heteroaryl; or $R^6$ and $R^7$ are linked together to form a 5 or 6-member heterocycle comprising the arsenic and the two oxygen atoms to which $R^6$ and $R^7$ are attached, wherein $-R^6-R^7-$ is $-[C(R^8)_2]_w-$ w is 2 or 3), wherein each $R^8$ is the same or different and independently hydrogen, hydroxy, cyano, $-OC(O)$-alkyl, $-OC(O)$-aryl, alkyl, aryl, alkylcarbonyl, arylcarbonyl, $-CH_2CN$, $-CH_2SO_2Me$, $-CH_2SO_2Ph$, or two $R^8$ of adjacent carbons together with the carbons to which they are attached form an aryl or heteroaryl, or two $R^8$ of the same carbon form an oxo;

L is a single covalent bond or a covalent linkage having 1-30 non-hydrogen atoms selected from the group consisting of C, N, O and S and is composed of any combination of single, double, triple or aromatic carbon-carbon bonds, carbon-nitrogen bonds, nitrogen-nitrogen bonds, carbon-oxygen bonds and carbon-sulfur bonds; and $R_x$ is a reactive group selected from the group consisting of acrylamide, activated ester of a carboxylic acid, acyl azide, acyl nitrile, aldehyde, alkyl halide, amine anhydride, aniline, aryl halide, aziridine, boronate, carboxylic acid, diazoalkane, haloacetamide, halotriazine, hydrazine, hydrazide, imido ester, isocyanate, isothiocyanate, maleimide, phosphoramidite, sulfonyl halide, and thiol group, provided, at least one of the $R^{20}$, $R^{23}$ $R^{46}$, $R^{47}$, $R^{48}$, $R^{49}$, $R^{52}$ and $R^{53}$ is $-As(=O)(OR^6)(OR^7)$ or $-As(OR^6)_2(OR^7)_2$.

2. The polar fluorescent dye of claim 1 wherein $R_x$ is succinimidyl ester or a pentafluorophenyl ester of a carboxylic acid.

3. The polar fluorescent dye of claim 1 wherein $R_x$ is a phosphoramidite group.

4. An oligonucleotide conjugate comprising an oligonucleotide covalently bonded with a dye having an arsonate group, wherein the oligonucleotide conjugate is represented by:

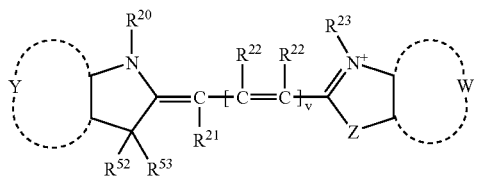

wherein, v is 0, 1, 2, 3, 4, 5 or 6;

Y represents atoms necessary to form one or two fused aromatic rings having 6 atoms in each ring, each ring atom is the same or different and independently $=CR^{46}-$, $=N^{+R47}-$ or $=N-$;

W represents atoms necessary to form one or two fused aromatic rings having 6 atoms in each ring, each ring atom is the same or different and independently $=CR^{46}-$, $=N^+R^{47}-$ or $=N-$;

Z is $-O-$, $-S-$, $-Se-$, $-C(R^{48})_2-$ or $-NR^{49}-$;

$R^{20}$ and $R^{23}$ are the same or different and independently alkyl, aralkyl or substituted alkyl substituted with hydroxy, cyano, nitro amino sulfonyl, phosphonyl, $-As(=O)(OR^6)(OR^7)$, $-As(OR^6)_2(OR^7)_2$, $-COOH$, alkoxy, monoalkylamino dialkylamino or trialkylamonium or L-oligonucleotide;

$R^{52}$ and $R^{53}$ are the same or different and independently hydrogen, alkyl, alkyl substituted hydroxy, $-COOH$, halogen, cyano, nitro, amine, alkylamino, dialkylamino, sulfonyl, phosphonyl, $-As(=O)(OR^6)(OR^7)$, $As(OR^6)_2(OR^7)_2$ or L-oligonucleotide;

$R^{21}$ and each $R^{22}$ are the same or different and independently hydrogen, halogen, alkoxy, hydroxy, mercapto, aryloxy, heterocycle, iminium ion, L-oligonucleotide, or two adjacent $R^{21}$ and $R^{22}$ or any two adjacent $R^{22}$ form a 4, 5 or 6 member carbocycle, optionally substituted with alkyl, halogen or oxo; or two $R^{22}$ that are one carbon away from each other, together with the carbons to which they are attached, form a 4, 5 or 6 member carbocycle, optionally substituted with alkyl, halogen, alkylthio, arylthio, alkoxy, aryloxy, oxo ($=O$), $=S$ or) $=C(R^{50})_2$;

each $R^{46}$ and $R^{47}$ is the same or different and independently hydrogen, alkyl, aryl, halogen, cyano, nitro, amine, alkylamino, dialkylamino, sulfonyl, phosphonyl, $-As(=O)(OR^6)(OR^7)$, $As(OR^6)_2(OR^7)_2$ or L-oligonucleotide;

each $R^{48}$ and $R^{49}$ is the same or different and independently hydrogen or alkyl optionally substituted with hydroxy, $-COOH$, halogen, cyano, nitro, amine, alkylamino, dialkylamino, sulfonyl, phosphonyl, $-As(=O)(OR^6)(OR^7)$, $-As(OR^6)_2(OR^7)_2$ or L-oligonucleotide;

each $R^{50}$ is the same or different and independently hydrogen, alkyl, cyano, $-C(O)NHR^{48}$;

$R^6$ and $R^7$ are the same or different and independently H, alkyl, aryl, or heteroaryl; or $R^6$ and $R^7$ are linked together to form a 5 or 6-member heterocycle comprising the arsenic and the two oxygen atoms to which $R^6$ and $R^7$ are attached, wherein $-R^6-R^7-$ is $-[C(R^8)_2]_w-$ (w is 2 or 3), wherein each $R^8$ is the same or different and independently hydrogen, hydroxy, cyano, $-OC(O)$-alkyl, $-OC(O)$-aryl, alkyl, aryl, alkylcarbonyl, arylcarbonyl, $-CH_2CN$, $-CH_2SO_2Me$, $-CH_2SO_2Ph$, or two $R^8$ of adjacent carbons together with the carbons to which they are attached form an aryl or heteroaryl, or two $R^8$ of the same carbon form an oxo; and L is a single covalent bond or a covalent linkage having 1-30 non-hydrogen atoms selected from the group consisting of C, N, O and S and is composed of any combination of single, double, triple or aromatic carbon-carbon bonds, carbon-nitrogen bonds, nitrogen-nitrogen bonds, carbon-oxygen bonds and carbon-sulfur bonds;

provided, at least one of the $R^{20}$, $R^{23}$ $R^{46}$, $R^{47}$, $R^{48}$, $R^{49}$, $R^{52}$ and $R^{53}$ is $-As(=O)(OR^6)(OR^7)$ or $-As(OR^6)_2(OR^7)_2$.

5. The oligonucleotide conjugate of claim 4 wherein the dye is a fluorescent dye having an excitation between 340 nm and 1100 nm and fluorescence emission maximum between 440 and 1150 nm.

6. The oligonucleotide conjugate of claim 4 wherein the dye is a non-fluorescent quencher being adapted to absorb fluorescence emitted from a reporting fluorophore prior to the binding of the oligonucleotide to a target.

7. The oligonucleotide conjugate of claim 4 wherein the oligonucleotide is a probe selected from molecular beacons, sunrise probes, and conformationally assisted probes.

8. A method of preparing an oligonucleotide conjugate in an automated synthesis, using a dye reagent of Formula (V), (V)

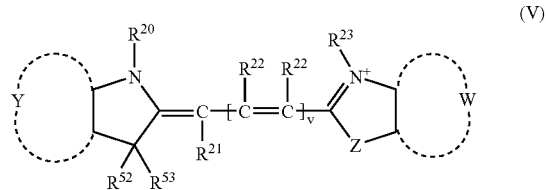

wherein, v is 0, 1, 2, 3, 4, 5 or 6;

Y represents atoms necessary to form one or two fused aromatic rings having 6 atoms in each ring, each ring atom is the same or different and independently $=CR^{46}-$, $=N^+R^{47}-$ or $=N-$;

W represents atoms necessary to form one or two fused aromatic rings having 6 atoms in each ring, each ring atom is the same or different and independently $=CR^{46}-$, $=N^+R^{47}-$ or $=N-$;

Z is $-O-$, $-S-$, $-Se-$, $-C(R^{48})_2-$ or $-NR^{49}-$;

$R^{20}$ and $R^{23}$ are the same or different and independently alkyl, aralkyl or substituted alkyl substituted with hydroxy, cyano, nitro, amino, sulfonyl, phosphonyl, $-As(=O)(OR^6)(OR^7)$, $-As(OR^6)_2(OR^7)_2$, $-COOH$, alkoxy, monoalkylamino, dialkylamino or trialkylamonium or L-$R_x$;

$R^{52}$ and $R^{53}$ are the same or different and independently hydrogen, alkyl, alkyl substituted hydroxy, $-COOH$, halogen, cyano, nitro, amine, alkylamino, dialkylamino, sulfonyl, phosphonyl, $-As(=O)(OR^6)(OR^7)$, $AS(OR^6)_2(OR^7)_2$ or L-$R_x$;

$R^{21}$ and each $R^{22}$ are the same or different and independently hydrogen, halogen, alkoxy, hydroxy, mercapto, aryloxy, heterocycle, iminium ion, L-$R_x$, or two adjacent $R^{21}$ and $R^{22}$ or any two adjacent $R^{22}$ form a 4, 5 or 6 member carbocycle, optionally substituted with alkyl, halogen or oxo; or two $R^{22}$ that are one carbon away from each other, together with the carbons to which they are attached, form a 4, 5 or 6 member carbocycle, optionally substituted with alkyl, halogen, alkylthio, arylthio, alkoxy, aryloxy, oxo (=O), =S or =C($R^{50}$)$_2$;

each $R^{46}$ and $R^{47}$ is the same or different and independently hydrogen, alkyl, aryl, halogen, cyano, nitro, amine, alkylamino, dialkylamino, sulfonyl, phosphonyl, —As(=O)(O$R^6$)(O$R^7$), As(O$R^6$)$_2$(O$R^7$)$_2$ or L-$R_x$;

each $R^{48}$ and $R^{49}$ is the same or different and independently hydrogen or alkyl optionally substituted with hydroxy, —COOH, halogen, cyano, nitro, amine, alkylamino, dialkylamino, sulfonyl, phosphonyl, —As(=O)(O$R^6$)(O$R^7$), —As(O$R^6$)$_2$(O$R^7$)$_2$ or L-$R_x$;

each $R^{50}$ is the same or different and independently hydrogen, alkyl, cyano, —C(O)NH$R^{48}$;

$R^6$ and $R^7$ are the same or different and independently H, alkyl, aryl, or heteroaryl; or $R^6$ and $R^7$ are linked together to form a 5 or 6-member heterocycle comprising the arsenic and the two oxygen atoms to which $R^6$ and $R^7$ are attached, wherein —$R^6$—$R^7$— is —[C($R^8$)$_2$]$_w$— (w is 2 or 3), wherein each $R^8$ is the same or different and independently hydrogen, hydroxy, cyano, —OC(O)-alkyl, —OC(O)-aryl, alkyl, aryl, alkylcarbonyl, arylcarbonyl, —CH$_2$CN, —CH$_2$SO$_2$Me, —CH$_2$SO$_2$Ph, or two $R^8$ of adjacent carbons together with the carbons to which they are attached form an aryl or heteroaryl, or two $R^8$ of the same carbon form an oxo;

L is a single covalent bond or a covalent linkage having 1-30 non-hydrogen atoms selected from the group consisting of C, N, O and S and is composed of any combination of single, double, triple or aromatic carbon-carbon bonds, carbon-nitrogen bonds, nitrogen-nitrogen bonds, carbon-oxygen bonds and carbon-sulfur bonds;

provided, at least one of the $R^{20}$, $R^{23}$ $R^{46}$, $R^{47}$, $R^{48}$, $R^{49}$, $R^{52}$ and $R^{53}$ is —As(=O)(O$R^6$)(O$R^7$) or —As(O$R^6$)$_2$(O$R^7$)$_2$, wherein $R_x$ is a phosphoramidite group, the method comprising:

performing automated synthesis of oligonucleotide using phosphoramidite method to provide a dye-labeled oligonucleotide;

deprotecting —As(=O)(O$R^6$)(O$R^7$) or —As(O$R^6$)$_2$(O$R^7$)$_2$ of the dye-labeled oligonucleotide to provide a dye-labeled oligonucleotide having negatively charged polar group selected from —AsO$_3^{2-}$ and —AsO$_3$H$^-$; and isolating the dye-labeled oligonucleotide from the reaction medium.

\* \* \* \* \*

UNITED STATES PATENT AND TRADEMARK OFFICE
CERTIFICATE OF CORRECTION

| | |
|---|---|
| PATENT NO. | : 7,799,926 B2 |
| APPLICATION NO. | : 11/372249 |
| DATED | : September 21, 2010 |
| INVENTOR(S) | : Alexander A. Gall |

It is certified that error appears in the above-identified patent and that said Letters Patent is hereby corrected as shown below:

Column 86, Line 33
"$R^7$-is- $[C(R^8)_{2]w}$-w is 2 or 3), wherein each $R^8$ is" should read, --$R^7$-is- $[C(R^8)_2]_w$-(w is 2 or 3), wherein each $R^8$ is--.

Column 87, Line 25
"hydroxy, cyano, nitro amino sulfonyl, phosphonyl, -As" should read, --hydroxy, cyano, nitro, amino, sulfonyl, phosphonyl, -As--.

Column 88, Line 59
"AS$(OR^6)_2(OR^7)_2$ or L-R$_x$;" should read, --As$(OR^6)_2(OR^7)_2$ or L-R$_x$;--.

Signed and Sealed this
Fifteenth Day of March, 2011

David J. Kappos
*Director of the United States Patent and Trademark Office*